United States Patent [19]

Ishiguro et al.

[11] Patent Number: 4,757,396
[45] Date of Patent: Jul. 12, 1988

[54] MAGNETIC TAPE SYSTEM WITH COMMAND PREFETCH MEANS

[75] Inventors: Masayuki Ishiguro, Kawasaki; Noboru Ohwa, Yokohama, both of Japan

[73] Assignee: Fujitsu Limited, Kawasaki, Japan

[21] Appl. No.: 883,630

[22] Filed: Jul. 9, 1986

[30] Foreign Application Priority Data

Jul. 12, 1985 [JP] Japan ................................ 60-153831
Sep. 27, 1985 [JP] Japan ................................ 60-214248
Oct. 5, 1985 [JP] Japan ................................ 60-222498
Oct. 22, 1985 [JP] Japan ................................ 60-235807

[51] Int. Cl.$^4$ ........................... G11B 15/18; G11S 5/09
[52] U.S. Cl. ........................................... 360/69; 360/39
[58] Field of Search ................................... 360/69, 39

[56] References Cited

U.S. PATENT DOCUMENTS 4,536,806  8/1985  Louth ................................ 360/69
4,633,333  12/1986  Blanco et al. ..................... 360/39

Primary Examiner—Vincent P. Canney
Attorney, Agent, or Firm—Staas & Halsey

[57] ABSTRACT

A magnetic tape system for efficient and proper prefetching at the end of the tape. The system includes a drive mechanism (1), a drive control unit (2, 20, 21) for controlling the drive mechanism based on commands to write data on the read data from the magnetic tape and a prefetch control unit. The prefetch control unit stores a plurality of write commands from a host system, including write commands which are not accompanied with write data from the host system, and a plurality of read and write data. The drive control unit operates the drive mechanism based on the write commands stored in the first memory. The prefetch control unit reduces the number of prefetched write commands stored therein after receipt of an early warning for the end of tape (EWA) signal. Preferably, the prefetchings of write commands are reduced when a write command sent from the host system is received. The final limit on prefetched write commands is determined by the recording density and the maximum block length of the write commands. The running distance of the magnetic tape may be calculated and prefetch control performed until the calculated value reaches a value corresponding to a second EWA position before the end of the magnetic tape. When the second EWA position is reached, an EOT signal is issued to the host system and prefetched write commands are no longer accepted.

21 Claims, 57 Drawing Sheets

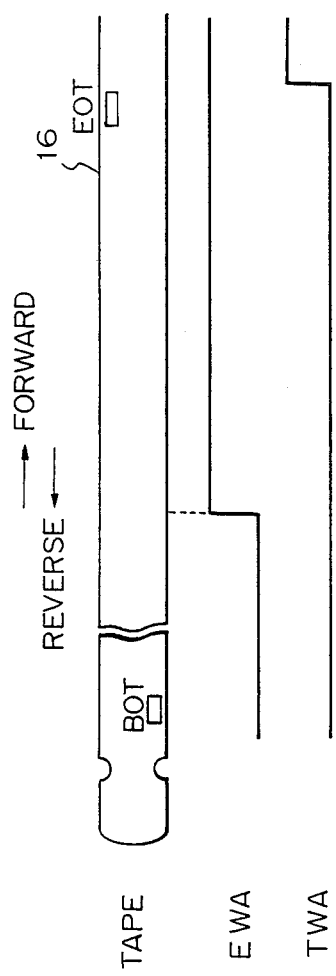
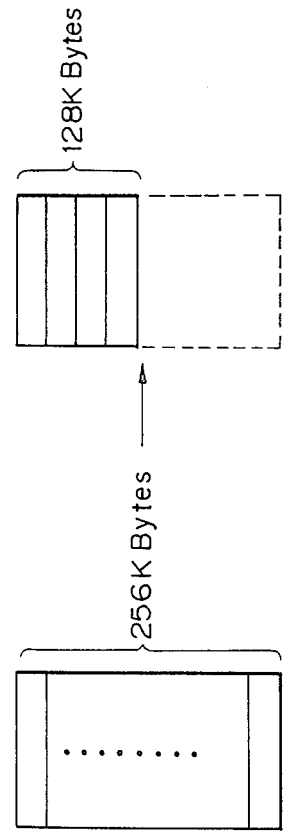
Fig. 2a TAPE
Fig. 2b EWA
Fig. 2c TWA
Fig. 3 PRIOR ART

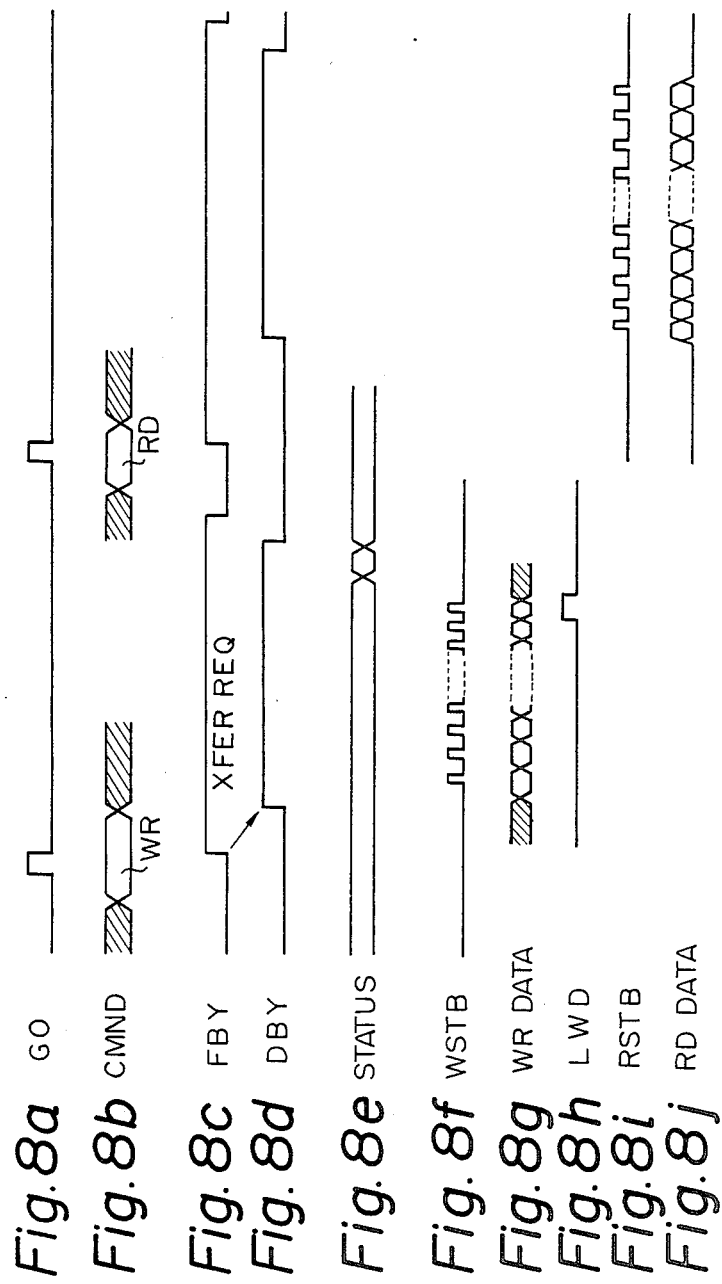

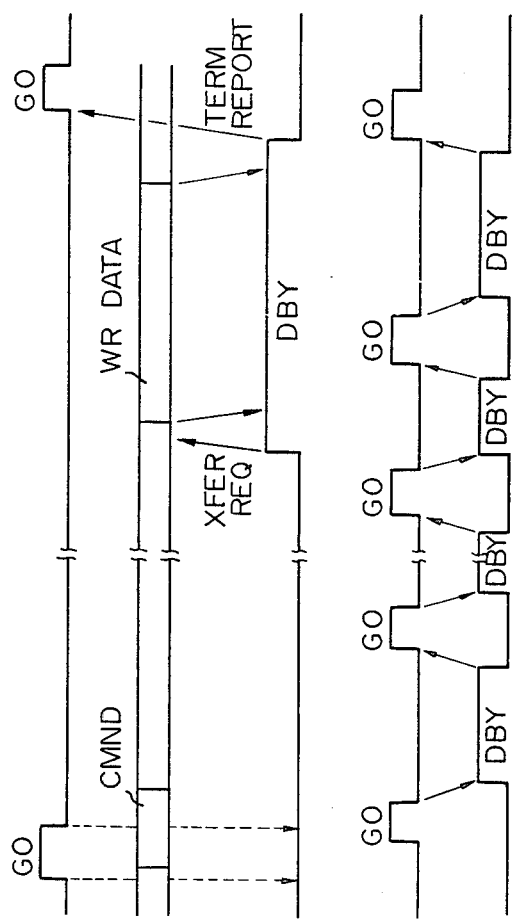

EWA

PREFETCH COMMAND

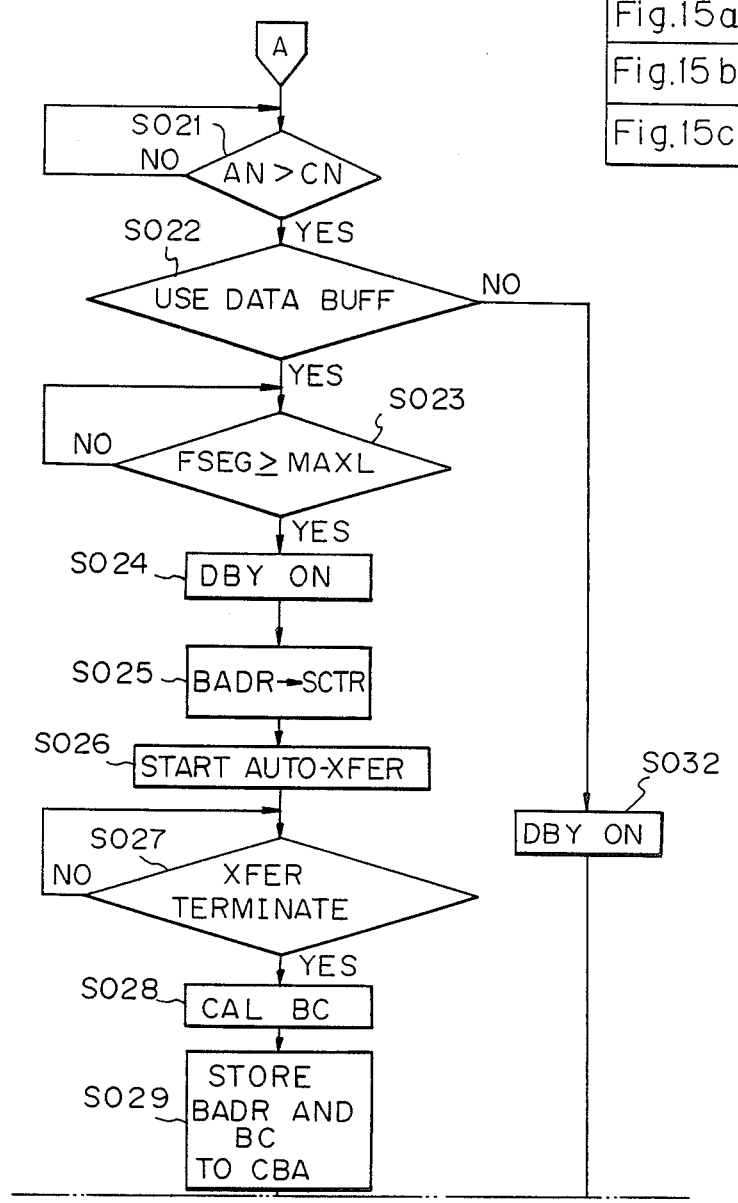

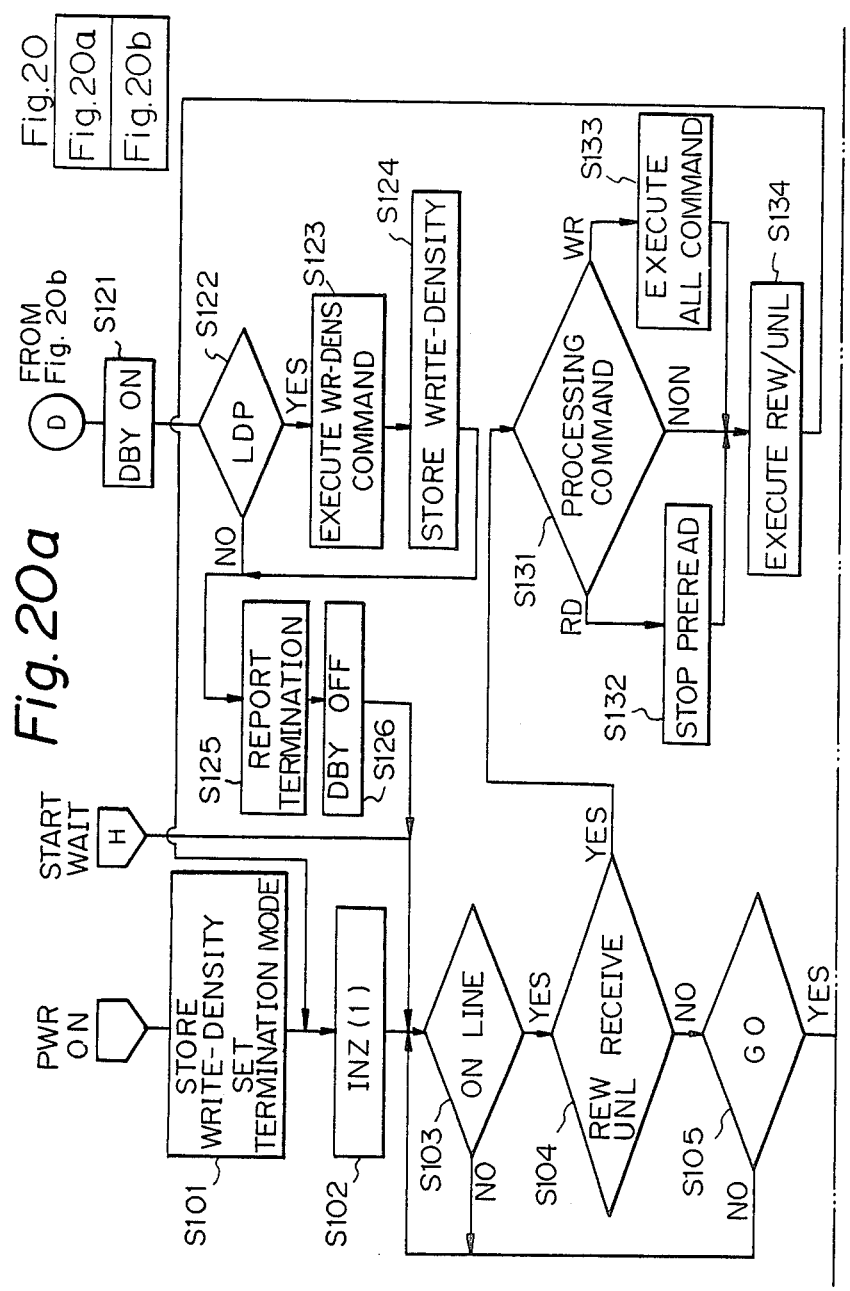

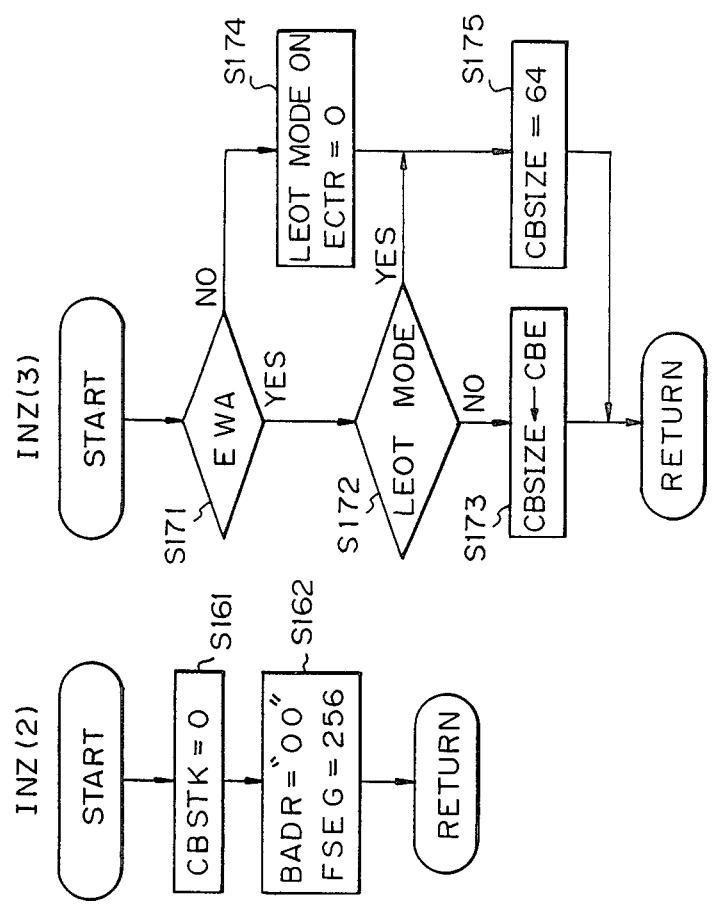

Fig. 24a
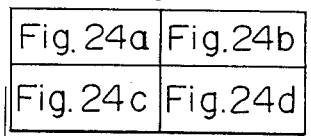
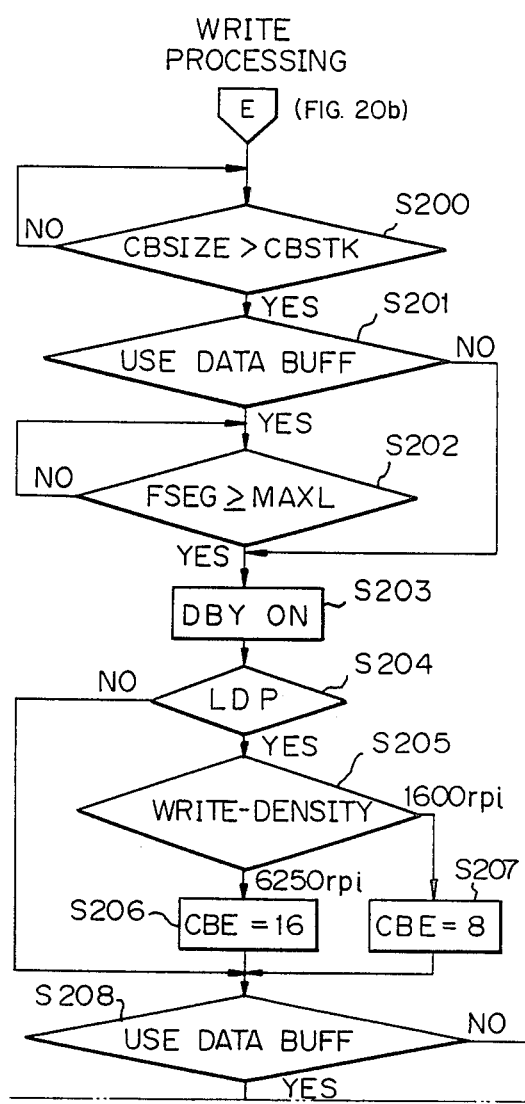

TO Fig. 24b

TO
START WAIT ROUTINE (Fig. 20a)

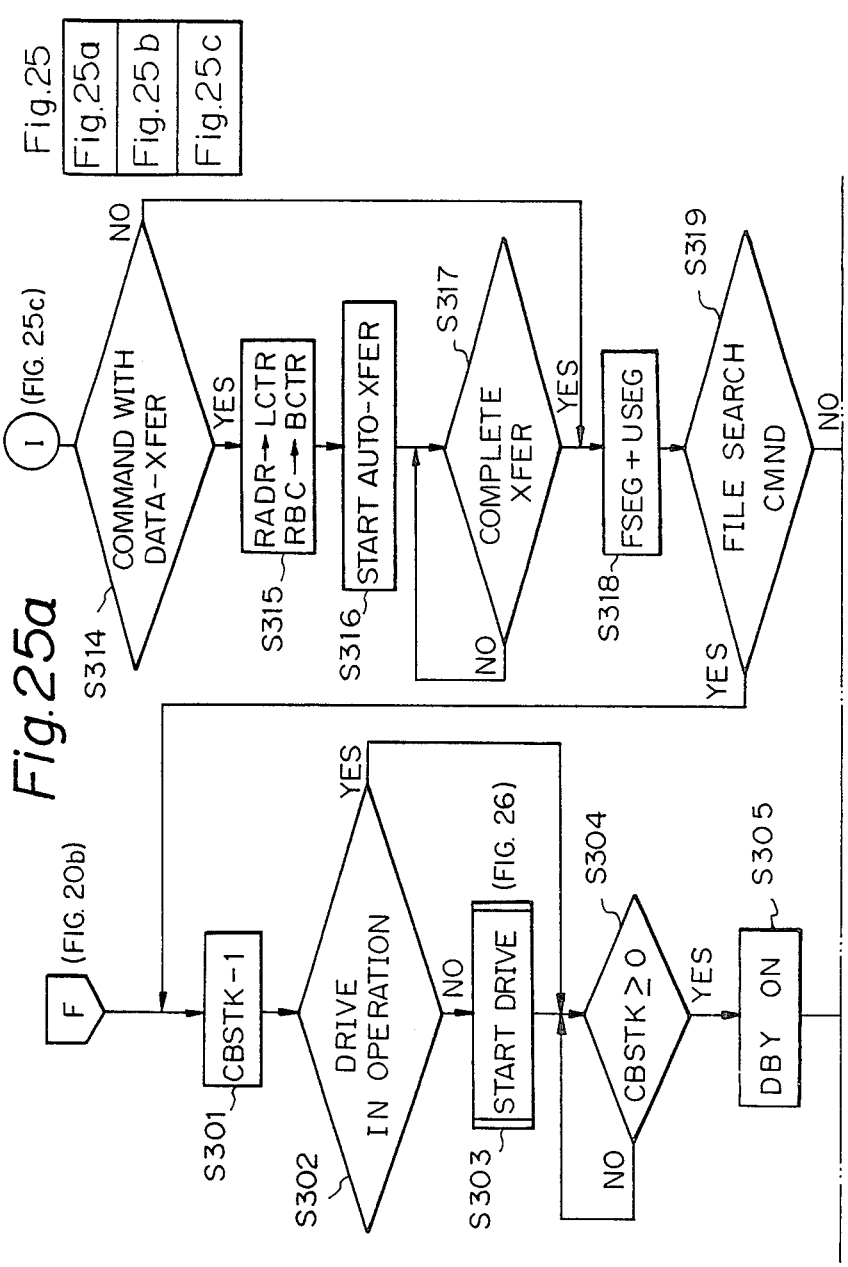

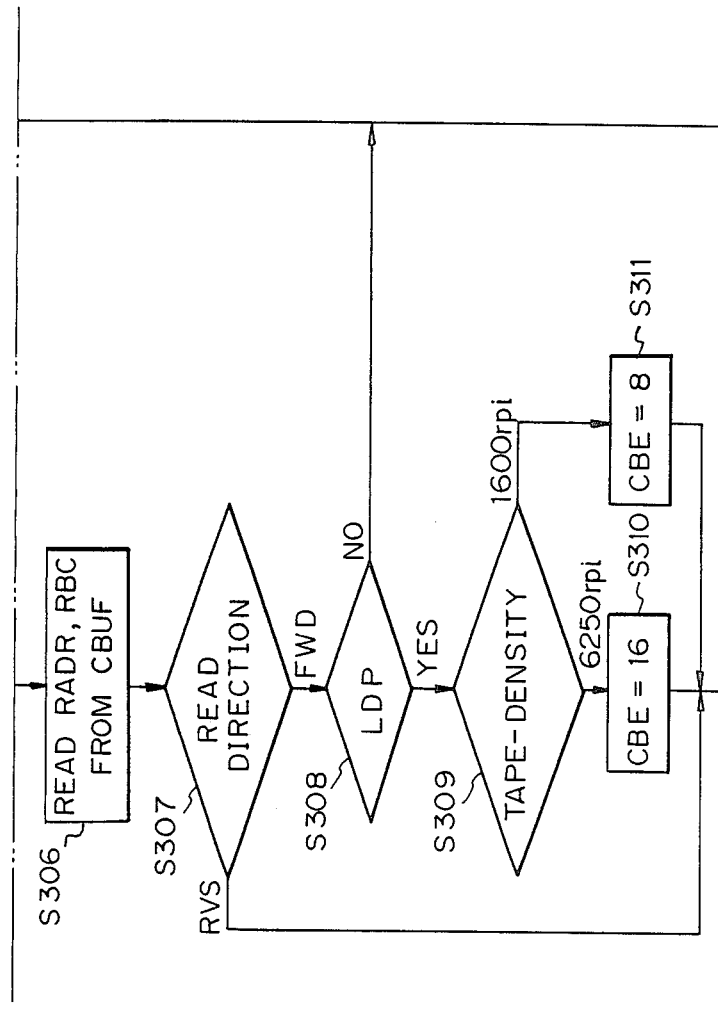

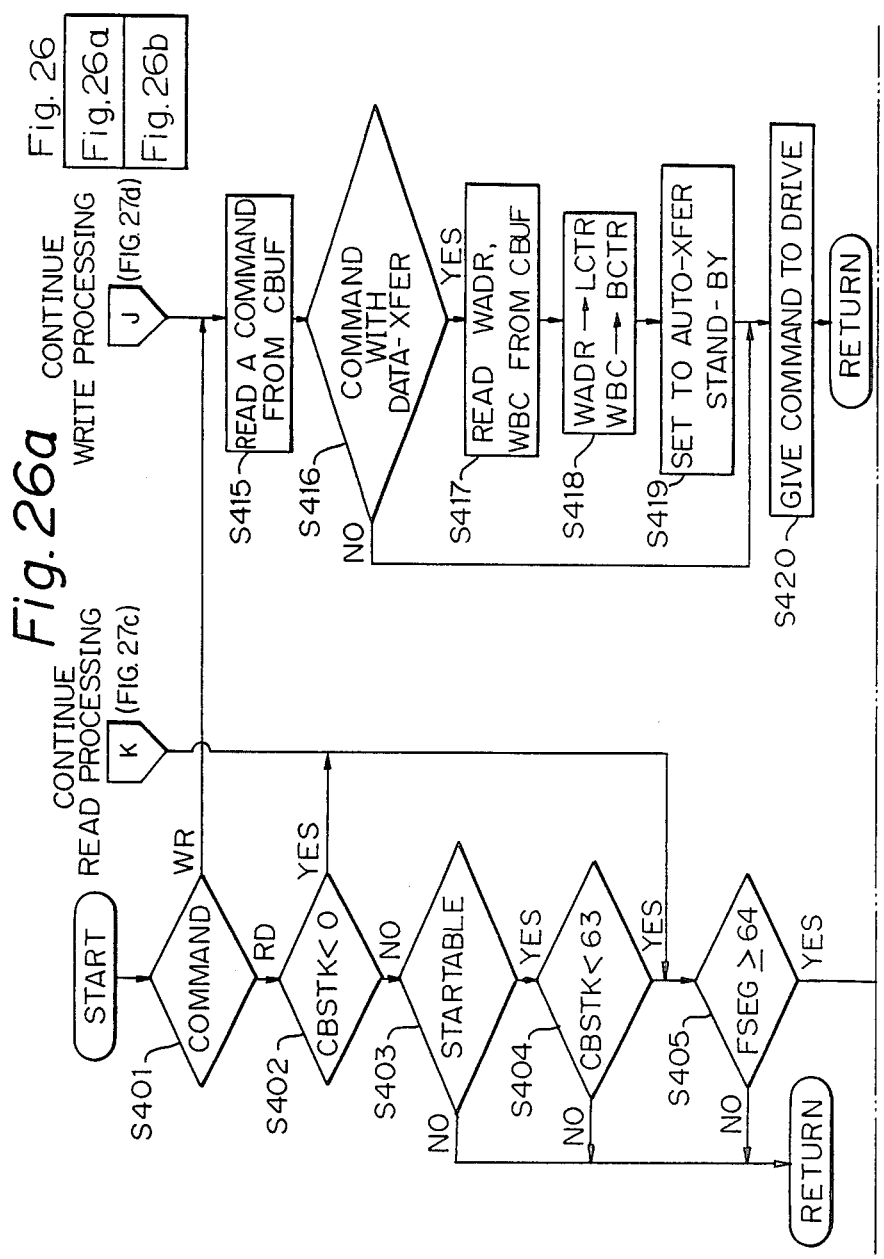

Fig. 34a

| Fig. 34 |
|---|
| Fig. 34a |
| Fig. 34b |

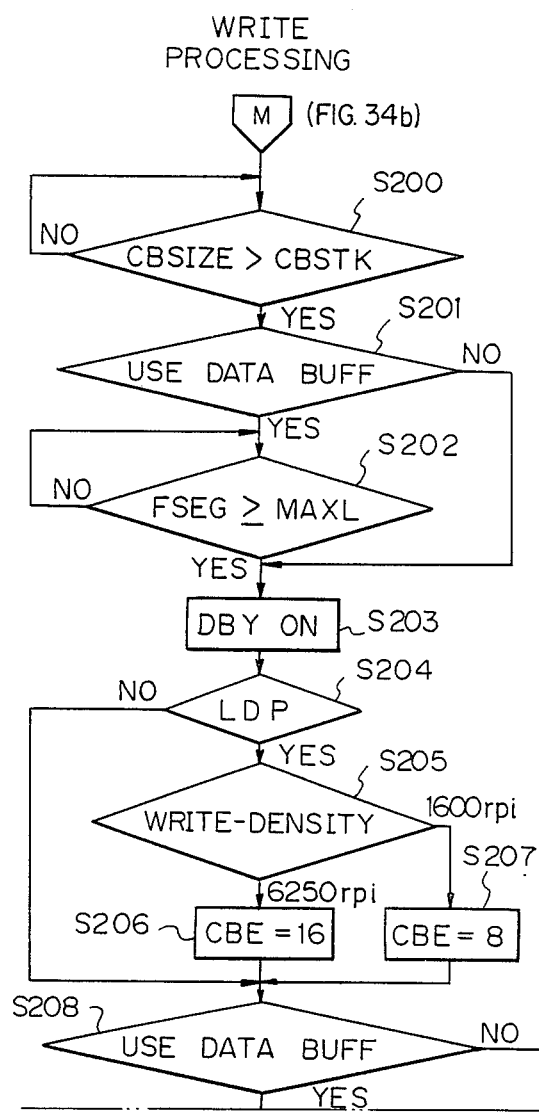
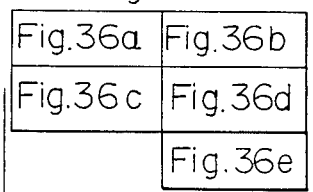
Fig. 36a

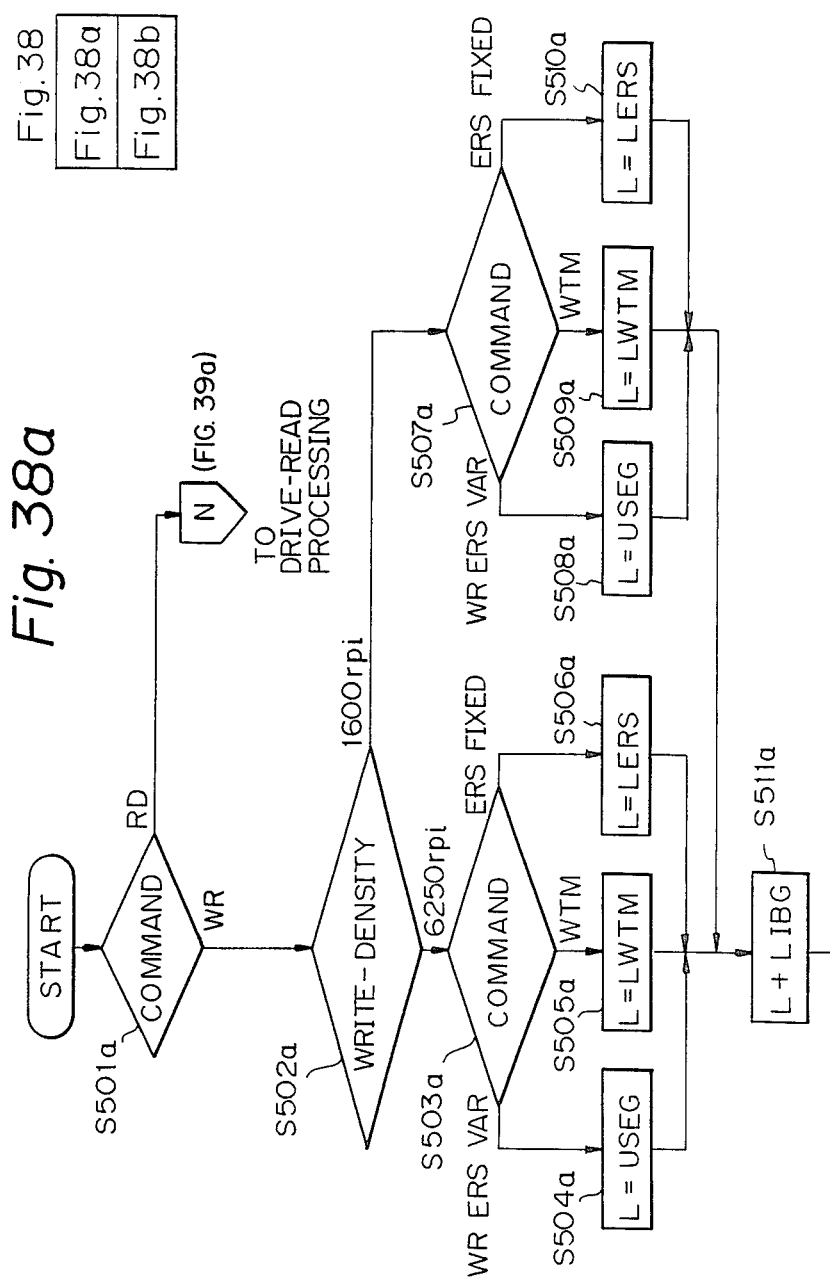

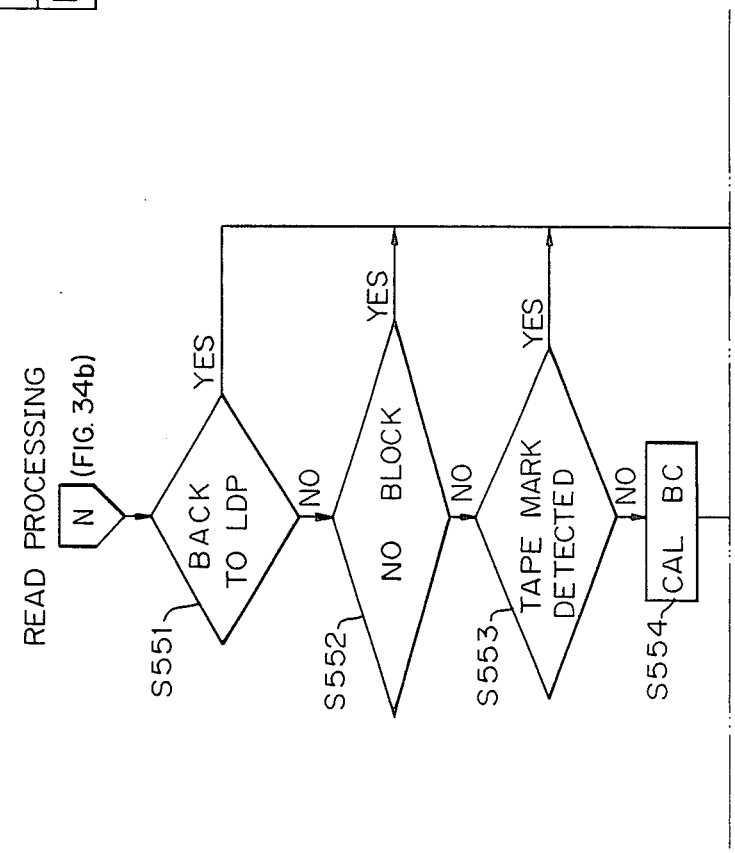

MAGNETIC TAPE SYSTEM WITH COMMAND PREFETCH MEANS

BACKGROUND OF THE INVENTION

1. Field of the Invention

The present invention relates to a magnetic tape system, more particularly, to a magnetic tape system including a direct reel-to-reel drive means and command prefetch means performing buffered magnetic tape control.

2. Description of the Related Art

In recent years, magnetic tape systems have been developed having reel-to-reel drive means which dispense with the use of vacuum columns and which perform direct control of the reels for winding magnetic tape (for example, see U.S. Pat. No. 4,125,881).

Further, it is known to provide a command prefetch control unit (or buffer adapter) having a buffer memory between the control unit of the magnetic tape system and the host controller so as to prefetch commands and data from the host controller, store the same in the buffer memory, and perform prefetch control for successively executing the commands and data in the buffer memory on the tape drive unit (for example, see U.S. Pat. No. 4,500,965).

This type of magnetic tape system is called a buffered magnetic tape system and enables asynchronous operation of a tape drive unit with respect to commands from a host controller. Therefore, on the host controller side, it is not necessary to wait for the completion of the operation of the tape drive unit for any one command. Commands can be issued continuously. Further, the tape drive unit need not wait for commands from the host controller, but can continuously execute operations. Therefore, the processing efficiency is improved. In particular, the efficiency of operations in the streaming mode in magnetic tape systems of the direct reel-to-reel drive type can be improved.

However, there is a limit to the length of a magnetic tape. If numerous commands are prefetched near the end of the magnetic tape, those prefetched commands cannot all be executed on the tape. Therefore, the command prefetching must be stopped near the end of the magnetic tape. On the other hand, from the point of view of processing efficiency, it is desirable to perform command prefetching as close as possible to the end of the magnetic tape. However, in a magnetic tape system of the direct reel-to-reel type, if the running distance of the magnetic tape is calculated from the diameters of the magnetic tape wound on the two reels, there is the problem that it is not possible to accurately determine when the end of the magnetic tape approaches. The issue now outstanding, therefore, is how to accurately and efficiently stop the command prefetching near the end of the magnetic tape.

Further, if the command prefetching is stopped based on the write data sent from the host controller side, then the problem arises of write operations being performed exceeding the effective length of the magnetic tape in the case of commands not accompanied by write data.

SUMMARY OF THE INVENTION

The present invention has as its object the provision of a magnetic tape system having command prefetch control means able to restrict command prefetching at the end of a magnetic tape even in the case of write commands not accompanied by write data and thus to enable execution of all prefetched write commands.

The present invention has as its further object the provision of a magnetic tape system having command prefetch control means wherein the number of command prefetchings in an early warning area (EWA) is limited by the number of commands prefetched from the host controller and which can reliably execute prefetched write commands in a tape warning area (TWA).

The present invention has as its further object the provision of a magnetic tape system enabling command prefetch control while maintaining the performance of the system at the maximum and permitting execution of all commands in the TWA.

The present invention has as its further object the provision of a magnetic tape system having command prefetch control means enabling efficient streaming operation in the EWA and enabling reliable execution of prefetched write commands in the TWA.

The present invention has as its further object the provision of a magnetic tape system having command prefetch control means wherein, at the end of the magnetic tape (EOT), processing is possible based on selection of a physical EOT mode or a logical EOT (LEOT) mode. In the physical EOT mode, selection of buffered processing and nonbuffered processing is possible. In the buffered processing mode, detection of the physical EOT and LEOT of the magnetic tape coincide.

In a first aspect of the present invention, there is provided a magnetic tape system including: a drive mechanism having motors for driving a pair of reels on which is wound magnetic tape having a beginning-of-tape mark and an end-of-tape mark and having a magnetic head; a drive control unit, operatively connected to the drive mechanism, for controlling the drive mechanism based on given commands so as to write data on or read data from the magnetic tape, calculating the running distance of the magnetic tape based on the diameters of the magnetic tape wound on the reels, and issuing an EWA signal indicating the approach of the end of the magnetic tape before detection of the end-of-tape mark; and a prefetch control unit, operatively connected to the drive control unit and a host system requiring access to the magnetic tape and having a first memory which stores a plurality of write commands from the host system including write commands which are not accompanied with write data from the host system, and a second memory which stores a plurality of write data and the read data from the magnetic tape, for operating the drive mechanism based on write commands received in advance from the host system and stored in the first memory via the drive control unit, writing data on or reading data from the magnetic tape based on commands from the host system, and reporting the results to the host system.

The prefetch control unit reduces the prefetching of write commands stored in the first memory after the receipt of the first EWA signal. Preferably, the prefetchings of write commands are reduced when a write command sent from the host system is received. Alternatively, the prefetchings of write commands can be reduced to a set value.

In a second aspect of the present invention, after the prefetch control unit receives the first EWA signal, the number of prefetched write commands able to be stored in the first memory is limited, the final limit being determined by the recording density and the maximum block length of the write commands.

In a third aspect of the present invention, after the prefetch control unit receives the first EWA signal, the running distance of the magnetic tape is calculated and prefetch control performed until the calculated distance reaches a value to a second EWA position corresponding located before the end marker of the magnetic tape. When the value corresponding to the second EWA position is reached, an EOT signal is issued to the host system and prefetchings of write commands from the host system are no longer accepted.

In a fourth aspect of the present invention, after the prefetch control unit receives the first EWA signal, control is effected in two modes: a first mode wherein the prefetch control means calculates a running distance (ECTR) of the magnetic tape and when the calculated distance reaches a value corresponding to a second EWA position located before the end marker of the magnetic tape, an EOT signal is issued to the host system and prefetchings of write commands from the host system are no longer accepted and a second mode wherein the number of prefetchable commands in the time from the detection of the EWA based on the first EWA signal to the detection of the EOT by the drive control unit is reduced.

In a fifth aspect of the present invention, after the prefetch control unit receives the first EWA signal, the running distance of the magnetic tape is calculated and prefetch control performed until the calculated value reaches a value to a second EWA position corresponding located before the end marker of the magnetic tape. When the value corresponding to the second EWA position is reached, control is effected in four modes: a first mode wherein an EOT is issued to the host system and prefetchings of write commands from the host system are no longer accepted, a second mode wherein the number of prefetchable commands in the time from the detection of the EWA based on the first EWA signal to the detection of the EOT by the drive control unit is reduced, a third mode wherein buffered control is performed on the second mode, and a fourth mode wherein no buffered control is performed. After the receipt of the first EWA signal, the prefetch control unit, in the third mode, reduces the number of prefetched commands in a first forward region before the EOT of the magnetic tape to a predetermined value and, when the magnetic tape reaches the EOT, reduces the number of prefetched commands to zero. In the fourth mode, it reduces the number of prefetched commands to zero when the magnetic tape reaches a first forward region before the EOT. Further, in the first mode, it reduces the number of prefetched commands to zero when the magnetic tape reaches the second EWA position before the EOT.

Preferably, the magnetic tape system has the same signal connections between the host system and the prefetch control unit as those between the prefetch control unit and drive unit.

BRIEF DESCRIPTION OF THE DRAWINGS

Other objects and features of the present invention will be described below in detail with reference to the accompanying drawings, in which:

FIG. 2a to FIG. 2c are diagrams illustrating the relation of prefetch control signals to the magnetic tape;

FIG. 3 is a block diagram illustrating conventional prefetch control;

FIG. 8a to FIG. 9e are operational timing charts of the magnetic tape system of FIG. 4 to FIG. 7;

FIG. 15a to FIG. 15c is a flow chart of write processing for a host system in the first embodiment of the present invention;

FIG. 20a to FIG. 23 are flow charts illustrating the startup in the second embodiment of the present invention;

FIG. 24a to FIG. 24d is a flow chart illustrating write processing for a host system in the second embodiment of the present invention;

FIG. 25a to FIG. 25c is a flow chart illustrating read processing for a host system in the second embodiment of the present invention;

FIG. 26a and FIG. 26b is a flow chart illustrating the startup of a drive system in the second embodiment of the present invention;

FIG. 38a and FIG. 38b is a flow chart illustrating the write processing for a drive system in the fifth embodiment; and FIG. 39a and FIG. 39b is a flow chart illustrating the read processing for a drive system in the fifth embodiment of the present invention.

DESCRIPTION OF THE PREFERRED EMBODIMENTS

Before explaining the preferred embodiments of the present invention, an outline will be given of the concept of command prefetching and the suspension of command prefetching at the EWA of a magnetic tape.

Figure 1:
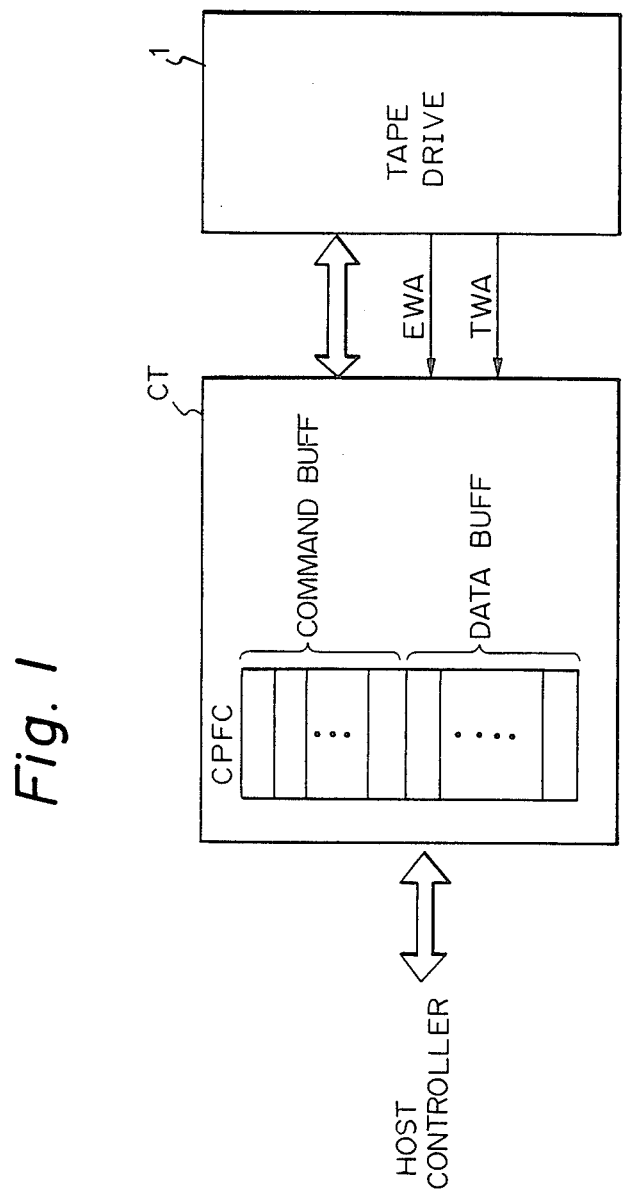
FIG. 1 is a block diagram of a magnetic tape system with the prefetch control of the present invention.

As shown in FIG. 1, a control unit CT of a magnetic tape system is provided with a command prefetch control unit CPFC. For prefetching commands, the command prefetch control unit CPFC is comprised of a command buffer able to store a plurality of commands and a data buffer able to store a plurality of data. For example, the command buffer can be made to store a maximum 32 commands and the data buffer a maximum of 256 Kbytes of data, thus enabling an increase in the prefetched commands and data.

On the other hand, as shown in FIG. 2a, the magnetic tape 16 is not endless, but is limited in length. The end is provided with an EOT marker. After detection of the EOT marker, only about 3 meters of tape can be used. Therefore, in write processing, if the prefetched commands and data at the time of detection of the EOT marker require more than 3 meters of tape, they cannot be written on the magnetic tape 16. Therefore, command prefetching has to be stopped near the EOT marker. For this reason, an EWA signal indicating the approach of the end of the tape is issued before the detection of the end of the tape, i.e., the EOT marker, for example, approximately 20 meters before the EOT marker (FIG. 2b) and the storable amount (number of bytes of data) of the data buffer is reduced. For example, as shown in FIG. 3, a data buffer able to store 256 Kbytes of data is reduced in capacity to 128 Kbytes so that unless the amount of data stored in the data buffer is less than 128 Kbytes, reception of write data from the host controller is prohibited. This prevents illegal write operations at the end of magnetic tapes from occurring due to too many write commands being received.

In the prior art, the number of prefetched data bytes of write data for write commands is limited to prevent illegal write operations. However, write commands also include commands, such as "erase" and "write tape mark", which are not accompanied by write data from the host controller, but which issue corresponding data in the magnetic tape system for writing on the magnetic tape.

Therefore, in the prior art, wherein just the write data was used as reference, it was possible to prevent illegal write operations for write commands accompanied by write data, but no limitations were imposed on "erase" or "write tape mark" commands not accompanied by write data. Therefore, prefetching of write commands beyond the effective writing range after the EOT and could occur with the problem that those commands could not be executed.

The present invention has as its first object, in consideration of the above, the provision of a magnetic tape system having command prefetch control means able to limit the command prefetch at the EOT for even write commands not accompanied by write data, thus enabling effective execution of all prefetched write commands.

To achieve the above-mentioned object, the present invention limits write commands able to be stored in a command buffer in accordance with an EWA signal indicting the detection of the approach of an EOT of a magnetic tape. Further, the limitation of the write commands is made in various ways, as indicated below, from the viewpoint of effective use of command prefetching.

Below, an embodiment of the present invention will be explained.

Figure 4:
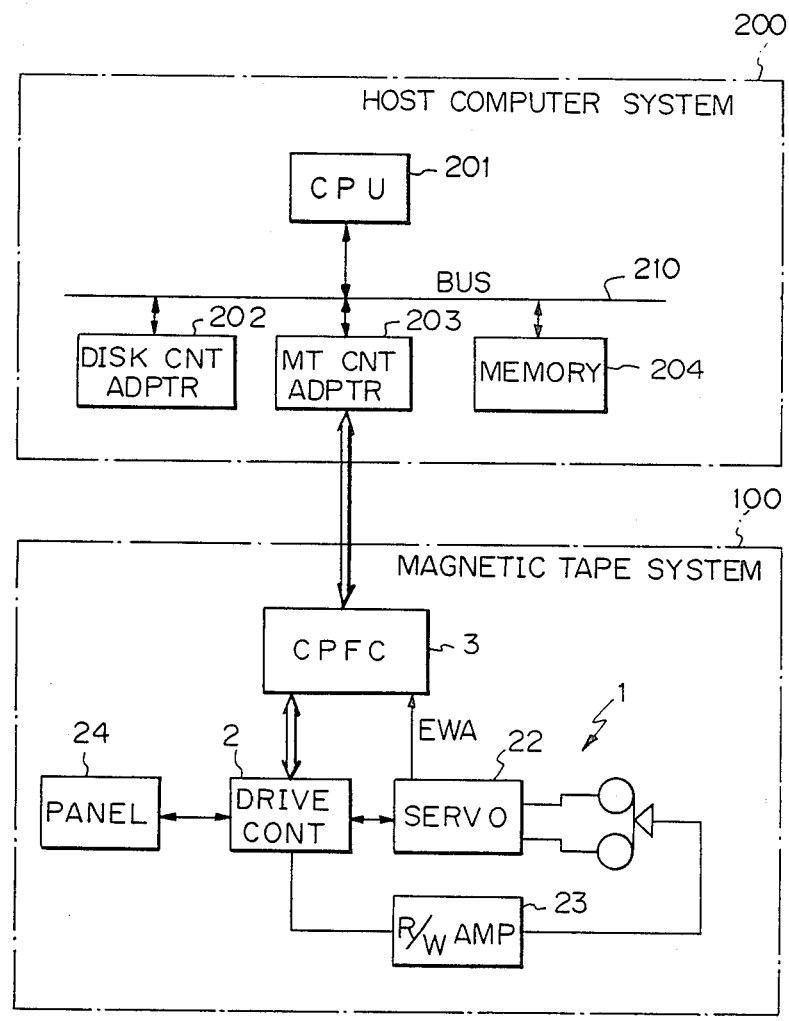
FIG. 4 to FIG. 7 are block diagrams of a magnetic tape system according to an embodiment of the present invention.

FIG. 4 shows the overall constitution of the magnetic tape system and related components in an embodiment of the present invention. The magnetic tape system 100 has a drive unit 1 composed of a magnetic tape reel drive motor (not shown), a servo system 22 for driving that motor, a drive circuit, etc., a drive control unit 2 for controlling the drive unit 1, an operator panel 24, and a command prefetch control unit 3. As the host system of the command prefetch control unit 3, an MT control adapter 203 in a host computer system 200 is connected via a common bus 210 to a central processing unit (CPU) 201. The common bus 210 similarly connects a disk control adapter 202, memory 204, etc. to the MT control adapter 203.

The prefetch control unit 3 is subordinate to, or operates as a slave of, the MT control adapter 203, i.e., the MT control adapter 203 is superior to, or operates as a master of, the command prefetch control unit 3. Seen from the drive control unit 2, the command prefetch control unit 3 is superior.

The signal interface between the command prefetch control unit 3 and the MT control adapter 203 is made the same as the signal interface beteween the command prefetch control unit 3 and the drive control unit 2. Therefore, if the command prefetch control unit 3 is eliminated, one obtains a magnetic tape system of the conventional type without prefetch control. Conversely, by providing a command prefetch control unit 3 in a magnetic tape system wherein no prefetch control is performed, one obtains a magnetic tape system wherein prefetch control is performed. In these cases, the MT control adapter 203 and the drive control unit 2 do not require any modification. In this way, the command prefetch control unit 3 is constructed as an exchangable module. Further, the command prefetch control unit 3 may be placed anywhere between the drive control unit 2 and MT control unit 203. It is not limited to being provided in the magnetic tape system 100.

Figure 5:
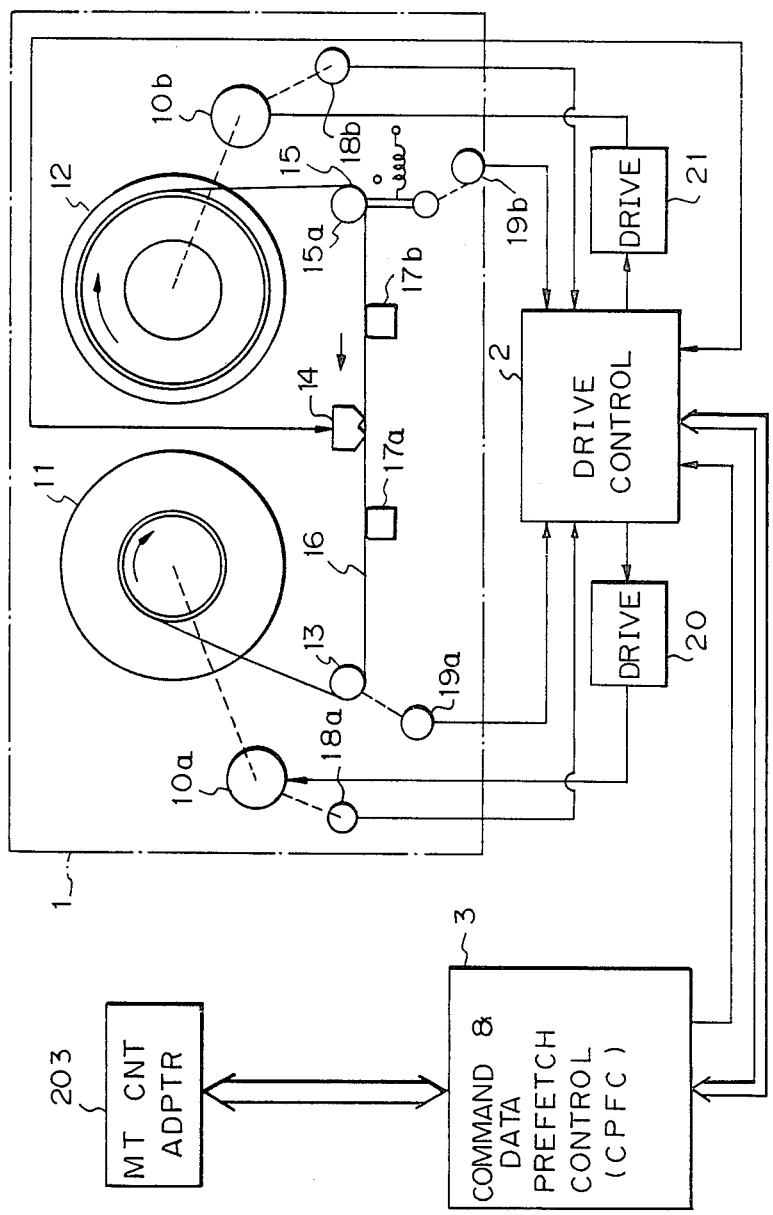

FIG. 5 is a view of the constitution of the magnetic tape system of FIG. 4, based around the drive unit 1. In the figure, reference numeral 1 is a magnetic tape drive unit of the reel-to-reel direct drive type (below, "drive unit"), in which magnetic tape 16 wound between a takeup reel (machine reel) 11 and feed reel (file reel) 12 travels over a roller 15a of a tension arm 15, a magnetic head 14, and idler 13 to the takeup reel 11 guided by guides 17a and 17b at the two sides of the magnetic head 14. The takeup reel 11 and feed reel 12 are rotably driven by the drive motors 10a and 10b. Further, the drive motors 10a and 10b are provided with rotary encoders 18a and 18b, which can detect the amount of rotation of the drive motors 10a and 10b. The idler 13 is provided with a rotary encoder 19a, by which the actual running position of the tape can be monitored. On the other hand, the tension arm 15 is provided with a tension detector 19b, which enables detection of the tape tension.

Reference numeral 2 is a drive control unit, which uses commands and data from the command and data prefetch control unit 3 for the tape running drive and head writing or reading drive. It receives outputs of the rotary encoders 18a, 18b, and 19a to monitor the running state and uses the output of the tension detector 19b to monitor the tension. It controls the two drive motors 10a and 10b through drive circuits 20 and 21 to keep the tape tension at a constant level in driving the tape, gives write data to the magnetic head 14 for writing, and receives read data from the magnetic head 14.

Reference numeral 3 is a command and data prefetch control unit, which receives write or read commands and write data from the host controller, stores the same, and, in the case of write commands, sends the write commands and write data to the drive control unit 2 to execute the write operation. After normal comletion of execution, it sends the next block of write commands and write data. If not normally completed, it performs a write retry operation on the drive control unit 2. The command and data prefetch control unit 3, as mentioned earlier, is an adapter which operates as a magnetic tape system with respect to the host controller and as a host controller with respect to the drive control unit 2.

Figure 6:
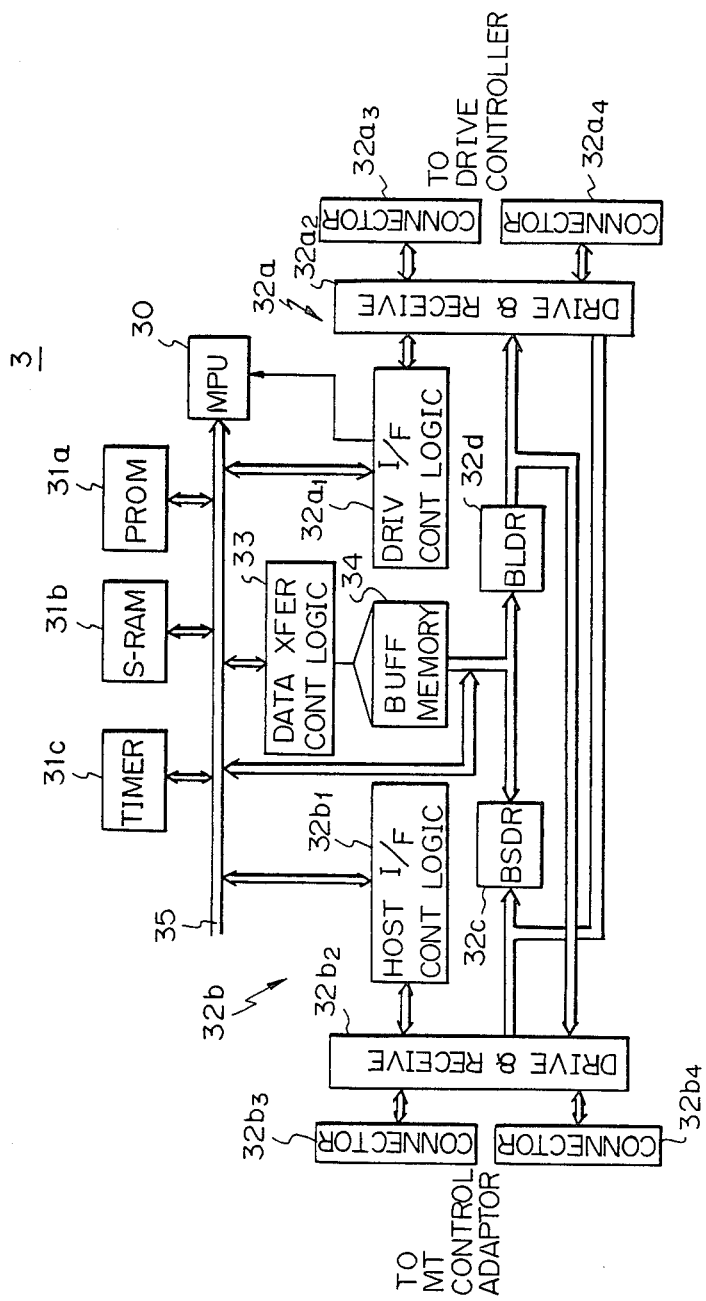

FIG. 6 is a block diagram of the prefetch control unit. In FIG. 6, the prefetch control unit 3 includes a microprocessor unit (MPU) 30, a bus 35, an erasable programamble read-only memory (EPROM) 31a, a static (S)-RAM 31b, a timer unit 31c, a data transfer control logic circuit 33, a buffer memory 34 of a dynamic (D)-RAM, a drive interface circuit 32a, and a host interface circuit 32b.

The MPU 30 follows a microprogram stored in the EPROM 31a for control of the reception of commands and data from the host controller and for control of transfer of data and status. It also performs control of transfer of commands and data to the drive control unit 2 and control of reception of data and status from the drive control unit and performs processing for rewrite control. The MPU 30 is comprised of a Motorolla IC MC68B09E or a Fujitsu IC MB68B09E.

The EPROM 31a stores programs to be executed by the MPU 30. The S-RAM 31b stores the various data, commands, and parameters required for processing by the MPU 30. Details are given with reference to FIG. 7.

Figure 7:
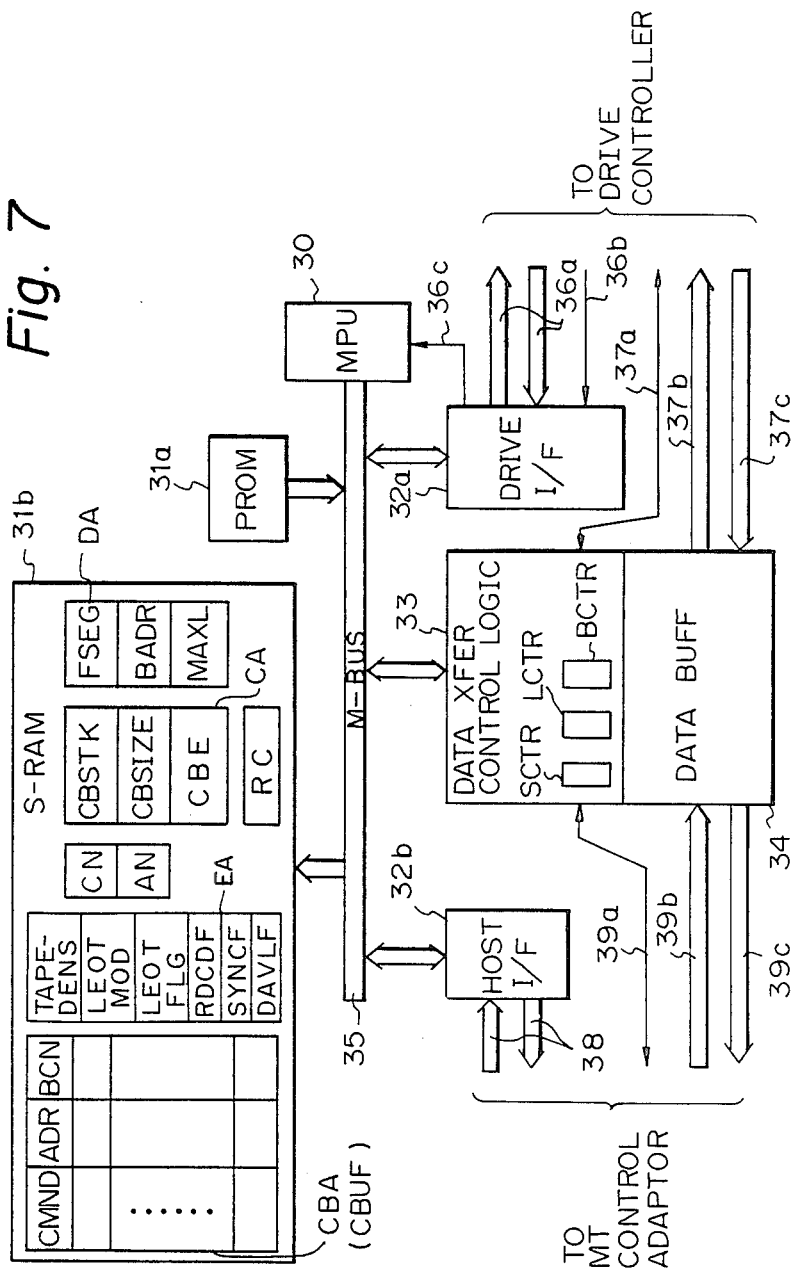

FIG. 7 is a block diagram of the portion of the prefetch control unit of FIG. 6 having a direct relation to the present invention.

The S-RAM 31b has a command buffer area CBA, a command buffer management area CA, and a data buffer management area DA. The command CMND buffer area CBA has stored therein commands from a host controller, addresses ADR of data in a data buffer transferred under those commands, a byte count number BCN, etc. The command buffer management area CA has stored therein the number of commands stored in the command buffer area CBA but not yet executed, i.e., the number of stored commands CN, and the number of command regions, i.e., the number of storable commands AN, which indicates the number of write commands which can be stored in the command buffer area CBA. The data buffer management area DA has stored therein the free segment number FSEG, which indicates the number of free segments of the data buffer in units (1 Kbyte units), the buffer address BADR, which indicates the head address of the buffer during data transfer wherein writing is performed on the data buffer, and the maximum block length MAXL, which indicates the maximum length of the data block covered by the processing.

The timer unit 31c issues timing signals required for the processing by the MPU 30 and is constituted by a Motorola MC68B40 or a Fujitsu MB68B40.

The drive interface circuit 32a handles transfer of control signals with the drive control circuit 2 and has a drive interface control logic circuit 32a1, a drive and receive circuit 32a2, and connectors 32a3 and 32a4. The host interface circuit 32b handles transfer of control signals etc. with the host controller and has a host interface control logic circuit 32b1, a drive and receive circuit 32b2, and connectors 32b3 and 32b4. The signal interfaces in the driver interface circuit 32a and the host interface circuit 32b are the same. Connected to the driver interface circuit 32a, the host interface circuit 32b, the buffer memory 34 are a buffer storage data register (BSDR) 32c and a buffer load data register (BLDR) 32d.

The data transfer control circuit 33 controls the data buffer and controls the transfer of data between the host controller and the drive control unit 2. It issued a data transfer request signal to the host controller, receives data transfer request signals from the drive control unit 2, and controls transfer of data based thereon. The data buffer 34 is controlled by the data transfer control circuit 33, stores write data from the host controller, and transfers the same to the drive control unit 2, and, conversely, stores read data from the drive control unit 2 and transfers the same to the host controller. It has, for example, a capacity of 256 Kbytes. The data bus 35 connects the MPU 30, the EPROM 31a, the RAM 31b, the drive interface circuit 32a, the host interface circuit 32b, and the data transfer control circuit 33 and handles the transfer of commands and data therebetween.

The data transfer control circuit 33 has a store address counter SCTR for the data buffer, a load address counter LCTR for the data buffer, a load byte counter BCTR for loading, etc.

Reference numeral 36a is a control signal line which transmits commands etc. to the drive control unit 2 and, conversely, receives statuses etc. from the drive control unit 2. Reference numeral 36b is an EWA detection signal line for the EWA signal from the drive control unit 2. Reference numeral 36c is an interruption line which transmits interrupt signals therethrough from the drive controller to the MPU 30 by the drive interface circuit 32a. Reference numeral 37a is a data transfer request signal line, which transmits data transfer request signals from the drive control unit 2 to the data transfer control circuit 33. Reference numeral 37b is a write data bus, which transmits write data from the data buffer 34 to the drive control unit 2. Reference numeral 37c is a read data bus, which transmits read data from the drive control unit 2 to the data buffer 34. Reference numeral 38 is a control signal line, which handles transfer of commands and statuses with the host controller. Reference numeral 39a is a data transfer request signal line, which transmits data transfer request signals to a host controller. Reference numeral 39b is a write data bus, which transmits write data from a host controller to the data buffer 34. Reference numeral 39c is a read data bus, which transmits read data to the host controller from the data buffer 34.

Therefore, the MPU 30 performs read and write operations via the data bus 35 among the RAM 31b, host interface circuit 32b, drive interface circuit 32a, and data transfer control circuit 33.

Specifically, the host interface circuit 32b handles transfer of commands and statuses through the host controller and control signal line 38 under the control of the MPU 30, and the drive interface circuit 32a handles transfer of commands and statuses through the drive control unit 2 and control signal line 36a under the control of the MPU 30.

On the other hand, the data transfer control circuit 33, under the instructions of the MPU 30, issues a data transfer request via the data transfer request signal line 39a to the host controller. In accordance with this, the host controller sends the write data via the write data bus 39b to the data buffer 34 for storage of the same. Further, under the data transfer request sent from the drive control unit 2 via the data transfer request signal line 37a, the data transfer control circuit 33 transfers write data from the data buffer 34 via the write data bus 37b to the drive control unit 2.

Further, the data transfer control circuit 33, under the instructions of the MPU 30, stores read data sent from the drive control unit 2 via the read data bus 37c in the data buffer 34 and sends read data from the data buffer 34 to the host controller via the read data bus 39c.

Further, the drive control unit 2 detects the EWA by monitoring of the running position through the rotary encoder 19a to issue an EWA signal to the signal line 36b. Following this EWA detection, a TWA signal is sent to the signal line 36a.

An explanation will now be given of the prefetch control unit 3, host controller 203, and drive control unit 2 with reference to FIGS. 8a to 8j.

When a startup signal GO and command signal CMND from the host controller are given, the MPU 30 responds via the host interface circuit 32b with a "format busy" response signal FBY to the host controller. Further, it gives a "data busy" signal DBY indicating the execution of a command to the host controller.

If the command signal CMND is a write command WR accompanied with data transfer, a write strobe pulse WSTB is given from the data transfer control circuit 33 to the host controller. Write data WR DATA is transferred from the host controller in synchronization with the write strobe pulse WSTB and successively stored in the data buffer 34. The host controller sends a last word signal LWD to the data transfer control circuit 33 simultaneously with the final write data. When the control circuit 33 detects the last word signal LWD, it stops the transmission of the write strobe pulse WSTB to end the data transfer, gives a status signal STATUS indicating the normal/abnormal state of the reception operation to the host conroller, turns off the data busy signal DBY, and ends the data transfer operation. Further, the received command is stored in the command buffer CBUF.

On the other hand, if the command is a read command, read data RD DATA read from the tape drive 1 is sent along with a read strobe pulse RSTRB to the host controller. The end of the read data transfer is notified to the host controller by the turning off of the data busy signal DBY.

The same type of interface procedure is performed between the prefetch control unit 3 and the drive 1, as shown in FIGS. 9a to 9e. When the command buffer CBUF and the data buffer 34 of the prefetch control unit 3 are full, even if a startup signal GO and write commands arrive from the host controller, the data transfer will be kept waiting until the command buffer CBUF and data buffer 34 are free so that data busy signal DBY is not given.

Below, an explanation will be given of the operation of the prefetch control unit 3 based on the prefetch control and the suspension of the prefetch control at the EOT. Prefetch control is based, as mentioned above, on the number of commands. Suspension of prefetch control is performed in accordance with the EWA signal, whereupon the capacity is reduced at one time to the minimum limit CBE, as shown by the solid line of FIG. 10b and the flow chart of FIG. 11 or else the capacity is gradually reduced in accordance with the receipt of commands, as shown by the broken line of FIG. 10b and the flow chart of FIG. 12.

A more detailed explanation will now be made of the processing shown in FIG. 10a to FIG. 12 with reference to the flow charts.

Figure 13:
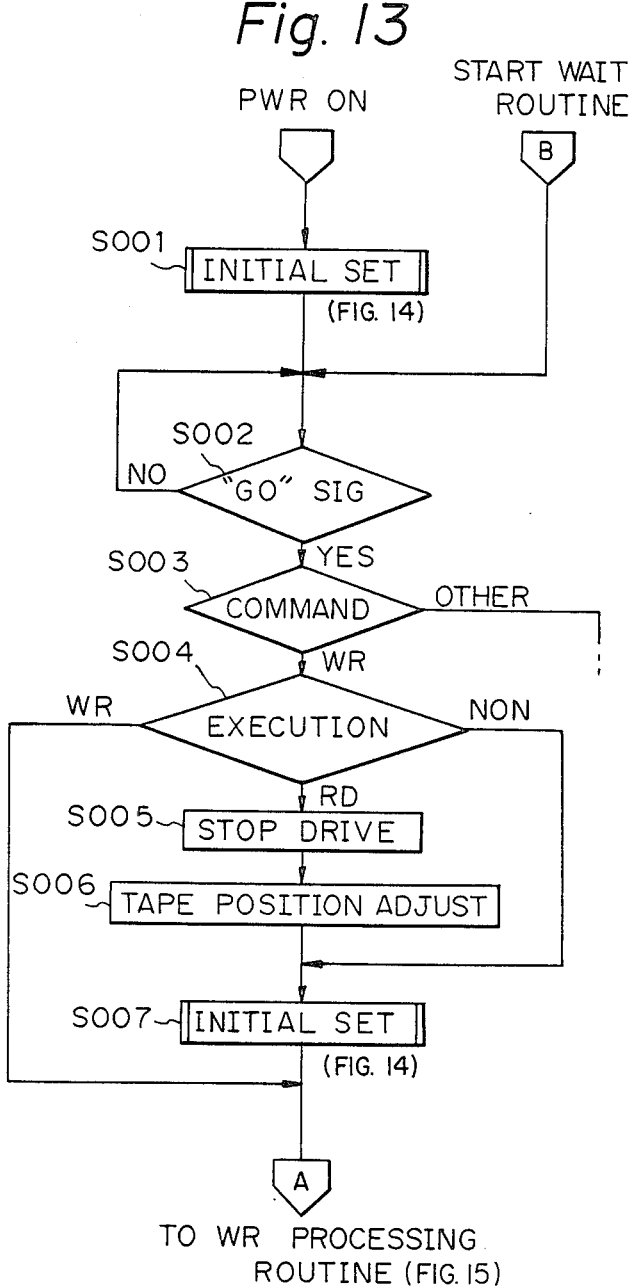
FIG. 13 and FIG. 14 are flow charts illustrating startup in the first embodiment of the present invention.
Figure 14:
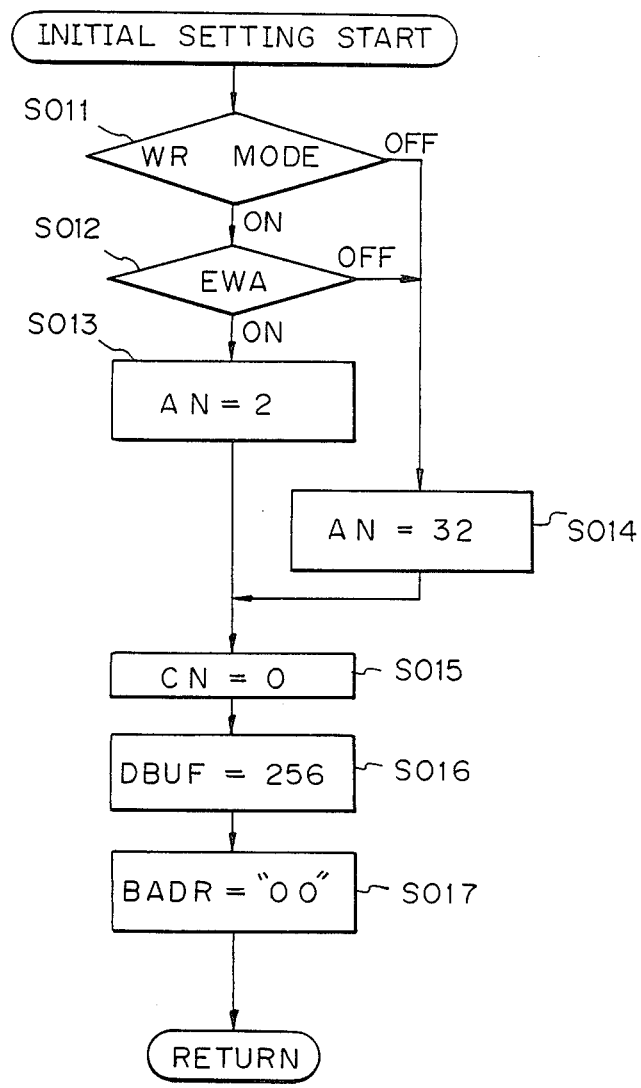

FIG. 13 shows the startup processing routine from the host, while FIG. 14 shows the initialization processing routine.

Step S001 (FIG. 13)

When the power is turned on, the initialization of FIG. 14 is performed.

Steps S011 to S017 (FIG. 14)

First, the MPU 30 investigates whether the processing mode is the write mode. If the processing mode is not the write mode, the number of storable commands AN of the command buffer management area CA of the RAM 31b is set to the maximum 32 (S014). If the write mode, the MPU 30 investigates via the drive interface circuit 32a if the EWA signal of the signal line 36b is on or off. If the EWA has still not been reached and thus the EWA signal is off, the number of storable commands AN of the command buffer management area CA of the RAM 31b is set to the maximum 32 just as above. If the EWA signal is on, the number of storable commands AN is set to the minimum 2 (S013).

Next, the MPU 30 clears the number of stored commands CN of the command buffer management area CA of the RAM 31b (S015), sets the buffer capacity (data buffer) of the data buffer management area DA to the maximum 256 (S016), sets the buffer address BADR to "00", and ends the initialization. Below, figures in quotation marks indicate hexadecimal values.

Step S002 (FIG. 13)

After the end of the initialization upon turning on of the power or during the startup wait routine from the host (S002), the MPU 30 investigates via the bus 34 the contents of the register of the host interface circuit 32b to determine if there is a startup from the host, i.e., a GO signal. If there is no startup from the host, the MPU 30 enters the startup wait state and repeats the routine.

Step S003

If it is judged that there is a startup from the host, i.e., a GO signal is received, the MPU 30 investigates via the bus 35 the contents of the register of the host interface circuit 32b to judge what the given command is.

If the given command is a read command or other command which is not a write operation, it is irrelevant to suspension of command prefetch control at the end of the magnetic tape, so the MPU 30 executes the processing routine.

Steps S004 to S007

If the given command is a write command, the MPU 30 investigates if the processing mode of the drive control unit 2 is for a read operation or write operation or if processing is being executed. If the processing mode is for a read operation, the drive processing is stopped (S005). In other words, when the drive control unit 2 ends the processing during execution, the MPU 30 ensures that no new processing is commanded and stops the read processing via the drive interface circuit 32a and the control line 36a to the drive control unit 2. Next, it issues a command (space or back space) for adjusting the position of the tape to the drive control unit 2 via the drive interface circuit 32a (S006).

After the end of step S006 or if the drive control unit 2 is not executing processing, the initialization shown in FIG. 14 is performed and the write processing routine (FIG. 15) is entered. If the processing mode at step S004 is for a write operation, the write processing routine is immediately entered.

As is clear from the above, if the startup from the host is a write command, the processing will change to write processing is being executed even during read processing. If write processing, the write processing will continue.

Next, an explanation will be given of write processing for a host.

Figure 15B:
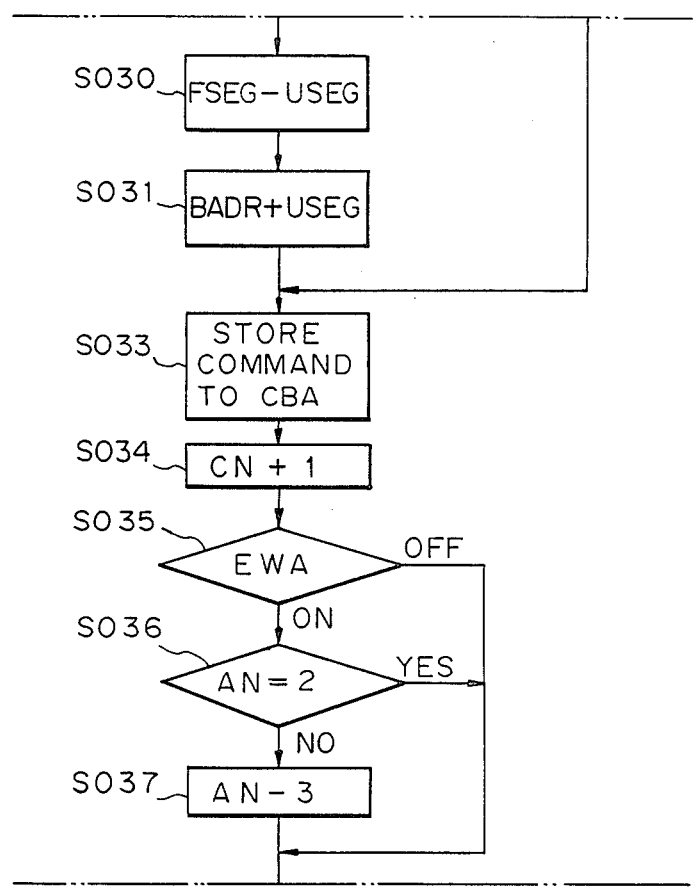
Figure 15C:
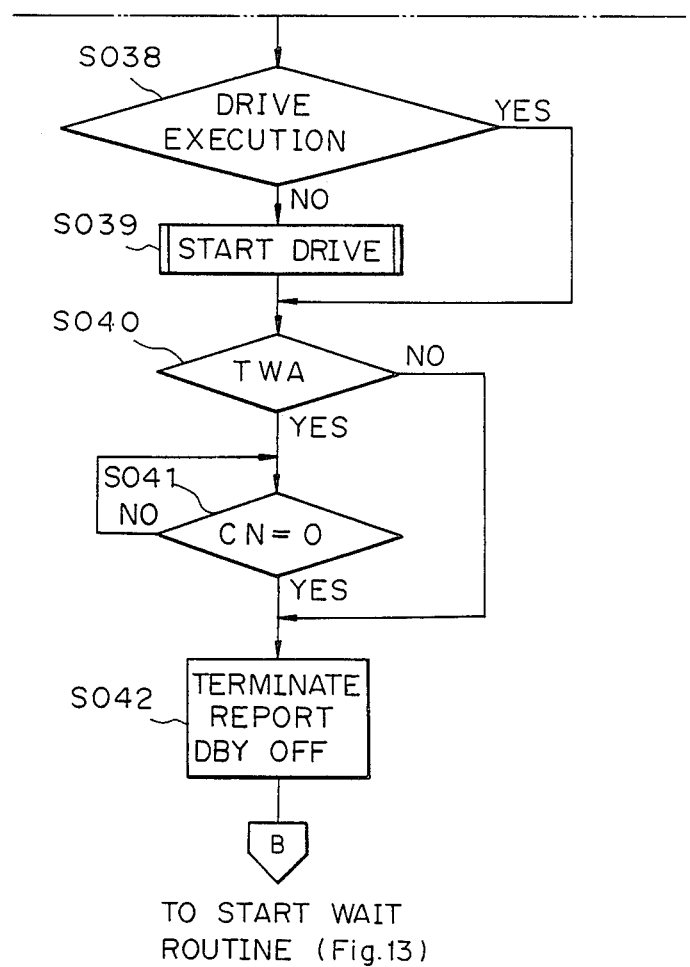

FIG. 15a to FIG. 15c is a flow chart of write processing for a host.

Steps S021 to S027

When started up by a write command from the host controller shown in FIG. 13, the MPU 30 reads out and compares the number of stored commands CN and the number of storable command AN of the command buffer managment area CA of the RAM 31b via the bus 35 (S021). If AN≦CN, i.e., a number of write commands greater than the number of storable commands is to be stored in the command buffer CBA, then storage of the write commands to the command buffer area CBA is suspended. On the other hand, if AN>CN, it is possible to store the write commands in the command buffer area CBA, so the MPU 30 investigates if the write commands concerned use the data buffer 34 (S022). If the commands are erase or write tape mark commands, which do not use the data buffer 34, it turns the data busy signal DBY on (S032) and proceeds to the command storage of step S033.

As shown in FIGS. 8a and 8b, if a startup signal (GO) and command (CMND) are given from the host and if the command is executable, the subordinate prefetch control unit 3 turns on the data busy signal DBY indicating that the command is being executed and returns the signal to the host. This relation is the same in the case where the prefetch control unit 3 is the host and the drive control unit 2 is the subordinate. Conversely, if the write command is a usual write command using the data buffer 3, the MPU 30 prepares to automatically transfer it to the data buffer 34. That is, first, the MPU 30 reads out the free segment number FSEG (parameter data buffer) and the maximum block length MAXL of the data buffer management area DA of the RAM 31b to investigate if the free segment number FSEG is larger than the maximum block length MAXL (S023). If the free segment number FSEG is less than the maximum block length MAXL, the MPU 30 suspends reception of the write data and waits until the data buffer 34 becomes free. If the free segment number FSEG is greater than or equal to the maximum block length MAXL, a clear-to-send signal is sent. Therefore, the above-mentioned data busy signal DBY is turned on (S024) and notification is given of clearance to transmit to the host controller. Next, the MPU 30 reads the buffer address BADR of the data buffer management area DA of the RAM 31b, sets it in the store address counter SCTR of the data transfer control circuit 33, and uses it to start up the data transfer control circuit 33.

The data transfer control circuit 33 then issues a data transfer request signal XFER-REQ by the data transfer request signal line 39a to the host controller, as shown by FIG. 8c. The host controller, then transfers write data WR DATA by the write data bus 39b to the data buffer 34 (FIG. 8g). In accordance with the address in the store address counter SACTR of the data transfer control circuit 33, the write data is stored in the data address 34. The store buffer counter SACTR is counted up each time 1 byte of write data is transferred.

When it is judged that the data transfer control circuit 33 has completed the data transfer (S027), the MPU 30 reads the store address counter SCTR of the data transfer control circuit 33 to calculate the difference with the buffer address of the data buffer management area DA and find the number of bytes of write data transferred (S028).

Steps S029 to S031

The MPU 30 updates the command buffer area CBA and the data buffer management area DA of the RAM 31b. First, the corresponding command portion of the command buffer area CBA of the RAM 31b has stored therein the buffer address BADR (that is, the head address of the write data) of the data buffer management area DA of the RAM 31b and the byte count BC of the write data calculated at step S028. Next, the free segment number FSEG of the data buffer management area DA of the RAM 31b is subtracted by the user segment number USEG of the data buffer 34 to update the free segment number FSEG (S030). Further, the buffer address BADR has added to it the used segment number USEG to update the buffer address BADR (S031).

Steps S033 to S037

The MPU 30 performs storage processing of the received write commands. First, the MPU 30 stores the received commands of the host interface circuit 32b in the command buffer area CBA of the RAM 31b (S033). Next, the MPU 30 increases the number of stored commands CN by one to update the CN and thus update the command buffer management area CA of the RAM 31b (S034).

Further, the MPU 30 investigates the drive interface circuit 32a to investigate if the EWA signal of the control line 36b is on or off (S035). If off, the magnetic tape 16 has not yet reached the EWA, so MPU 30 proceeds to step S038. On the other hand, if the EWA signal is on, the tape has reached the EWA, so it investigates if the number of storable commands AN of the command buffer management area CA of the RAM 31b is the minimum value of 2 (S038). If the minimum value, there is no need to revise the AN, so that MPU 30 proceeds to step S038. If AN is not the minimum value, it reduces AN by 3 to revise it (S037).

Figure 10A:
FIG. 10a to FIG. 12 are diagrams illustrating the principle of the first embodiment of the present invention.
Figure 10B:
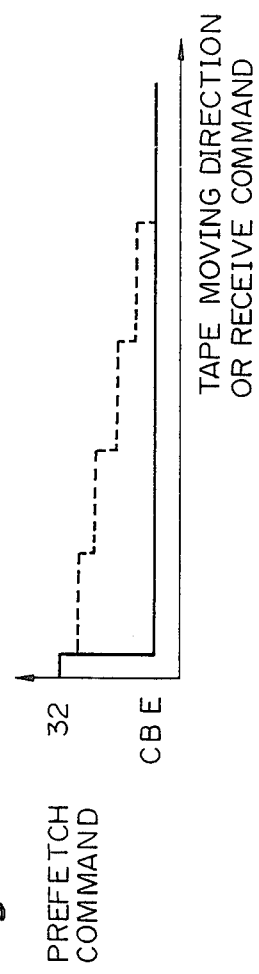

Therefore, when the EWA has arrived and the EWA signal is turned on, as shown by the broken line of FIG. 10b, the number of storable commands AN is reduced by 3 from the maximum 32 with each reception of a write command from the host controller, i.e., the storage number of commands is gradually reduced.

Steps S038 to S042

The MPU 30 investigates if the drive control unit 2 is executing processing (S038). If not executing processing (if stopped), it performs drive startup processing (S039).

If executing processing or if drive startup processing is being performed, the MPU 30 investigates via the drive interface circuit 32a whether a TWA signal, indicating that the drive control unit 2 has detected the EOT, is generated from the control line 36a (S040).

If the TWA signal is generated, the MPU 30 investigates if the number of stored commands CN (number of commands not yet executed) of the command buffer management area CA of the RAM 31b is zero (S041). If not zero, it waits until it becomes zero by execution of the drive. This is to enable synchronization in the processing after the EOT of commands from the host and commands executed by the drive. When the TWA signal is not issued or the CN becomes zero, the MPU 30 reports termination to the host controller by the host interface circuit 32b. It turns the data busy signal DBY off (S042) and returns to the startup wait routine of FIG. 13.

In this way, if there is a startup signal (GO) from the host controller and a write command is given first the MPU 30 investigates if the command is within the number of storable commands AN of the command buffer. If within the number of storable commands AN, it receives the command. If over the number of storable commands AN, it suspends reception of the command and does not give a data busy signal DBY to the host controller.

Figure 16:
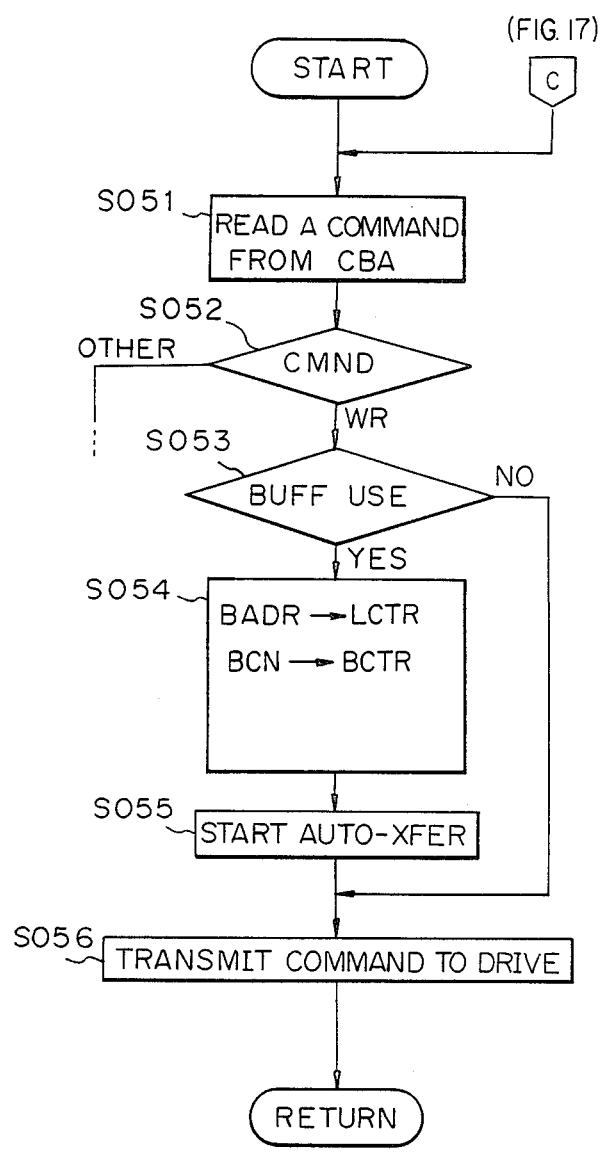
FIG. 16 and FIG. 17 are flow charts of write processing for a drive system in the first embodiment of the present invention.

In other words, as shown in FIG. 9a to FIG. 9e the MPU 30 does not give a data busy signal DBY until the drive side executes commands within the command buffer, as explained later with respect to FIG. 16, and the command to be received comes within the number of storable commands AN. When coming within the number of storable commands AN, the MPU 30 gives the data busy signal DBY and notifies the host controller of execution of processing.

When the EWA signal turns on, the number of storage commands AN is gradually reduced with each reception of a write command from the host controller. Further, when the TWA signal is issued, no termination report is issued until the number of stored commands CN becomes zero. Therefore, the number of storable commands AN is gradually reduced as shown by the broken line of FIG. 10(b).

Figure 17:
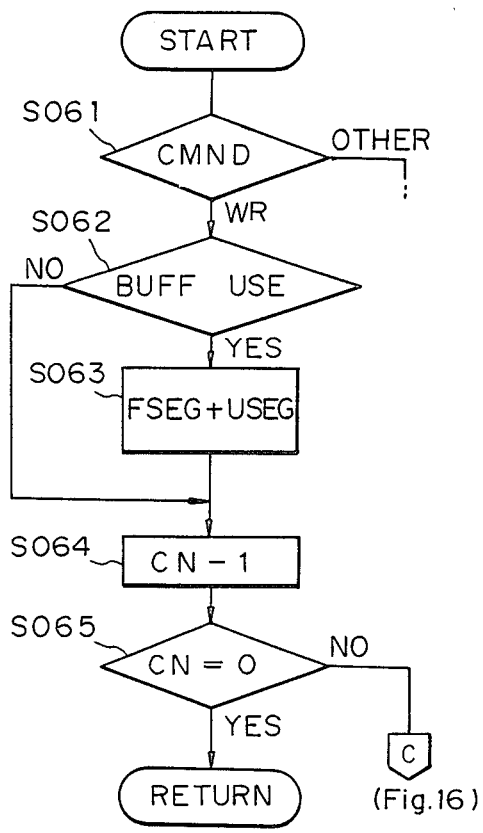

Next, an explanation will be made of the write processing of the drive using FIG. 16 and FIG. 17. FIG. 16 is a flow chart of the drive startup processing, and FIG. 17 is a flow chart of the processing for ending the drive processing.

Steps S051 to S056

The MPU 30, so as to start up the drive, reads next command to be executed from the command buffer area CBA of the RAM 31b (S051) and investigates whether it is a write command (S052). If not a write command, it enters the corresponding read processing routine. If a write command, the MPU 30 investigates if it is a command which uses the data buffer 34 (S053). If an erase, write tape mark, or other command not using the data buffer 34, it proceeds to step S056.

If a command using the data buffer 34, the MPU 30 sets the head address BADR and byte count number BCN of the command buffer area CBA of the RAM 31b in the load address counter LCTR and load byte counter BCTR of the data transfer control circuit 33 (S054). Further, the MPU 30 issues read commands and a startup signal (GO) via the drive interface circuit 32a by the control line 36a to the drive control unit 2 (S056).

The drive control unit 2 returns the data busy signal DBY and, if a command using the buffer, sends a data transfer request XFER-REQ, after the completion of the preparations for data transfer, by the data transfer request signal line 37a to the data transfer control circuit 33. The data transfer control circuit 33 sends from the buffer address BADR shown by the load address counter LCTR of the data buffer 34 write data WR DATA of a number of bytes of the load byte counter BCTR via the write data bus 37b to the drive control unit 2. The command is then executed to write on the magnetic tape 16. On the other hand, the MPU then returns to the routine of FIG. 13 after issuance of the command in step S056.

Next, in the drive control unit 2, when the execution of the write command is completed, a termination report is given via the control line 36a to the drive interface circuit 32a. The drive interface circuit 32a interrupt the MPU 30 with this to stop the processing of FIG. 11 to FIG. 13. The MPU 30, then starts the processing of FIG. 17.

Steps S061 to S065

First, the MPU 30 investigates if the command is a write command (S061). If not a write command, it enters the corresponding read processing routine. If a write command, it investigates if it is a command using the data buffer 34 (S062). If a command using the buffer, the free segment number FSEG (parameter data buffer) of the data buffer management area DA of the RAM 31b is added with the used segment number USEG to update the free segment number FSEG (S063). Next, after the updating or when the command does not use the data buffer 34, the number of stored commands CN of the command buffer management area CA of the RAM 31b is decreased by one to revise the CN (S064). Further, the MPU 30 investigates if the number of stored commands CN of the RAM 31b is zero (S065). If zero, it returns to the routine of FIG. 15. If not zero, processing after step S051 of FIG. 16 is executed. In this way, commands of the command buffer are successively executed asynchronously with the host controller.

In the above embodiment, the number of storable write commands is gradually reduced along with each reception of a write command from the host, but, as shown by the solid line in FIG. 10b and the illustration of FIG. 9, it can also be reduced all at once to the prefetching limit CBE. In this case, the processing is extremely simple.

As shown in FIG. 10b, if the storable number is reduced all at once to CBE, the prefetch control is restricted early. In other words, if the number is gradually reduced as shown by the broken line of FIG. 10b, the host controller does not have to wait very long before receiving the next command. As opposed to this, if the number is reduced all at once, the host controller cannot accept the next command until the drive executes a number of commands equal to the (number of stored commands)—(number of storable commands after reduction—1). Further, if the prefetching limit CBE is made too small, there would be the possibility the host controller would consider, through time monitoring, the elapse of time as a system abnormality. Therefore, it is necessary to appropriately set the CBE.

Figure 11:
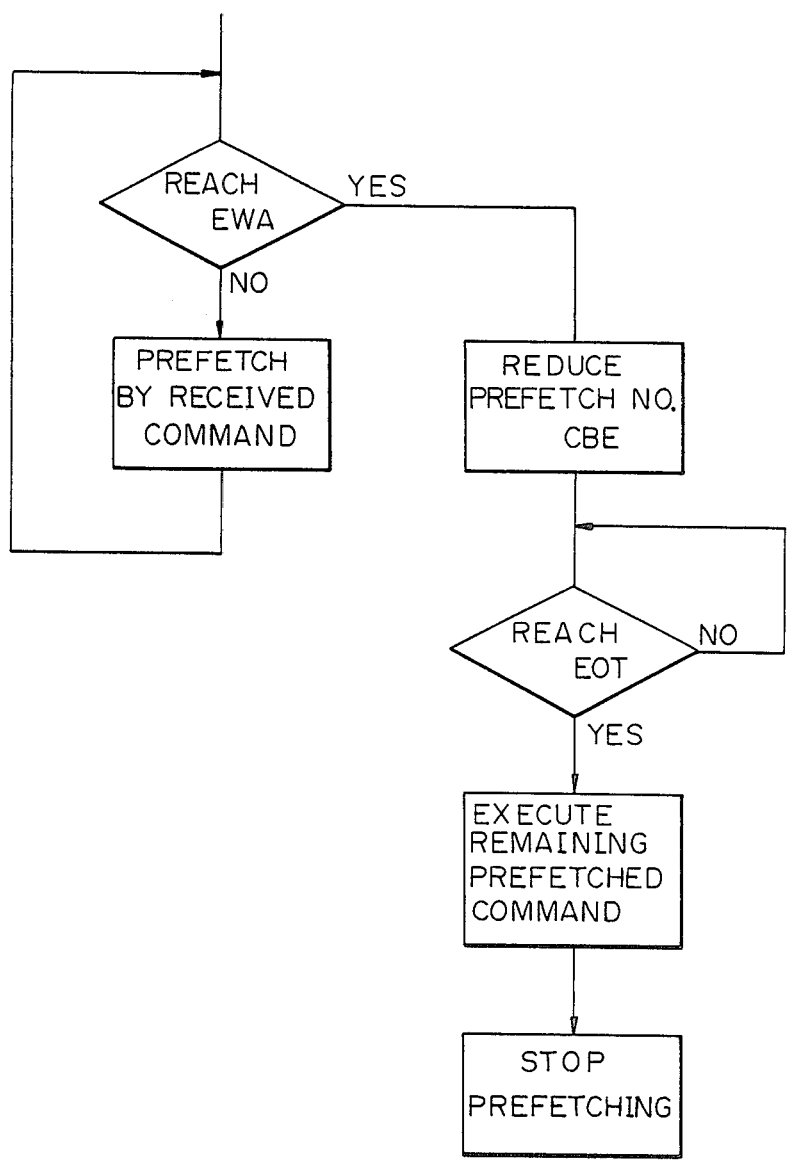
Figure 12:
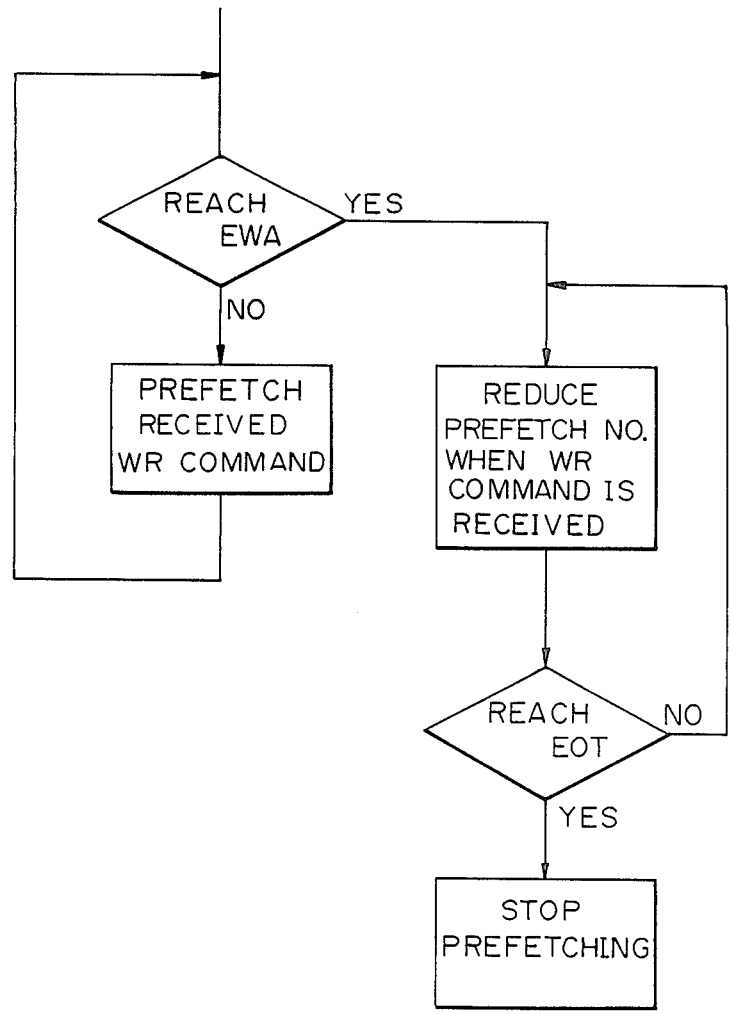

When the EOT of FIG. 2a is reached, as shown in FIG. 11 and FIG. 12, a TWA signal is issued from the driven control unit 2, prefetch control is stopped, and normal nonbuffered control is shifted to.

As explained above, according to this embodiment of the prevent invention, the write commands are restricted so as to enable execution of all write commands stored in a command buffer. Command prefetching by the magnetic tape system having such buffers can therefore be prevented from being inconvenienced by receiving write commands which it cannot execute due to the EOT being reached.

Next, a second embodiment of the present invention will be explained.

As mentioned above, an EWA signal is issued before the detection of the end of the magnetic tape, i.e., the EOT. The EWA signal is detected from the diameters of the tape wound on the tape reels in accordance with the ratio of the rotation angle of the magnetic tape reels per unit time and the amount of travel of the tape (measured by the idler). The EWA signal is issued, for example, approximately 20 meters before the EOT.

However, the rotation angle of the magnetic tape reels and the amount of travel of the tape obtained from the idler, which are used for detection of the EWA, cannot be measured at an accurary sufficient for control of the feed of the magnetic tape. In general magnetic tape systems, the diameter of tape wound which is detected is converted to a length of magnetic tape run and detection is only possible at approximately 25 meter intervals. Therefore, in the prior art, it has not been possible to finely designate the detection point of the EWA. Further, even at the minimum, the EWA signal is issued approximately 20 meters before the EOT, making the EWA from the detection of the EWA signal to the detection of the EOT signal unnecessarily long.

Just how far before the EOT signal detection control of the prefetchings of write commands is performed is determined by the number of prefetchable commands. So that the performance of the magnetic tape system is not lowered, the timing for control of the number of prefetchings of write commands has to be set to an appropriate amount. Therefore, if, like in the prior art, the number of commands from the host controller is limited in the EWA until the EOT detection, the host controller has to refrain from issuing commands until the limited data buffer becomes free. The number of prefetchings of commands is limited, causing reduction of the performance of streaming operation of the magnetic tape system.

The principle of the present invention which resolves this problem will now be explained with reference to FIG. 18a to FIG. 19.

In the present invention, if the magnetic tape drive unit 1 runs the magnetic tape 16 and detects the EWA of the magnetic tape, the control unit CT counts the distance magnetic tape run from the EWA. When the count ECTR reaches a predetermined value EPTR, it considers that the EOT has been detected and considers that the actual EOT has been reached. An LEOT signal is issued and the host controller notified. This LEOT has the same effect as a usual EOT detection. Using this, treatment for the EOT is performed before the EOT marker actually provided on the magnetic tape is detected.

Figure 18A:
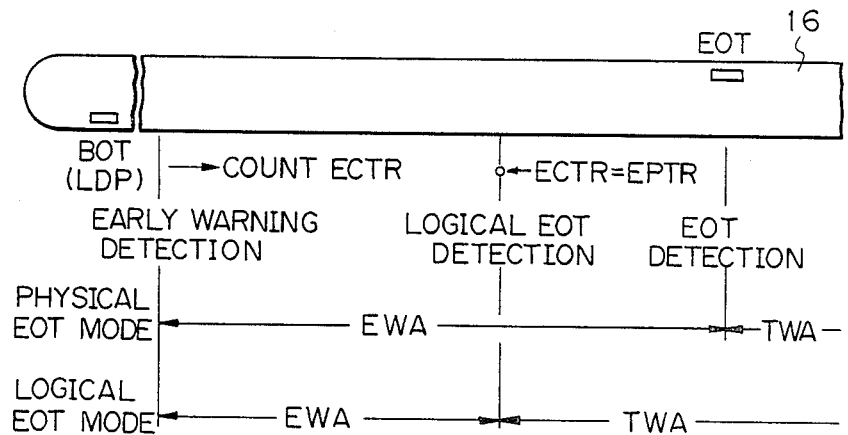
FIG. 18a to FIG. 19 are diagrams illustrating the principle of a second embodiment of the present invention.
Figure 18B:
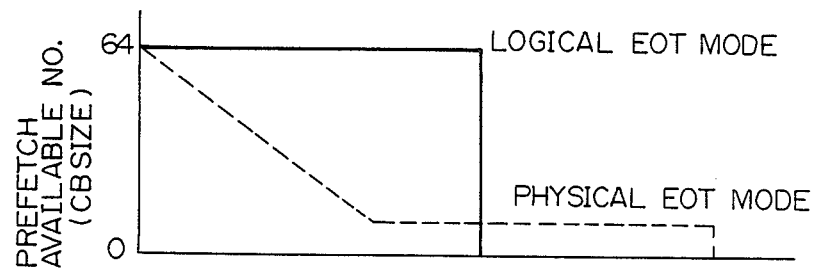
Figure 18C:
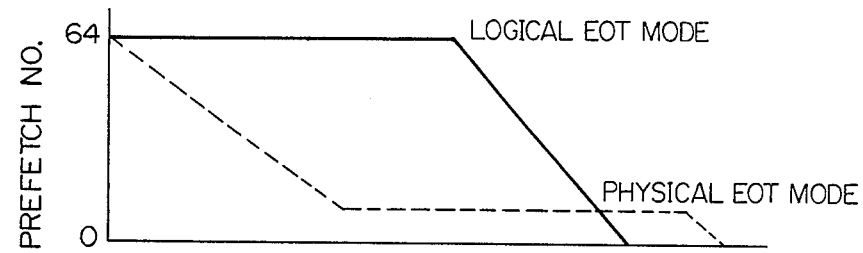
Figure 19:
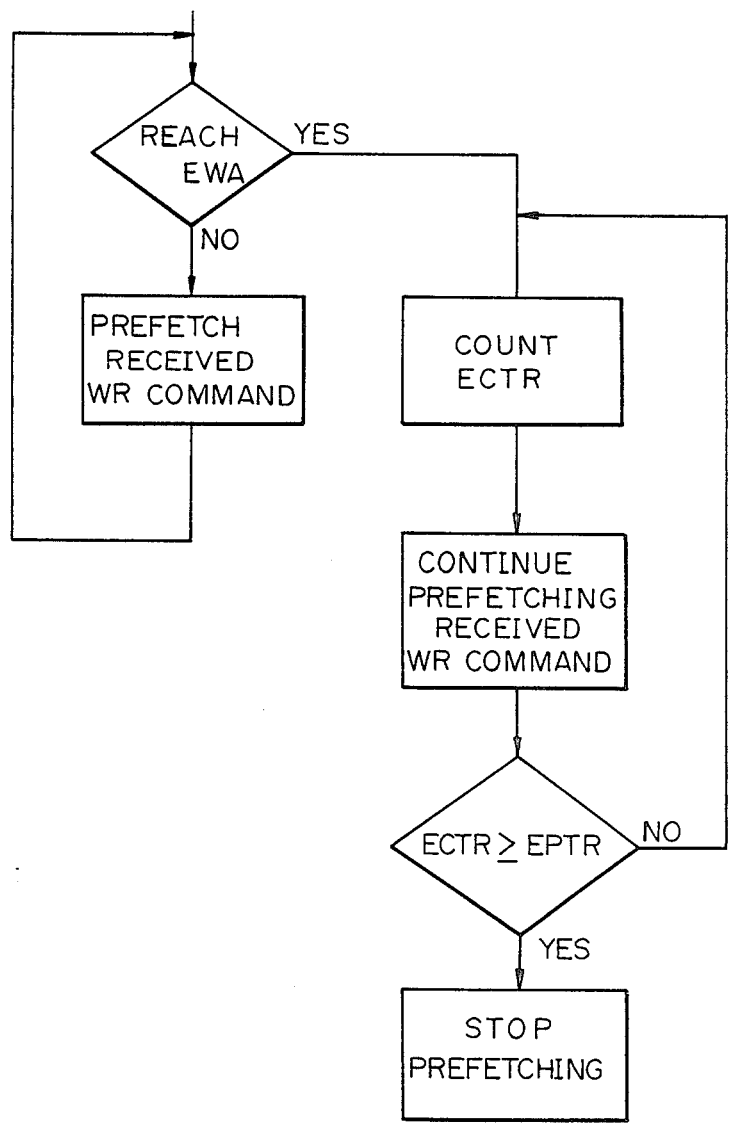

In the present invention, since an LEOT is obtained, the EOT is detected at an earlier time, enabling all the prefetched write commands to be executed, as shown in FIG. 18a. The TWA for the so-called physical EOT mode, explained with reference to FIG. 8a to FIG. 10, can thus be lengthened. Therefore, the number of blocks able to be written into the TWA can be increased, so that, as shown in FIG. 18b, there is no need to reduce the number of prefetchings of write commands from the point of detection of the EWA. Consequently, the host controller can prevent a decline in performance of streaming operation since there is no limit on prefetchings of write commands in the EWA. That is, as shown in FIG. 18c, up until close to the EOT, the number of prefetchings of commands is increased as much as possible. When the EOT is approached, the number of writable operations is reduced. Due to this, there is no illegal writing in the TWA and it is possible to prevent a reduction in performance.

Below, a more detailed explanation will be given of this embodiment of the present invention. The constitutions of FIG. 4 to FIG. 7 basically apply to the present embodiment except for the following points.

FIG. 20 is a flow chart of the startup processing of the operation of an embodiment of the present invention, and FIG. 21 to FIG. 23 are flow charts of the initialization in FIG. 20.

Steps S101 to S102

When the power is turned on, the MPU 30 investigates the write recording density setting of the drive of the host controller 203 or the operator panel 24 via the drive interface circuit 32a and a set of termination processing modes and stores the write recording density setting of the drive to the write recording density of the area EA of the RAM 31b and sets the above mode to the EOT mode area. In this embodiment, the write recording density is 6250 rpi or 1600 rpi. The initialization (1) shown in FIG. 21 is performed. That is, since no command is yet given, the MPU 30 clears the command buffer stack CBSTK of the command buffer management area CA of the RAM 31b and sets the command buffer stack size CBSIZE to the maximum 64 (S151). Next, the MPU 30 sets the free segment number FSEG of the data buffer management area DA to the maximum 256 units (since one unit indicates 1 Kbyte, a maximum 256 Kbytes) and sets the buffer address BADR to the initial address "00". The maximum block length MAXL of the data buffer management area DA is set to the minimum 8 units (since one unit indicates 1 Kbyte, 8 Kbytes) (S152). The LEOT flag of the area EA is turned off (S153) and the initialization (1) is ended.

Steps S103 to S104

When the power is turned on or after the end of initialization after execution of a rewindg command REW or unload command UNL or in the startup wait routine from the host, the MPU 30 investigates via the bus 35 and via the drive interface circuit 32a if the state if the ON-LINE state where the magnetic tape is set on the feed reel 12.

If the ON-LINE state, the MPU 30 investigates via the bus 35 the contents of the register of the host interface circuit 32b and investigates whether an REW command or UNL command has arrived from the host.

Steps S131 to S134

If the REW command or UNL command has arrived, the MPU 30 investigates if the the processing mode of the drive control unit 2 is for a read operation, write operation, or is currently under execution.

If the processing mode is for a read operation, the prereading of the drive 1 is stopped. That is, after the drive control unit has ended the processing under execution, the MPU 30 ensures that no new processing is commanded and stops the read processing via the drive interface circuit 32a from the control line 36a to the drive control unit 2. On the other hand, if the processing mode is for a write operation, all the write commands in the command buffer CBUF are executed.

After the execution of all the commands (S133), when there is no processing under execution or after the prereading processing of the drive has stopped (S132), the MPU 30 sends via the drive interface circuit 32a a REW command for rewinding the magnetic tape to the beginning-of-tape point (BOT) or a UNL command for unloading the magnetic tape, executes the same, and returns to the initialization (1) of step S102.

Step S105

If no REW command or UNL command has arrived, the MPU 30 investigates via the bus 35 the contents of the register of the host interface circuit 32b and investigates if there is a startup signal (GO) (FIG. 6a) from the host. If there is no startup signal from the host, the MPU 30 waits for a startup and returns to step S103.

Step S106

If it is judged there is a startup from the host, i.e., the GO signal has been received, the MPU 30 investigates via the bus 35 the contents of the register of the host interface circuit 32b and judges what the command code given is.

If the given command code is for a read operation, the MPU 30 proceeds to step S141. If for a recording density setting operation, it proceeds to step S121 where it executes the processing routine.

Steps S121 to S126

If the command is for a recording density setting operation, the MPU 30 turns the data busy signal DBY on via the host interface circuit 32b for notification and, further, investigates via the drive interface circuit 32a if the magnetic tape 16 of the drive 1 is at the load point LDP, i.e., the BOT position.

If at the load point LDP, the recording density setting command is valid, so the MPU 30 executes the recording density setting command on the drive via the drive interface circuit 32a, then sets the recording density designated by the host in the recording density store portion of the mode management area EA of the RAM 31b. If not at the load point LDP, the recording density setting command is invalid, so there is no need to execute the recording density setting command on the drive or to set the write recording density. Next, the MPU 30 reports the completion to the host via the drive interface circuit 32b, turns off the data busy signal DBY, and returns to step S103.

Steps S107 to S111

If the given command code is for a write operation, the MPU 30 investigates if the processing mode of the drive control unit 2 is for a read operation, write operation, or is under execution. If the processing mode is for a read operation, it stops the prereading of the drive 1. That is, after the drive control unit has ended the processing under execution, the MPU 30 ensures that no new processing is commanded and stops the read processing via the drive interface circuit 32a from the control line 36a to the drive control unit 2.

Next, the initialization (2) shown in FIG. 22 is executed. That is, the MPU 30 clears the command stack CBSTK of the command buffer managment area CA of the RAM 31b (S161) and sets the free segment number FSEG to the maximum 256 and the buffer address BADR to "00" (S162).

After the end of the above processing or during execution by the drive control unit 2, the buffer size is set in the initialization (3) of FIG. 23. First, the MPU 30 investigates via the drive interface circuit 32a if the EWA signal of the signal line 36b is on or off (S171). If off (the EWA has not yet arrived, it turns the LEOT flag of the area EA of the RAM 31b on and clears the running counter ECTR (S174). On the other hand, if the EWA signal is on, it investigates if the LEOT flag of the RAM 31b is on (YES) or off (N) (S172). If the LEOT flag is off, it converts the limit CBE of the command buffer management area CA to the command buffer size CBSIZE, and then returns (S173). Conversely, if the LEO flag is on or after the afore-mentionend running counter ECTR is cleared, the MPU 30 sets the command buffer size CBSIZE of the command buffer management area CA of the RAM 31b to the maximum 64 and returns (S175).

Step S111

The MPU 30, to adjust the tape position, issues a tape position adjustment command to the drive control unit 2 (space or back space) via the drive interface circuit 32a. It then proceeds to the later mentioned write processing routine. On the other hand, if the processing mode at step S107 was for a write operation, the MPU 30 immediately proceeds to the write processing mode.

Steps S141 to S147

If the transferred command is for a read operation, the MPU 30 investigates whether the processing mode of the drive control unit 2 is for a read operation, a write operation, or is under execution. If the processing mode is for a read operation, the MPU 30 first investigates if the read direction matches, i.e., if it is the forward direction in the case of a forward direction or the back direction in the case of a back direction. If the read direction does not match, the prereading processing of the drive 1 is stopped. That is, after the drive control unit has ended the processing under execution, the MPU 30 ensures that no new processing is commanded and stops the read processing via the drive interface circuit 32a from the control line 36a to the drive control unit 2.

Further, the MPU 30 executes the same initialization (2) as mentioned with reference to step 109 (S144) and then performs adjustment of the tape position in the same way as mentioned with reference to step S111. On the other hand, if the processing mode is for a write operation, all the write commands in the command buffer CBUF are executed (S146).

After the execution of all the commands, when there is no processing under execution or after the drive processing has stopped, the afore-mentioned prereading command is set in the read command register RC of the RAM 31b. After the setting or if the read direction matches, the read processing routine is entered.

Therefore, if the startup from the host is a write command, the MPU 30 switches to write processing even if executing read processing. If executing a write command, it continues the write processing.

At the initialization (1), the maximum block length MAXL is set to the minimum 8 units. At the initialization (1) or (2), the command stack CBSTK is set to zero, the free segment number ESEG of the data buffer to the maximum 256, and the buffer address BADR to "00". Further, at the initialization (3), the command buffer size CBSIZE is set to the maximum 64 or the final limit CBE in accordance with the on/off state of the LEOT mode. Further, the recording density at the time of writing from the load point LDP is set to the area EA of the RAM 31b.

FIG. 24 is a flow chart of the write operation for a host. Each step of the processing will be explained below.

Steps S200 to S203

Figure 20B:
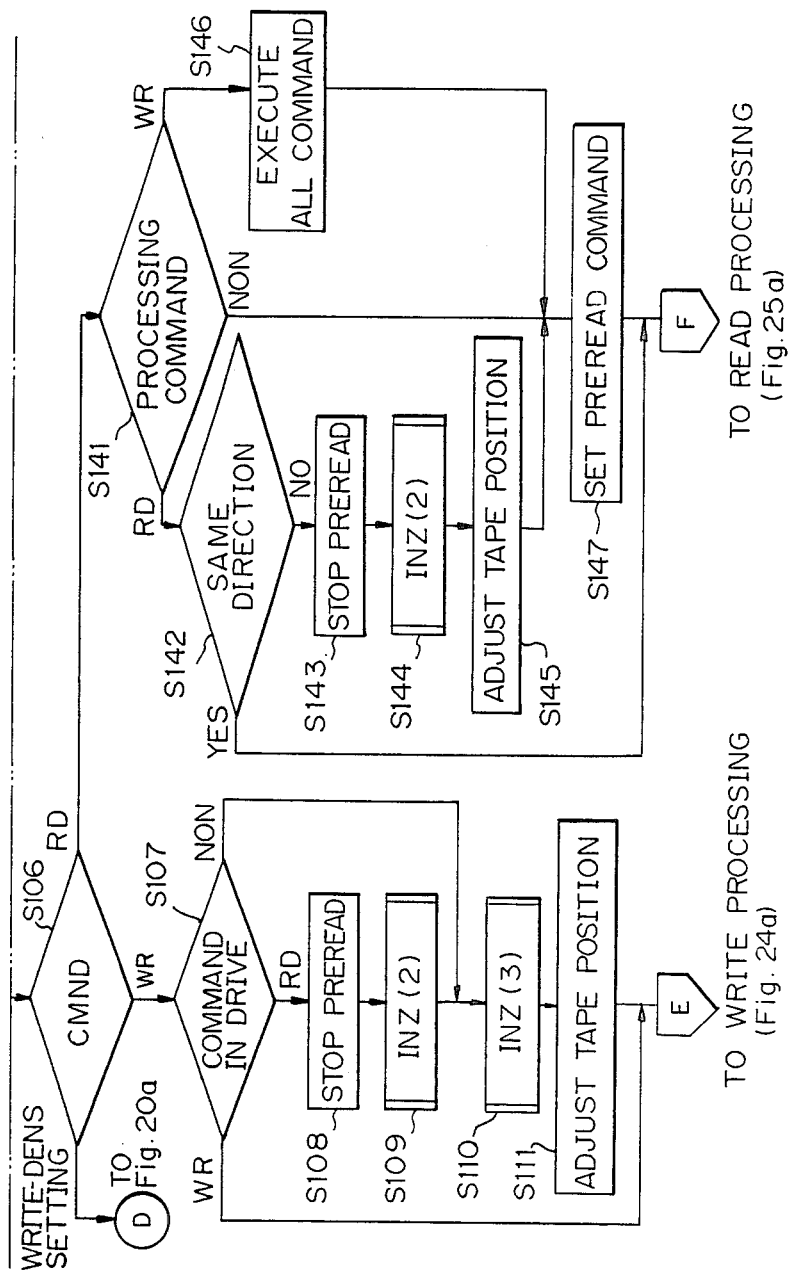

When started up by a write command from the host controller shown in FIG. 20b, the MPU 30 investigates whether the write comamnd is storage by reading out the command stack CBSTK and the command buffer size CBSIZE of the command buffer management area CA of the RAM 31b via the bus 35 and comparing the same. If CBSIZE≦CBSTK, i.e., the write command to be stored in the command buffer CBUF is larger than the storable number of commands, the storage of the write command to the command buffer CBUF is suspended.

On the other hand, if CBSIZE>CBSTK, the write command can be stored in the command buffer CBUF, so the MPU 30 investigates if the write command uses the data buffer 34. If an erase, write tape mark, or other command wherein write data is not sent from the host controller and which does not use the data buffer 34, it turns the data busy signal DBY on and proceeds to the initialization step of the limit CBE.

If a startup signal (GO) and command are given from the host as shown in FIG. 20a and FIG. 20b and if that command is executable, the prefetch control unit 3 turns on the data busy signal DBY indicating the execution state and returns it to the host. This relation also holds in the case where the prefetch control unit 3 is the host and the drive control unit 2 the subordinate.

Conversely, if the write command is a usual write command using the data buffer 34, the MPU 30 judges whether to permit automatic transfer to the data buffer 34. That is, first, the MPU 30 reads out the free segment number FSEG and the maximum block length MAXL of the data buffer management area DA of the RAM 31b and investigates if the free segment number FESG is equal to or greater than the maximum block length MAXL. If the free segment number FSEG is less than the maximum block length MAXL, the reception of the write data is suspended and the MPU 30 waits until the amount of the maximum block length MAXL becomes free. If the free segment number FSEG is equal to or greater than the maximum block length MAXL, it allows the transfer. Therefore, it turns on the data busy signal DBY and gives notification of the permission to transfer to the host controller.

Step S204 to S207

The MPU 30 investigates via the data interface circuit 32a if the magnetic tape 16 of the drive 1 is at the load point LDP. If not at the load point LDP, since the limit CBE is already set, the MPU 30 proceeds to the automatic transfer step S208.

On the other hand, if at the load pont LDP, it initializes the limit CBE in accordance with the write recording density. That is, the MPU 30 investigates the write recording density of the mode area EA of the RAM 31b and initializes 8 as the limit CBE of the command buffer management area CA of the RAM 31b if the write recording density is 1600 rpi and 16 as the limit CBE if 6250 rpi and then proceeds to step S208.

Step S208 to S214

The MPU 30 investigates if the write command concerned uses the data buffer 34. If it does not use the data buffer 34, the MPU 30 proceeds to step S225. On the other hand, if the write command uses data buffer 34 the MPU 30 reads out the buffer address BADR of the data buffer management area DA of the RAM 31b, sets in it the store address counter SCTR of the data transfer control circuit 33, and starts up the data transfer control circuit 33. By this, the data transfer control circuit 33 issues a data transfer request by the data transfer control signal line 39a to the host controller. Therefore, the host controller transfers the write data by the write data bus 39b to the data buffer 34. In accordance with the address of the store address counter SCTR of the data transfer control circuit 33, the write data is stored in the data buffer 34. The store address counter SCTR counts up each time one byte of write data is transferred.

When it judges the data transfer control circuit 33 has ended its data transfer, the MPU 30 reads the store address counter SCTR of the data transfer control circuit 33, calculates the difference with the buffer address BADR of the data buffer management area DA, and finds the count of the bytes of write data transferred.

Next, the MPU 30 updates the command buffer CBUF and the data buffer management area DA of the RAM 31b. First, the corresponding command portion of the command buffer CBUF of the RAM 31b has stored therein the buffer address BADR (that is, the head address of the write data) of the data buffer management area DA of the RAM 31b and the calculated count of the bytes of the write data.

Next, the free segment number of the data buffer management area DA of the RAM 31b is subtracted by the used segment number USEG of the data buffer 34 to update the free segment number FSEG. Further, the buffer address BADR is added with the used segment number USEG to update the head address BADR.

Steps S215 to S224

The MPU 30 compares the afore-mentioned used segment number USEG indicating the number of segments used (block length received) and the maximum block length MAXL of the data buffer management area DA of the RAM 31b.

If this comparison shows that the used segment number USEG is greater than the maximum block length MAXL, the maximum block length MAXL of the data buffer management area DA is changed to the used segment number USEG. Further, the limit CBE is changed in accordance with the recording density and the maximum block length MAXL.

That is, the MPU 30 reads out the write recording density of the mode area EA and the maximum block length MAXL of the data buffer management area DA of the RAM 31. If the recording density is 1600 rpi, the limit is made the minimum 2 if the maximum block length MAXL is greater than 16 and is made 4 if the maximum block length MAXL is less than or equal to 16.

In the same way, when the recording density is 6250 rpi, the limit is made 2 if the maximum block length MAXL is greater than 32, is made 4 if the maximum block length MAXL is between 17 and 32, and is made 8 if the maximum block length MAXL is less than or equal to 16.

Conversely, if the used segment number USEG is less than the maximum block length MAXL (S216), the maximum block length MAXL and the limit CBE are not revised and the routine proceeds to step S225.

Steps S225 to S230

The MPU 30 performs storage processing of the received write command. First the MPU 30 stores in the command buffer CBUF of the RAM 31b the received command of the host interface circuit 32b (S225). Next, the MPU 30, to revise the command buffer management area CA of the RAM 31b, adds 1 to the command stack CBSTK to update the CBSTK (S226). Further, the MPU 30 investigates the drive interface circuit 32a to investigate if the EWA signal of the control line 36b is on or off (S227). If off, the magnetic tape 16 has not reached the EWA, so the routine proceeds to step S231.

On the other hand, if the EWA signal is on, the tape has reached the EWA, so that MPU 30 investigates the LEOT flat of the mode area EA of the RAM 31b (S228). If in the LEOT mode, there is no need for modification of the command buffer size CBSIZE, so the routine proceeds to step S231.

Conversely, if not in the LEOT mode, the MPU 30 reads out and compares the command buffer size CBSIZE and the limit CBE of the area CA of the RAM 31b (S229). If the command buffer size CBSIZE is less than the limit CBE, the command buffer size CBSIZE is not changed and the routine proceeds to step S231. Conversely, if the command buffer size CBSIZE is larger than the final limit, the command buffer size CBSIZE is subtracted by 2 to update the command buffer size CBSIZE (S230) and the routine proceeds to step S231.

Steps S231 to S237

The MPU 30 investigates if the drive control unit 2 is executing processing (S231). If it is not executing processing (if stopped), it performs the later mentioned drive startup processing (S232).

During execution of processing or if drive startup processing is being performed, the MPU 30 investigates via the drive interface circuit 32a if a TWA signal indicating that the drive control unit 2 has detected the EOT has been issued from the control line 36a (S233). If in the LEOT mode, the MPU 30 investigates if the running counter ECTR, revised by the later mentioned drive processing, exceeds a predetermined value EPTR and the LEOT detection point has been reached (Ssee). If a TWA signal has been issued upon EOT detection or if the LEOT has been detected (on), the MPU 30 investigates if the command stack (number of unexecuted commands) CBSTK of the command buffer management area CA of the RAM 31b is zero (S234). If not zero, the MPU 30 waits until it becomes zero through execution of the drive. This is to ensure synchronization of the commands from the host and commands executed by the drive during pocessing after the EOT and LEOT.

When no TWA signal is issued or when the LEOT flag is off, the MPU 30 investigates from the state of the data transfer control circuit 33 whether the write data transfer of the afore-mentioned steps S209 to S210 has overflowed due to an insufficient free segment number FSEG of the data buffer 34 (S235). In the case of an overflow, to obtain synchronization as mentioned above, the MPU 30 investigates if the command stack (number of unexecuted commands) CBSTK of the command buffer management area CA of the RAM 31b is zero (S234). If not zero, the MPU 30 waits until it becomes zero by execution of the drive.

If there is no buffer overflow or when the CBSTK becomes zero, the MPU 30 reports the termination (normal reception or error) to the shot controller by the host interface circuit 32b, turns off the data busy signal DBY (S236, S237), and returns to the startup wait routine of FIG. 20a.

FIG. 25 is a flow chart of read processing for a host. The operation will be explained below.

Step S301 to S306

When, by steps S141 to S147 of the startup processing of FIG. 20b, a read command is received and startup processing is performed, the MPU 30 subtracts 1 from the command stack CBSTK of the command buffer management area CA of the RAM 31b.

The MPU 30 investigates if the drive control unit 2 is executing processing. If stopped, it performs the drive startup processing mentioned later with reference to FIG. 26.

The MPU 30 investigates if the command stack (number of preread commands) CBSTK is 0 or more. If a negative value less than 0, read data is not being transferred to the data buffer 34, so the MPU 30 waits until the CBSTK is 0 or more, i.e., one block or more of read data is transferred to the data buffer 34 from the drive 1.

When the command stack number CBSTK is 0 or more, the MPU 30 turns the data busy signal DBY on via the host interface circuit 32b and gives notification of the start of execution to the host controller. The read data from the drive 1 should be transferred to the data buffer 34, so thae MPU 30 reads out from the command buffer CBUF of the RAM 31b the results of the execution of the read operation, the buffer address RADR (ADR) in the data buffer 34 of the read data, and the read byte count RBC (BCN).

Steps S307 to S311

The MPU 30 detects the read direction and, if forward, investigates from the results of the execution of the read operation read out from the command buffer CBUF of the RAM 31b at the afore-mentioned step if the load point LDP was detected when the drive was processing the corresponding block. If the load point LDP was detected, since this was the read operation of the first block from the load point LDP, the MPU 30 investigates the recording density from the read execution results. The recording density of the read execution results indicates the recording density of the read magnetic tape. If the recording density was 1600 rpi, the limit CBE of the command buffer management area CA of the RAM 31b is set to 8. If 6250 rpi, the limit CBE is similarly set to 16.

Steps S311a to S313

The MPU 30 moves to step S320 for reporting termination to the host controller when the magnetic tape is being reversed, when the load point LPD is reached, i.e., when the end of the magnetic tape is reached (S311a), when reading is effected, but there is no data block and data transfer is not possible (S312), and when a tape mark TM is detected (S313).

Steps S314 to S319

In cases other than those of steps S311 to S313, the MPU 30 judges whether or not the afore-mentioned read command is accompanied by data transfer. Read commands not accompanied by data transfer include space, back space, space file, and back space file commands.

If a read command accompanied by data transfer, data transfer to the host controller is executed. That is, the MPU 30 sets the read buffer address RADR read out from the command buffer CBUF of the RAM 31b in the load address counter LCTR of the data transfer control circuit 33 and the number of read bytes in the byte counter BCTR and starts up the data transfer control circuit 33. By this, the data transfer control circuit 33 transfers, along with the read strobe pulse RSTB (FIG. 8i), read data in the data buffer 34 in accordance with the address of the load address counter LCTR. The load address counter LCTR counts up with each one byte of read data.

When it judges that the data transfer control circuit 33 has ended the transfer of data equal to the number of read bytes, the MPU 30 adds to the free segment number FSEG of the data buffer management area DA of the RAM 31b the used segment number USEG for updating of the same.

On the other hand, even in the case of read commands not accompanied by data transfer, the read data is transferred within the data buffer 34, so updating of the free segment number FSEG is made in the same way in step S318.

Next, the MPU 30 investigates if the afore-mentioned read command is a file search command, for example, a space file or back space file command. If a file search command, the routine returns to step S301.

Steps S320 to S321

When not a file search command, when the read direction at the afore-mentioned step is forward and there is no load point LDP, when reversing and the load point LDP is reached, when there is no data block, or when the tape mark is detected, the MPU 30 notifies the termination (normal reception or error) to the host controller by the host interface circuit 32b, turns the data busy signal DBY off, and returns to the startup wait routine of FIG. 20a.

In this way, in write processing, in the LEOT mode, the command buffer size CBSIZE is not reduced or restricted. By turning the LEOT flag on, prefetch commands are prohibited in the same way as when the usual EOT flag is turned on.

On the other hand, in the physical EOT mode, i.e., not the LEOT mode, the final limit CBE is changed in accordance with the write recording density and the maximum block length MAXL. At the EWA, the buffer size is gradually reduced.

In read processing, prereading is performed irregardless of the type of the read command.

FIG. 26 is a flow chart of the startup processing for the drive. Below, an explanation will be given of the processing.

Steps S401 to S407

The MPU 30, to start up the drive, reads out from the command buffer CBUF of the RAM 31b the command to be next executed and investigates if it is a command.

If not a write command, that is, if a read command the MPU 30 investigates if the command stack CBSTK of the command buffer management area CA of the RAM 31b is a negative number less than 0. If CBSTK is 0 or more, it will already have been preread, so the MPU 30 investigates if startup may be performed. When startup is not possible (when an error is detected in the read operation and the processing is stopped), the MPU 30 returns.

On the other hand, if the startup is possible, the MPU 30 investigates if the command stack CBSTK of the command buffer management area CA of the RAM 31b is smaller than 63. If not smaller than 63, the command buffer CBUF of the RAM 31b is full, so the MPU 30 returns.

On the other hand, if the command stack CBSTK is smaller than 63, the MPU 30 investigates if the free segment number FSEG is 64 Kbytes or more. If less than this, it considers that data transfer is not possible and returns.

If the free segment number FSEG is 64 Kbytes or more at step S406, data transfer from the drive 1 is possible, so the MPU 30 sets the buffer address BADR of the RAM 31b in the store address counter SCTR of the data transfer control circuit 33 and places the data transfer control circuit 33 in the wait state (S407).

Steps S408 to S412

Next, the MPU 30 investigates by the drive interface circuit 32a if the EWA signal is on or off. If on (YES), the tape is at the EWA, so the MPU 30 turns off the LEOT flag of the RAM 31b and releases the LEOT mode (S409).

Further, the MPU 30 investigates if the read command is a read reverse command. If a read reverse command, the MPU 30 turns off the LEOT flag.

After the LEOT flag is turned off or when the EWA signal is off or the command is not for read reverse, the MPU 30 issues via the drive interface circuit 32a a GO signal and the corresponding read command to the drive 1 and then returns (S412).

Steps S415 to S420

On the other hand, if the MPU 30 judges at step S401 that the command is a write command, it prepares for automatic transfer to the drive.

The MPU 30 reads out from the command buffer CBUF of the RAM 31b the corresponding write command and investigates if this command is one accompanied with data transfer (S416). If a command accompanied with data transfer, the MPU 30 sets the write buffer address WADR (ADR) and the byte count WBC (BCN) of the command buffer CBUF of the RAM 31b in the load address counter LCTR and byte counter BCTR of the data transfer control circuit 33 (S417, S418). Further, it places the data transfer control circuit 33 in the wait state (S419). After this wait state or when a command is not accompanied by data transfer (erase, write tape mark, etc.), the MPU 30 issues the read command and a GO signal via the drive interface circuit 32a by the control line 36a to the drive control unit 2 (S420) and then returns.

On the other hand, the drive control unit 2, when it receives the GO signal and command at steps S406 to S412, turns the data busy signal DBY on, responds with the same, and begins execution of the corresponding command.

For example, if a write command is accompanied with data transfer, after the completion of the preparations for data transfer, a data transfer request is sent from the data transfer control signal line 37a to the data transfer control circuit 33. The data transfer control circuit 33 then sends write data of the number of bytes of the byte counter BCTR from the buffer address, shown by the load address counter LCTR of the data buffer 34, via the write data bus 37b to the drive control unit 2, has it executed, and has it written in the magnetic tape 16.

Further, at the drive control unit 2, when the execution of the write command is completed, a termination report is sent via the control line 36a to the drive interface circuit 32a. The drive interface circuit 32a takes this and interrupts the MPU 30 to suspend the processing of FIGS. 20, 24, and 25.

FIG. 27 is a flow chart of the write and read processing for the drive. The processing will be explained below.

Steps S501 to S526

When a termination report is received from the drive, the MPU 30 investigates if the command completed was for a read operation or write operation (S501). If for a read operation, the MPU 30 proceeds to step S530.

On the other hand, if the command ended was for a write operation, the MPU 30 investigates via the drive interface circuit 32a if the EWA signal is on or off (S502). If off (NO), the MPU 30 proceeds to step S522.

If the EWA signal is on (YES), the tape is at the EWA, so the MPU 30 investigates the LEOT flag of the area EA of the RAM 31b to determine if the LEOT mode is in effect (S503). If not in the LEOT mode, the mode is the usual EOT mode, so the MPU 30 proceeds to step S522.

Conversely, if in the LEOT mode, the MPU 30 proceeds to step S504 for advance of the running counter and for detection of the LEOT point. First, the MPU 30 investigates the recording density of the drive (S504). Judgement as to if the recording density is 6250 rpi or 1600 rpi is necessary for differentiating the write tape mark length LWTM, the erase length LERS, the interblock gap length IBG, and the judgement value EPTR in the advance of the running counter and the detecting of the LEOT detection point. The processings of the steps S505 to S511 and steps S515 to S521 are exactly the same.

The MPU 30 investigates if the command of the command buffer CBUF is a write command, erase variable command, write tape mark command, or erase fix command (S505, S515). If the command is a write command or erase variable command, the byte count RBC of the command buffer CBUF is converted to the used segment number USEG and this added to the running count value ECTR of the area EA of the RAM 31b for updating of the same (S506, S516). Further, if the command is a write tape mark command, the fixed value write tape mark length LWTM is similarly added to the running count value ECTR for updating of the same (S507, S517). Further if the command is an erase fix command, the fix erase length LERS is similarly added to the running count value ECTR for updating thereof (S508, S518). Further, the interblock gap length length LIBG is added to the running count ECTR for updating of the same (S508, S519). Next, the MPU 30, for detection of the LEOT point, compares the running count ECTR and the judgement value EPTR (S510, S520). If ECTR≧EPTR, the LEOT point has been reached, so the LEOT flag is turned on (S511, S521). If ECTR<EPTR, the LEOT flag is not turned on.

Next, the MPU 30 investigates if the write command concerned is a command using the data buffer 34 (S522). If a command using the buffer, the free segment number FSEG of the data buffer management area DA of the RAM 31b is added with the used segment number USEG (S523) to update the free segment number FSEG. After this updating, the command stack CBSTK of the data buffer management area DA of the RAM 31b is subtracted by 1 to revise the CBSTK (S524).

Further, the MPU 30 investigates if the command stack CBSTK of the RAM 31b is 0 (S525). If 0, the MPU 30 returns to the write processing routine. If not 0, it executes the steps after S415 of FIG. 26. In this way, the drive successively executes commands of the command buffer asynchronously with the host controller.

Steps S530 to S539

On the other hand, if it is judged at step S501 that the command is for a read operation, the MPU 30 investigates if the command is for read reverse (S530). If for read reverse, it investigates via the drive interface circuit 32a if the LDP signal has been given from the drive 1 (S531). If no LDP signal has been given or if the command is for read forward, the MPU 30 investigates via the drive interface circuit 32a if a tape mark detection signal has been given (S532).

If no tape mark detection signal has been given either, it calculates the byte count BC of the read data transferred to the data buffer 34 by the end of the drive processing (S533). That is, the MPU 30 reads out the store address counter SCTR of the data transfer circuit 33, calculates the difference with the buffer address BADR of the data buffer management area DA, and finds the byte count BC of the transferred read data (S533).

Next, the MPU 30 revises the command buffer CBUF and the data buffer management area DA of the RAM 31b (S534). First, it stores in the corresponding command portion of the command buffer CBUF of the RAM 31b the buffer address BADR (that is, the head address of the preread data) of the data buffer management area DA of the RAM 31b and the calculated byte count BC of read data. Next, it subtracts from the free segment number FSEG of the data buffer management area DA of the RAM 31b the used segment number USEG of the data buffer 34 to update the free segment number FSEG. further, it adds to the buffer address BADR the used segment number USEG to update the buffer address BADR.

Further, the MPU 30 investigates if the drive 1 is operating to move the magnetic tape 16 in the forward direction and if it has detected the EOT (S536). If YES, it stores the results of the read execution (EOT detection) in the storage portion of the corresponding read data in the command buffer CBUF and returns to the routine of FIG. 20 to FIG. 25.

In the same way, in the case of tape mark detection or LDP detection in read reverse, the MPU 30 stores this in the command buffer CBUF and returns to the routine of FIG. 24 or FIG. 25.

On the other hand, if the results of the investigation of the EOT tape drive direction and detection etc. of the MPU 30 is NO, the results of the read execution (no detection) are similarly stored in the storage portion of the corresponding read data of the command buffer CBUF (S537).

Further, the MPU 30 investigates if the command stack CBSTK of the command buffer management area CA of the RAM 31b is 63 or more. If 63 or more, it considers prereading to be impossible and returns to the routine of FIG. 20 to FIG. 25. If less than 63, it returns to step S405 of FIG. 26 for execution of the prereading.

Summarizing the operations described above, the following may be said.

For a write operation, (1) In the initialization (III) of step S110 of FIG. 20b, that is, in FIG. 23, if in the LEOT mode, the command buffer size CBSIZE is the maximum 64 and no restriction is imposed. If in the usual EOT mode, the command buffer size CBSIZE is changed to the limit CBE.

(2) At step S215 to S224 of FIG. 24, the limit CBE is changed by the recording density and the maximum block length.

(3) If the usual EOT mode, at step S227 to S230 of FIG. 24, in the EWA, if the command buffer size CBSIZE is greater than the limit CBE, it is successively reduced by 2's.

For example, a command buffer with a write command storage capacity of 64 is successively reduced in size as shown by the dotted line of FIG. 18b.

Therefore, since the storable number of write commands is restricted, write commands not accompanied by write data, such as erase and write tape mark commands, are also restricted. Therefore, all write commands in the magnetic tape (in particular, the TWA) can be executed and the processing of illegal write commands can be prevented.

That is, when the EWA is reached and the EWA signal is turned on, the command buffer size CBSIZE is reduced by 2 with each reception of a write command from the host controller, that is, the number of commands allowed to be stored is gradually reduced. Further, is a TWA (EOT) signal is issued, no termination report is issued until the command stack CBSTK becomes 0. Therefore, the number of prefetched commands is gradually reduced as shown by the dotted line of FIG. 18(c).

By this gradual reduction, the time until the host controller receives the next comamnd is not unduly prolonged. As opposed to this, if the size is reduced all at once, the host controller will not be able to receive the next command until the drive executes a number of commands equal to the (number of stored commands)—(number of storable commands after reduction—1), so there is the inconvenience that the host controller may consider, by time monitoring, the time elapse to be a system abnormality.

Therefore, gradual reduction enables prevention of this inconvenience. This gradual reduction is performed above the limit CBE. The limit CBE is successively changed in accordance with the recording density and the maximum block length.

Figure 24B:
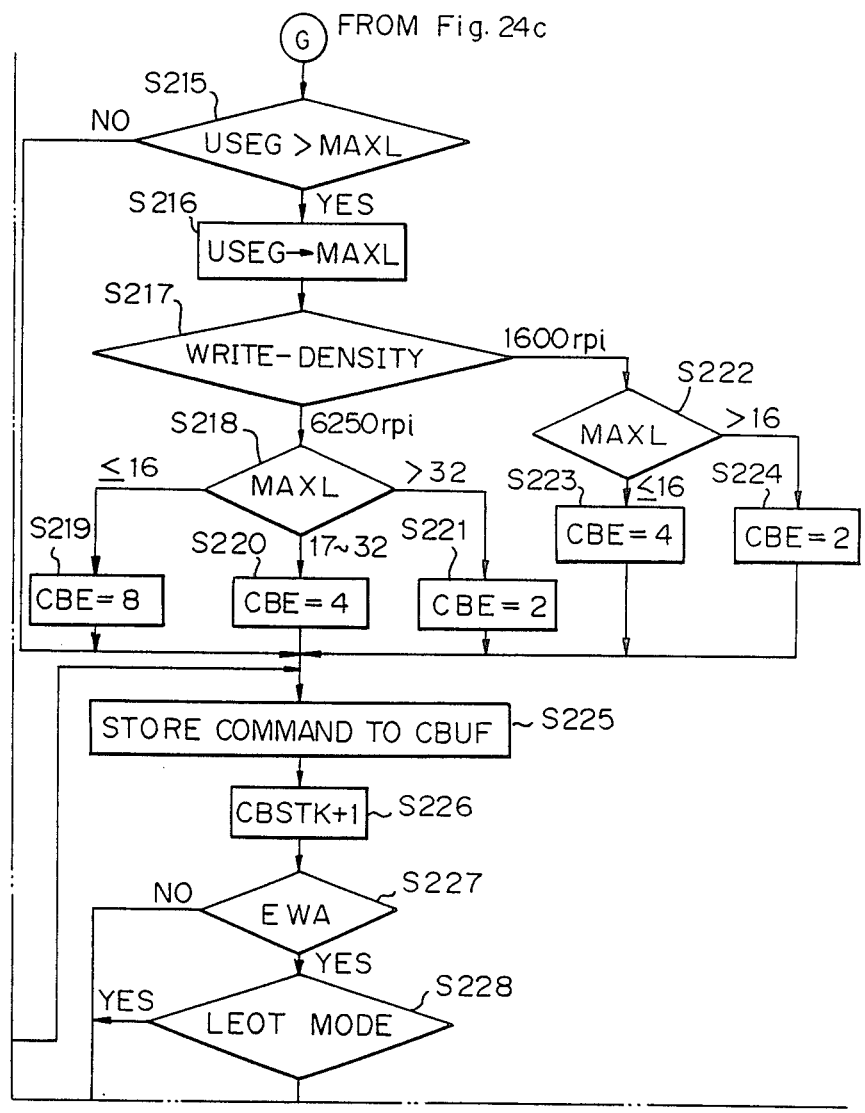
Figure 24C:
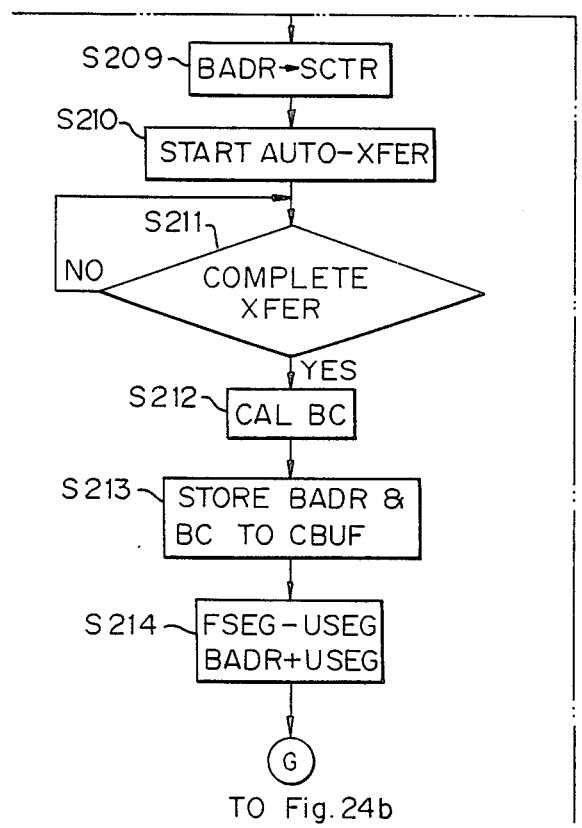
Figure 24D:
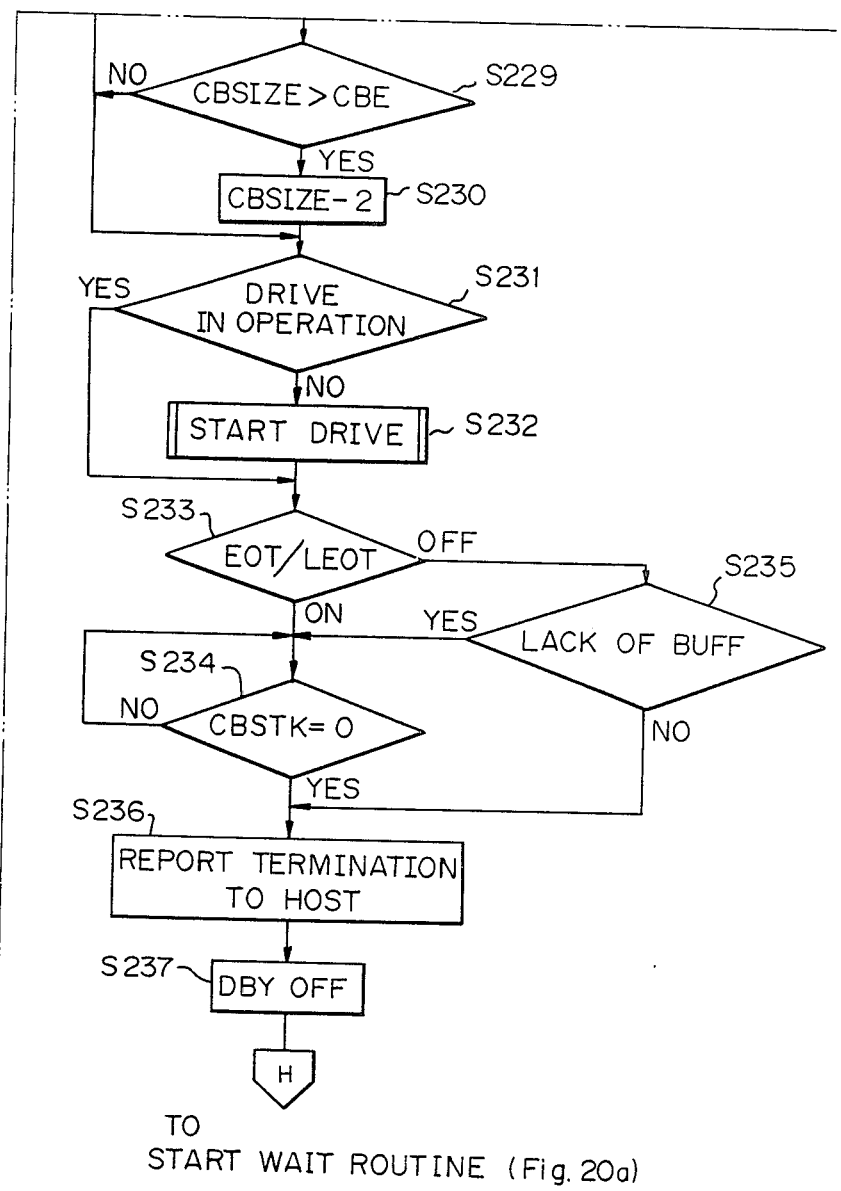

(4) On the other hand, if the LEOT mode, the command buffer size CBSIZE is not gradually reduced, i.e., not restricted, at step S227 to S230 of FIG. 24b and FIG. 24c.

Figure 27A:
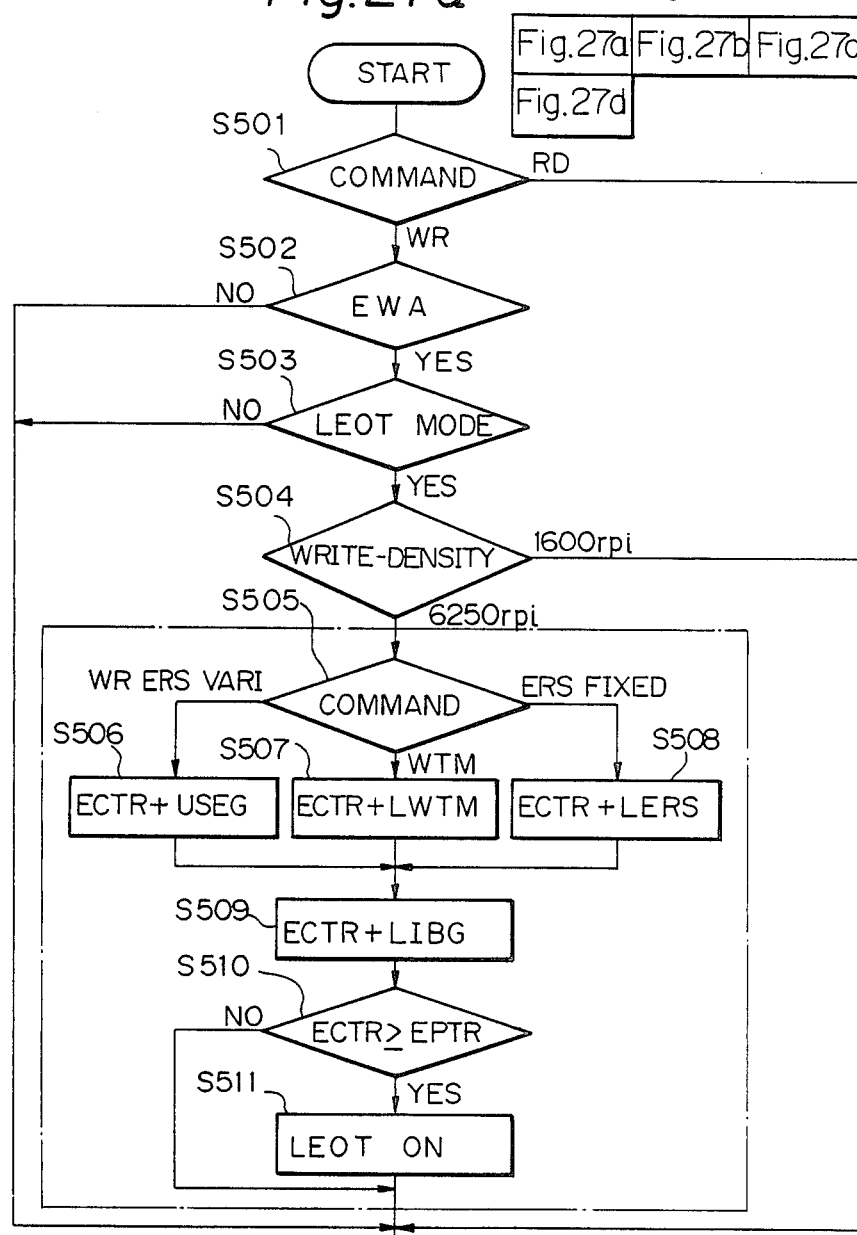
FIG. 27a to FIG. 27d is a flow chart illustrating write and read processing for a drive system in the second embodiment of the present invention.
Figure 27B:
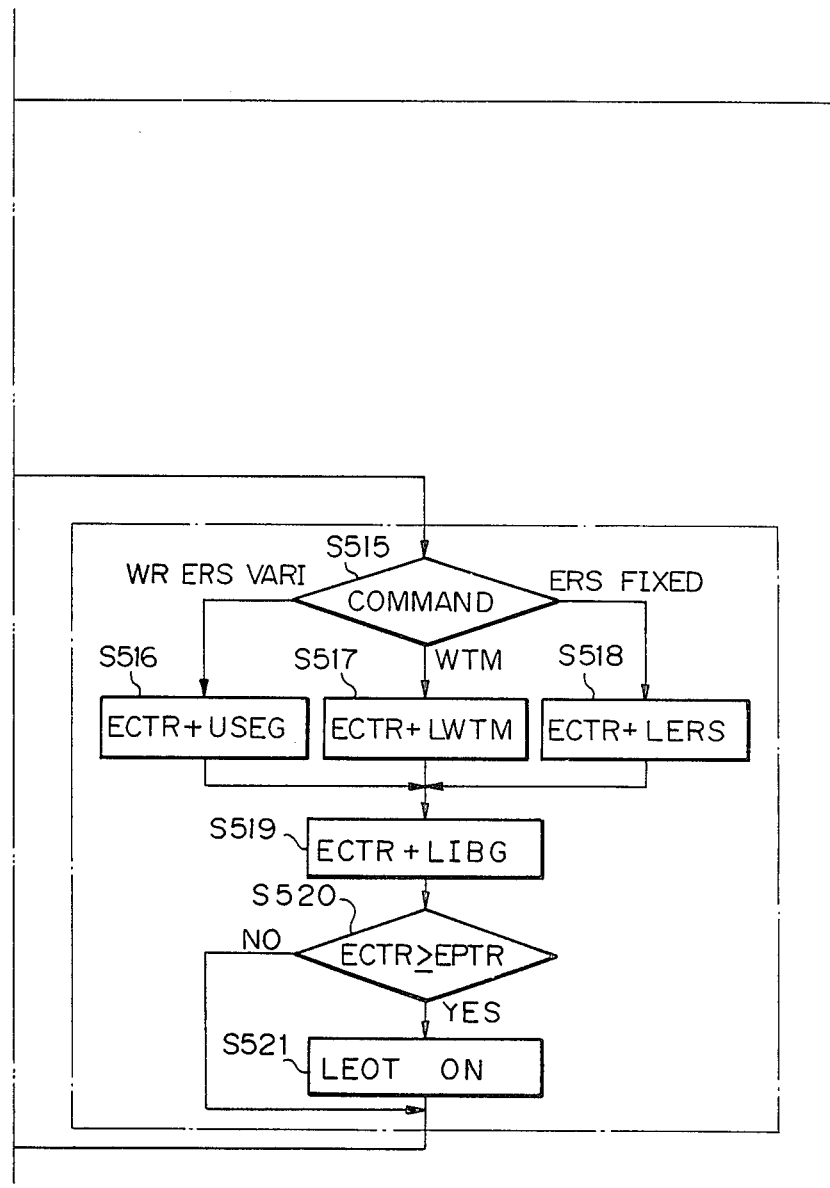
Figure 27C:
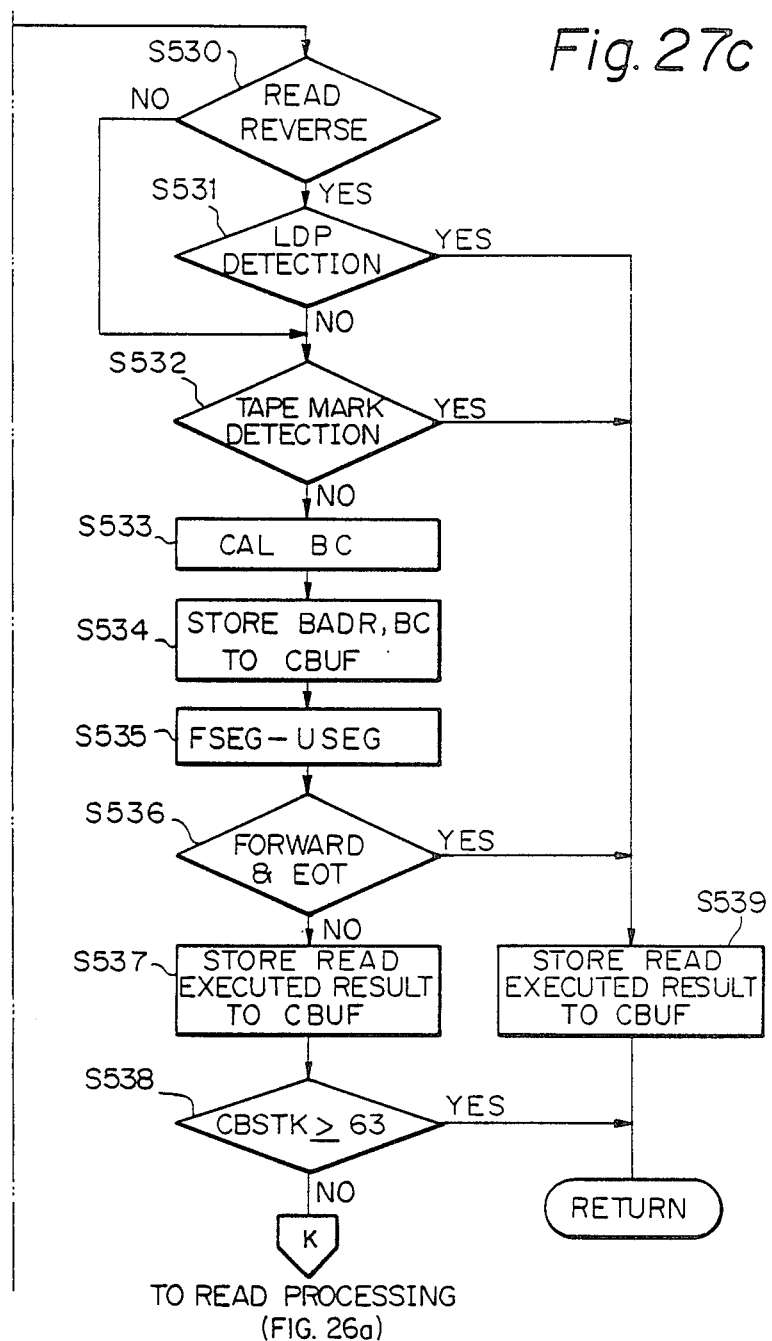
Figure 27D:
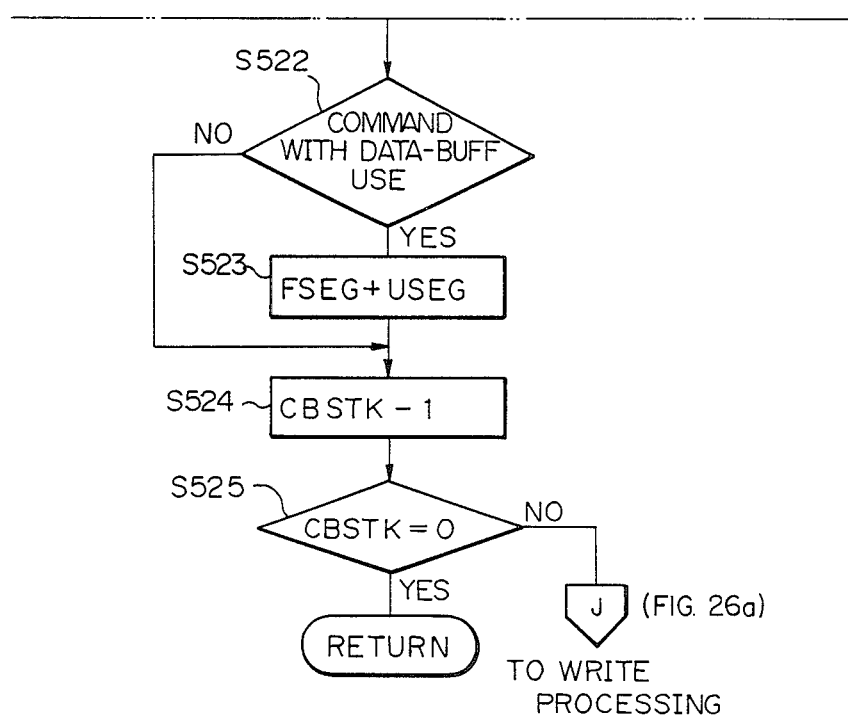

At step S505 to S511 and S515 to S521 of FIG. 27a and FIG. 27b, the running distance of the tape from the EWA detection is measured as the running count ECTR. When this reaches the limit EPTR, it is considered that the LEOT point is detected, the LEOT flag is turned on, and the same processing is effected as with the usual EOT detection of step S233 to S237 of FIG. 24d.

Therefore, in the LEOT mode, the command buffer size CBSIZE is not restricted, as shown by FIG. 18b, until the detection of the LEOT point. Upon detection of the LEOT point, the CBSIZE substantially becomes 0 just as with the EOT mode.

Therefore, in the LEOT mode, as shown in FIG. 18c, the command stack CBSTK is reduced starting from the detection of the LEOT point.

Figure 26B:
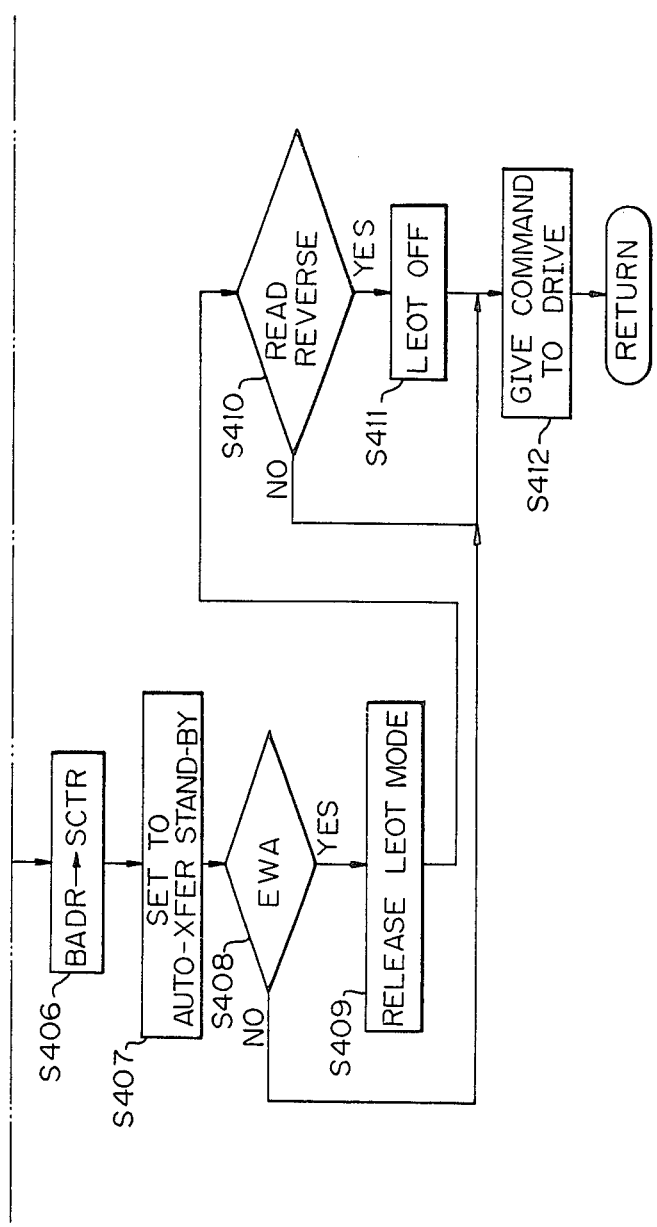

(5) Further, in the LEOT mode, as shown by step S406 to S409 of FIG. 26b, when it is no longer possible to guarantee the count due to reception and execution, etc. of read commands after the start of the count of the tape running distance (after the EWA flag is on), the LEOT mode is terminated and the usual EOT mode is entered.

(6) As shown by step S200 to S203 of FIG. 24a, when a startup operation (GO) is begun from the host controller or a write command is given, first it is investigated if the command is within the number of storable commands of the command buffer. If within the number of storable commands, the command is received. If over the number of storable commands, the reception of the command is suspended and no data busy signal DBY is given.

That is, as shown by FIGS. 9a to 9e, no data busy signal DBY is given until the drive side executes commands within the command buffer and the command to be received becomes less than the storable number. When becoming less than the storable number of commands, a data busy signal DBY is given and notification is made to the host controller of execution of processing.

In the same way, at steps S200 to S203 of FIG. 24a, it is investigated if the free segment number of the data buffer is greater than the maximum block length. If greater than the maximum block length, transfer of write data from the host controller is accepted. If less than the maximum block length, data transfer is suspended and no data busy signal DBY is given. Therefore, no data busy signal DBY is given until the drive side executes commands within the command buffer and free segments of the data buffer become greater than the maximum block length. When becoming greater than the maximum block length, the data busy signal DBY is given and transfer is accepted.

At steps S215 to S224 of FIG. 24b, if the transferred block length is greater than the maximum block length, the actually transferred block length is used as the maximum block length starting from the next cycle. This has the effect of reducing the number of retries and the waiting time.

In the above embodiment, in the EOT mode, the number of storable write commands is gradually reduced with each reception of a write command from the host. However, it can also be reduced all at once and can be gradually reduced with each execution of a plurality of commands by the drive side.

Further, the drive control unit 2 and the command data prefetch control unit can also be made as a single unit. The drive 1 may also have a tape buffer.

Further, no usual EOT mode need be provided, i.e., just the LEOT mode is sufficient. The maximum block length MAXL also need not be changed by the received blocks, but can be changed in steps.

As explained above, according to the second embodiment of the present invention, the number of prefetchings of write commands need not be restricted in the EWA, so as large number of commands prefetchings can be made until close to the EOT and streaming operation can be maintained for a longer time, thus contributing to improved performance.

Further, the TWA can be made longer, so the number of blocks which can be written into the TWA is made larger and commands given to the TWA can be reliably executed.

In the above second embodiment, the limitation of the prefetching commands is based upon the running length of the magnetic tape as shown in FIGS. 18a to 27d, however, the limitation of the same may be easily achieved by calculating the write length due to the accumulation of write data to the magnetic tape after the magnetic tape has passed the early warning point.

Next, a third embodiment of the present invention will be explained.

The performance of a buffered magnetic tape system is largely affected by the number of command prefetchings. The larger the number of command prefetchings, the longer streaming operation can be maintained and the more superior the performance.

However, the length of commands writable in the TWA is limited after the EOT is passed. If there are too many command prefetchings upon detection of the EOT, execution of all the prefetched commands becomes impossible.

Therefore, it is necessary to increase the number of prefetchings before the approach of the EOT as much as possible and, upon the approach of the EOT, to reduce the writable number.

The lengths of blocks recorded on a tape differ according to the recording density and the number of bytes of the blocks, so the numbers of blocks writable in the TWA also differ according to the recording density and the number of bytes of the blocks.

For example, if the recording density is 1600 rpi and the block length 64 Kybtes, the length of one block is approximately 1 meter and about 3 blocks can be written in the TWA. At the same recording density of 1600 rpi, however, if the block length is 8 Kbytes, the length of a block, even including the interblock gap length IBG, is approximately 14.5 cm and about 20 blocks can be written in the TWA. Further, at a recording density of 6250 rpi, if the block length is 8 kbytes, the length of a block, even including the interblock gap length IBG, is approximately 4 cm, so about 75 blocks can be written into the TWA. Therefore, it is preferable to limit the command prefetchings near the EOT in consideration of the recording density and the number of bytes of the blocks.

However, in the prior art, while the number of command prefetchings was changed in accordance with the number of bytes of the blocks, no consideration was given to the recording density, so there would be too many prefetched commands at 1600 rpi and the change that not all the commands could be executed in the TWA. Further, at 6250 rpi, the number of prefetched commands was excessively limited, overly reducing the performance of the system.

The third embodiment of the present invention provides a command prefetch control system of a magnetic tape system able to control the command prefetchings so as to maximize the system performance to the extent of enabling execution of all the commands in the TWA. The principle of the embodiment is shown in FIG. 28a to FIG. 29.

Figure 28A:
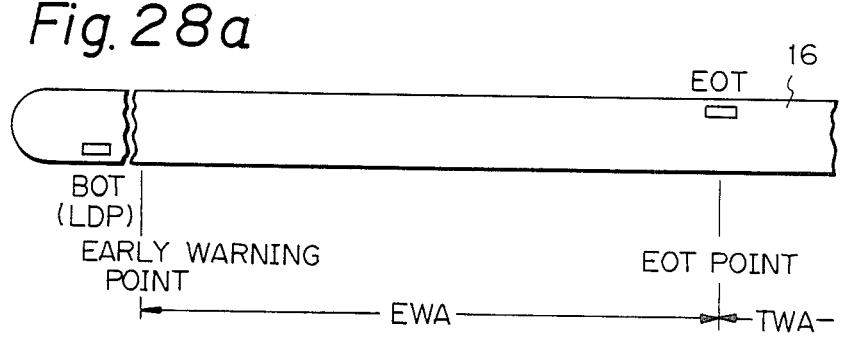
FIG. 28a to FIG. 29 are diagrams illustrating the principle of a third embodiment of the present invention.
Figure 28B:
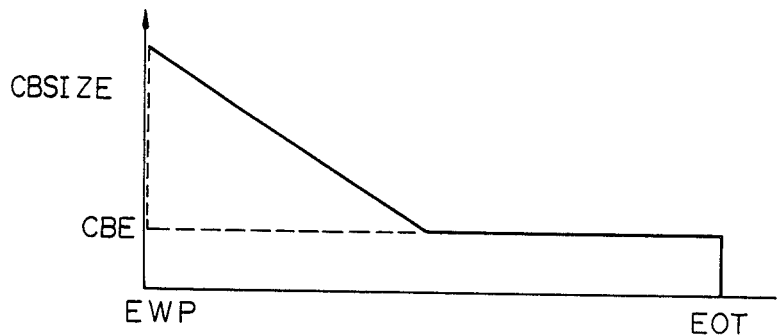

In this embodiment, in the EWA from the detection of the early warning point of FIG. 28a to the detection of the EOT, as shown in FIG. 28b, the write command buffer size CBSIZE is restricted gradually as shown by the solid line or all at once as shown by the dotted line. The limit CBE is determined by the recording density and the maximum block length as shown by FIG. 28c and FIG. 28d.

Figure 28C:
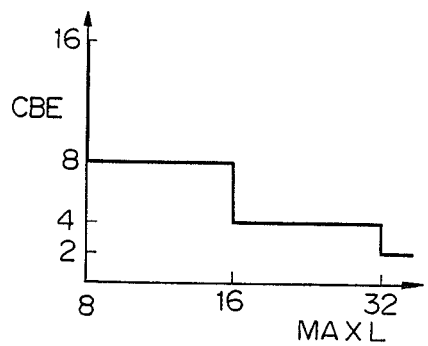
Figure 28D:
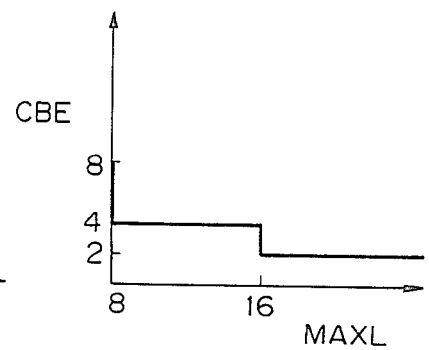
Figure 29:
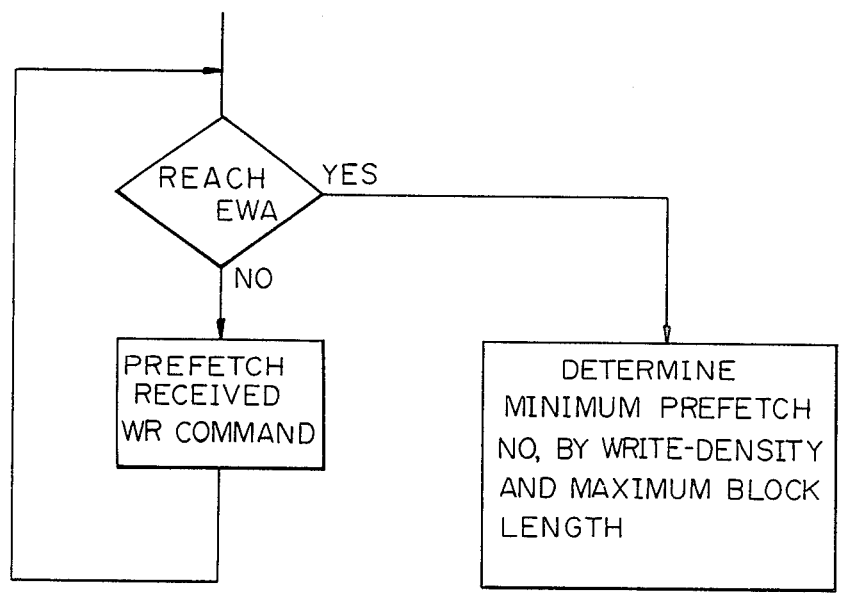

For example, at a high recording density of 6250 rpi of FIG. 28c, the limit CGE is changed in accordance with the maximum block length MAXL from 16 to 8, to 4, and to 2. At a low recording density of 1600 rpi, the limit CBE is changed in accordance with the maximum block length from 8 to 4 and to 2.

In this embodiment, since the limit CBE of the command buffer size CBSIZE is determined by the recording density and the maximum block length MAXL, the limit on command prefetchings can be optimized and the performance of the system can be maximized to the extent enabling execution of all commands in the TWA.

Further, in the embodiment, since the number of prefetchings of write commands is restricted, rather than the capacity of the data buffer, write commands not accompanied by write data, such as erase and write tape mark commands, are also restricted, so all write commands in the magnetic tape can be executed and processing of illegal write commands can be prevented.

The startup processing and initialization are the same as those shown in FIG. 20a to FIG. 23. Further, the write processing for the host and the read processing are the same as those shown in FIG. 24a to FIG. 24d and FIG. 25. The drive startup processing and the write/read processing are the same as those shown in FIGS. 26a and 26b and FIGS. 27a to 27d.

In the above third embodiment, the limitation of the prefetching commands is based upon the running length of the magnetic tape as shown in FIGS. 28a to 29, however, the limitation of the same may be easily achieved by calculating the write length due to the accumulation of write data to the magnetic tape after the magnetic tape has passed the early warning point.

Below, an explanation will be given of a fourth embodiment of the present invention.

Figure 30A:
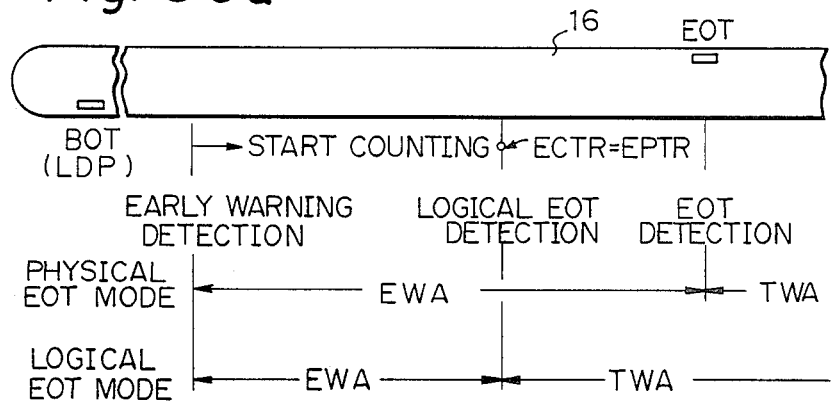
FIG. 30a to FIG. 31 are diagrams illustrating the principle of a fourth embodiment of the present invention.
Figure 30B:
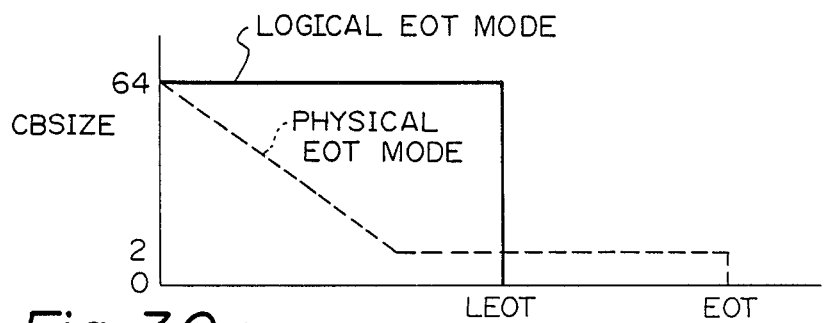
Figure 30C:
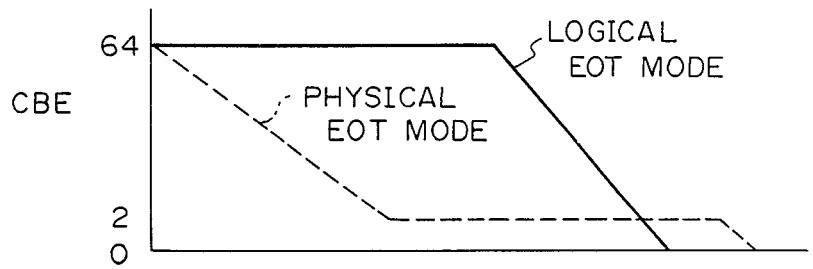
Figure 31:
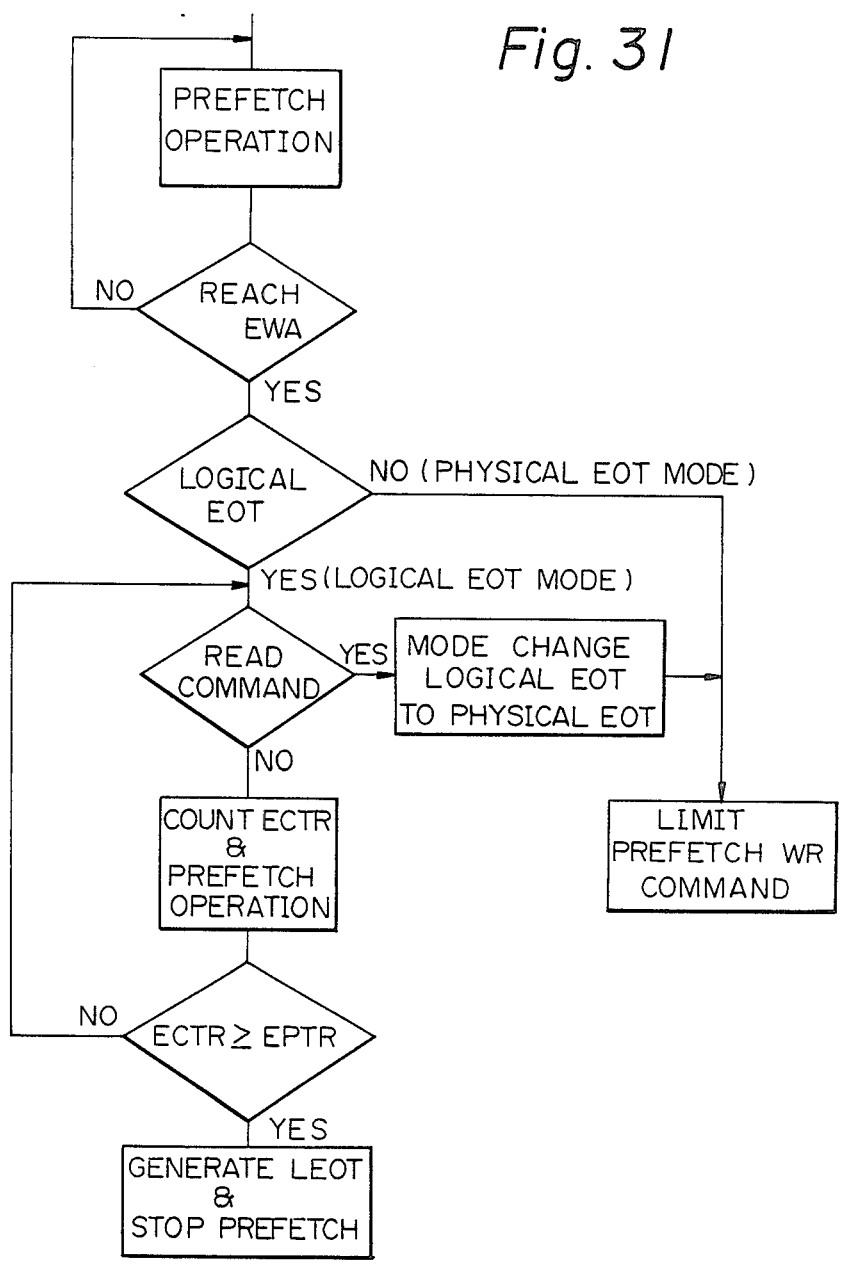

This embodiment provides command prefetch control of a magnetic tape system enabling efficient streaming operation in the EWA and reliable execution of prefetched write commands in the TWA. The principle of this embodiment is shown in FIGS. 30a to FIG. 31.

There are two modes at the EWA of the magnetic tape 16. In the LEOT mode, the magnetic tape drive unit 1 runs the magnetic tape 16. When the EWA is detected, the control unit CT calculates the running distance of the magentic tape from the time of EWA detection. When the count ECTR reaches a predetermined value EPTR, it is considered that the EOT is detected and an LEOT is obtained. In the EWA, the number of command prefetchings is not reduced, as shown by the solid line of FIG. 30b. This LEOT has the same effect as the detection of a usual EOT. By this, the same treatment of the EOT can be performed before the actual detection of the EOT marker provided on the magnetic tape.

In the LEOT mode, the time of detection of the EWA is not considered the LEOT. The LEOT is considered detected after a predetermined distance of running of the magnetic tape 16.This is because the EWA detection mechanism makes use of the servo control mechanism of the drive and the precision is not enough to enable the EWA detection point to be set to any point of time with small error. If the precision of the servo control mechanism is excessively raised so as as improve the precision of EWA detection, this would raise the cost of the system.

On the other hand, in the physical EOT mode, the time from the detection of the EWA until the detection of the actual EOT marker is considered the EWA. In the EWA, as shown by the dotted line of FIG. 30b, the number of prefetchable commands is reduced.

The LEOT mode and the physical EOT mode are switched when execution of read command in the EWA during operation in the LEOT mode makes execution of the LEOT mode not possible, thereby enabling efficient streaming operation. Further, the operation panel may be used to select the mode, enabling manual selection of the LEOT mode and physical EOT mode.

In the LEOT mode, an LEOT is obtained, so the EOT can be detected at an earlier point of time, as shown in FIG. 30a, whereby the TWA can be made longer. Therefore, the number of blocks able to be written into the TWA can be increased, so, as shown by the solid line of FIG. 30b, there is no need to reduce the number of prefetchings of write commands in the EWA. Consequently, even in the EWA, streaming operation can be continued and, in the TWA, all prefetched write commands can be executed. That is, as shown by the solid line of FIG. 30c, up until the approach of the EOT, the number of command prefetchings is increased as much as possible, while when the EOT approaches, the number of writable commands is reduced, resulting in ideal prefetch control.

On the other hand, in the physical EOT mode, since the number of storable write commands is restricted in the EWA, in the same way as mentioned earlier, write commands not accompanied by write data, such as erase and write tape mark commands, are also restricted, so all the write commands on the magnetic tape can be executed and the processing of illegal write commands can be prevented. That is, even erase and write tape mark commands not accompanied by write data are restricted, write commands are not inappropriately restricted, and all the prefetched write commands can be executed in the TWA as shown by the dotted line of FIG. 30c.

The startup processing and initialization are the same as those shown in FIG. 20a to FIG. 23. Further, the write processing for the host and the read processing are the same as those shown in FIGS. 24a to 24d and FIG. 25a to FIG. 25c. The drive startup procesing and the write/read processing are the same as those shown in FIG. 26a and FIG. 26b and FIGS. 27a to 27d.

In the above fourth embodiment, the limitation of the prefetching commands is based upon the running length of the magnetic tape as shown in FIGS. 30a to 31, however, the limitation of the same may be easily achieved by calculating the write length due to the accumulation of write data to the magnetic tape after the magnetic tape has passed the early warning point.

Below, an explanation will be given of a fifth embodiment of the present invention.

The above-mentioned first embodiment provided a method for restricting the commands in the EWA to the minimum limit all at once or a method of gradually restricting it in accordance with the reception of commands. The second embodiment provided a method for restricting the number of command prefetchings after the detection of the EWA at an LEOT point before the EOT. The third embodiment provided a method for restricting the number of command prefetchings by the maximum block length. The above methods have the effect of raising the efficiency of use of the magnetic tape. On the other hand, since the number of command prefetchings is restricted, the performance, seen from the viewpoint of buffer control, is reduced.

On the other hand, the fourth embodiment provided a method in which the detection of the approach of the TWA during write command execution was considered to be imaginary detection of the EOT and in which, after execution of all the prefetched commands, EOT detection was reported to the host controller. In this method, while an imaginary EOT (LEOT) is detected before the detection of the actual EOT, command prefetching is performed until the LEOT, so the performance is excellent considered from the viewpont of buffer control.

As seen from the above, all the methods have their advantages and shortcomings. In all of them, however, there is a difference between the actual EOT marker and the detected EOT. That is, in the first group of methods mentioned above, which emphasize efficiency of tape usage, command prefetching is performed even close to the EOT. From the viewpont of the host, it appears as if the EOT marker is after the actual EOT. On the other hand, in the latter mentioned method, which emphasizes performance of buffer control, it appears as if the EOT marker is before the actual EOT.

Fundamentally, it is preferable that the actual EOT and the reported EOT match. Failure of the EOT report blocks in a read operation and a write operation to match can cause problems in some systems. Therefore, it is preferable that the afore-mentioned advantages of buffer control be made use of and, at the same time, the actual EOT and the reported EOT be made to match.

The principle of this embodiment will now be explained with reference to FIG. 32a to FIG. 33.

The prefetch control unit 3, based on the previously designated physical EOT mode or LEOT mode and prefetch access mode or usual access mode, (a) in the case of the physical EOT mode, in the prefetch access (buffered) mode, reduces the number of prefetched commands in a first region before the EOT of the magnetic tape to a predetermined value and clears the number of prefetched commands when the magnetic tape reaches the EOT and, in the usual access mode, clears the number of prefetched commands when the magnetic tape reaches the first region before the EOT and (b) in the case of the LEOT mode, clears the number of prefetched commands when the magnetic tape reaches a second region before the EOT and performs accessing of the magnetic tape in accordance with the LEOT mode and prefetch access mode.

The above makes possible processing at the EOT of the magnetic tape based on selection of the physical EOT mode or LEOT mode. In the physical EOT mode, it is further possible to select buffered processing or nonbuffered processing. In particular, in nonbuffered processing, detection of the physical EOT of the magnetic tape and the LEOT match.

The embodiment will be explained in further detail below.

Figure 34B:
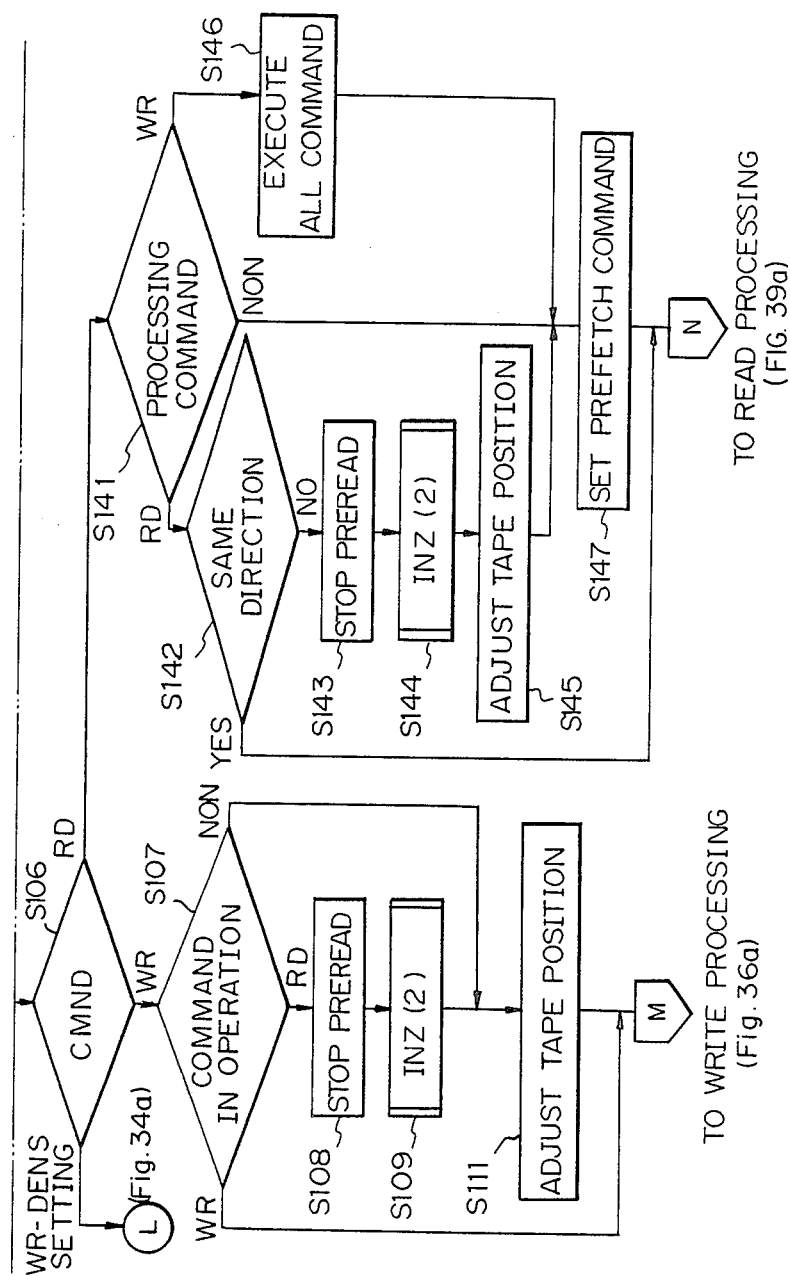
FIG. 34a to FIG. 35 are flow charts illustrating the startup of the fifth embodiment.
Figure 35:
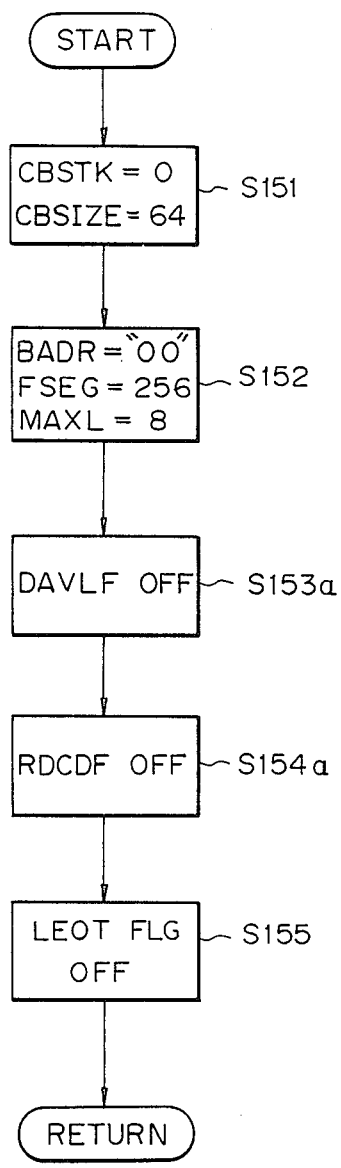
Figure 36B:
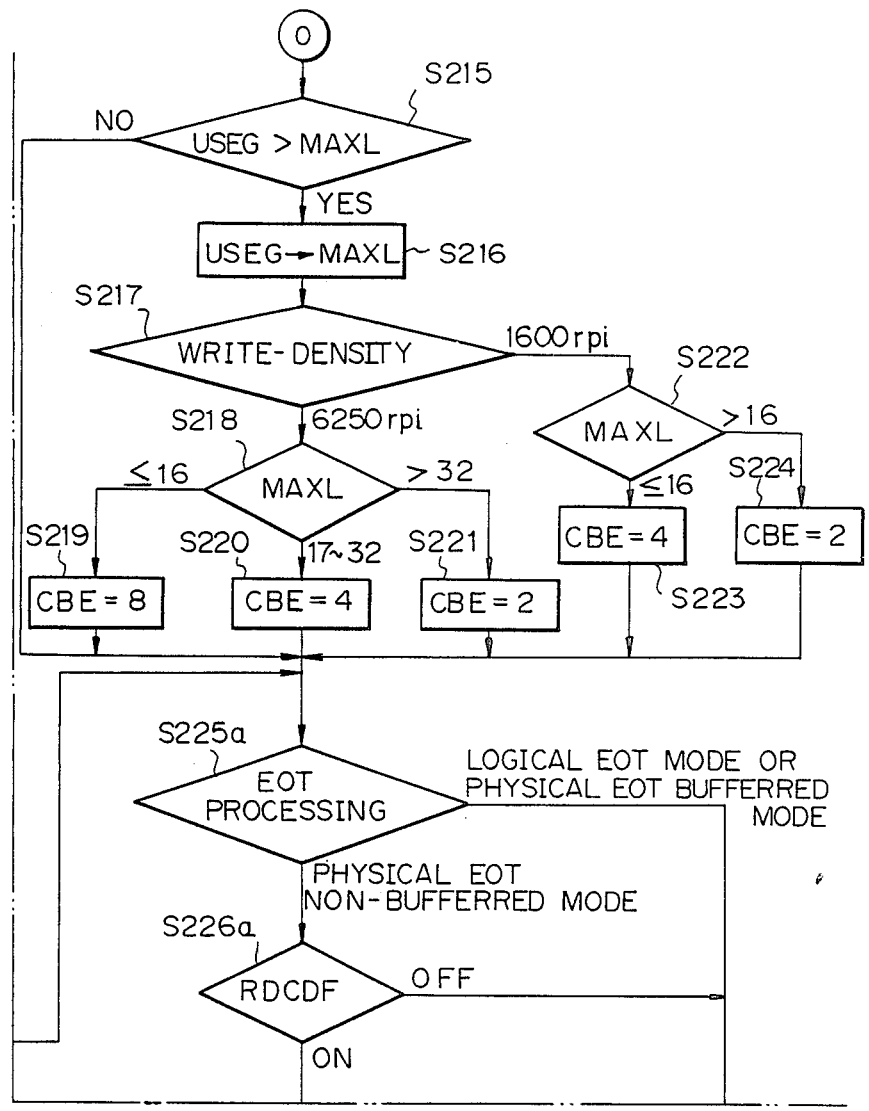
FIG. 36a to FIG. 36c is a flow chart illustrating write processing for a host system in the fifth embodiment.
Figures 36B, 36C:
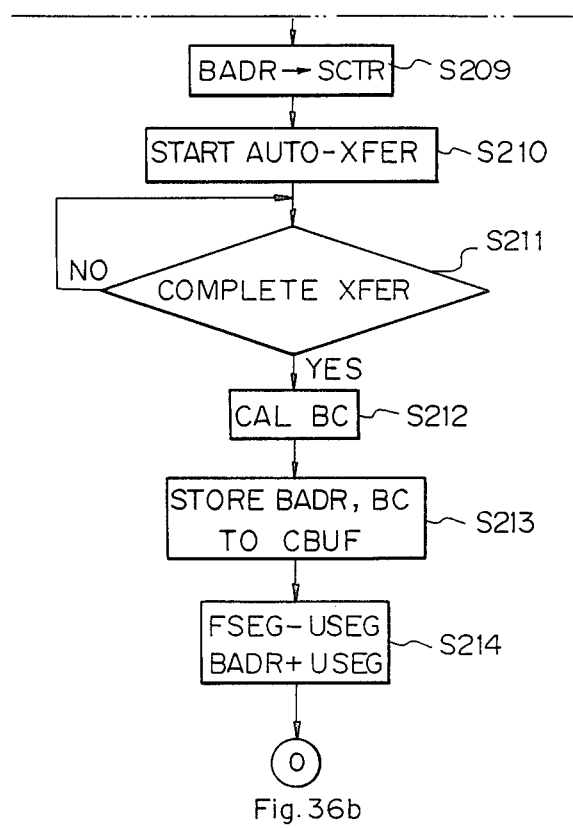
Figure 36D:
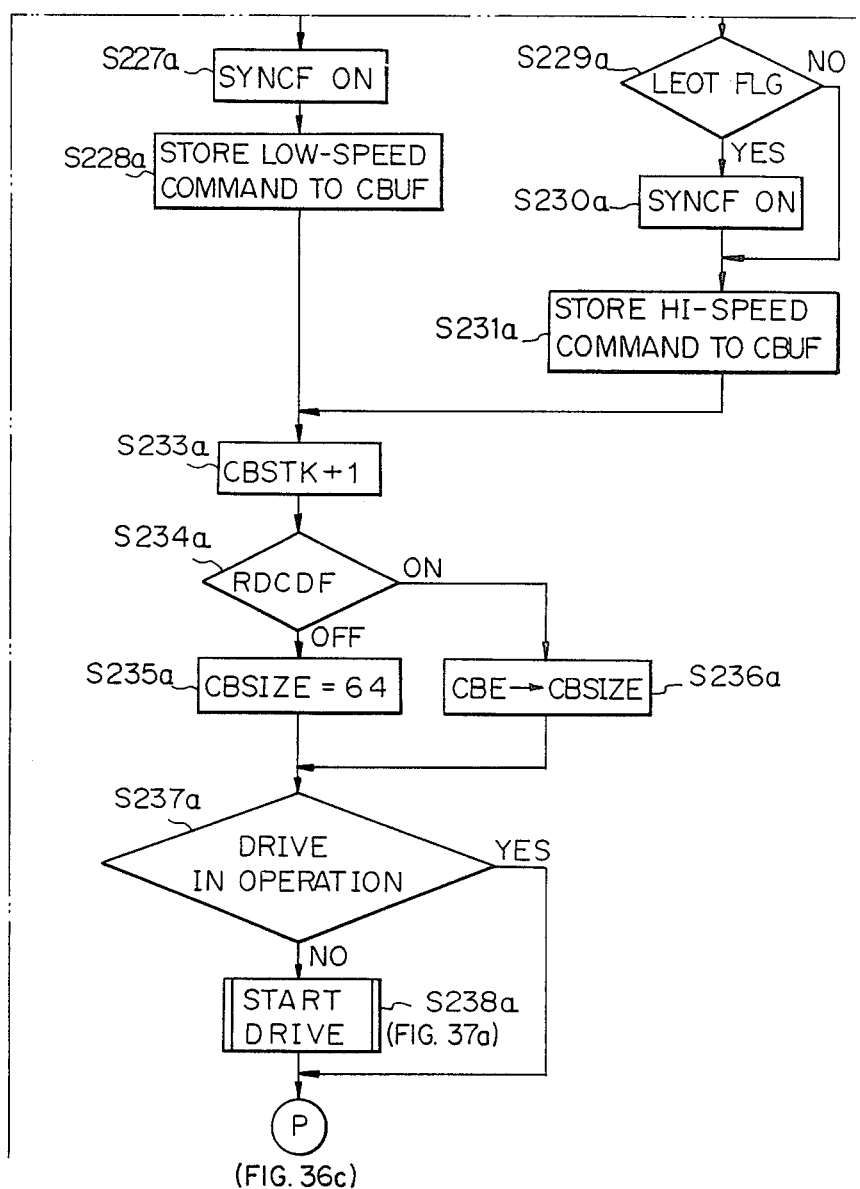
Figure 36E:
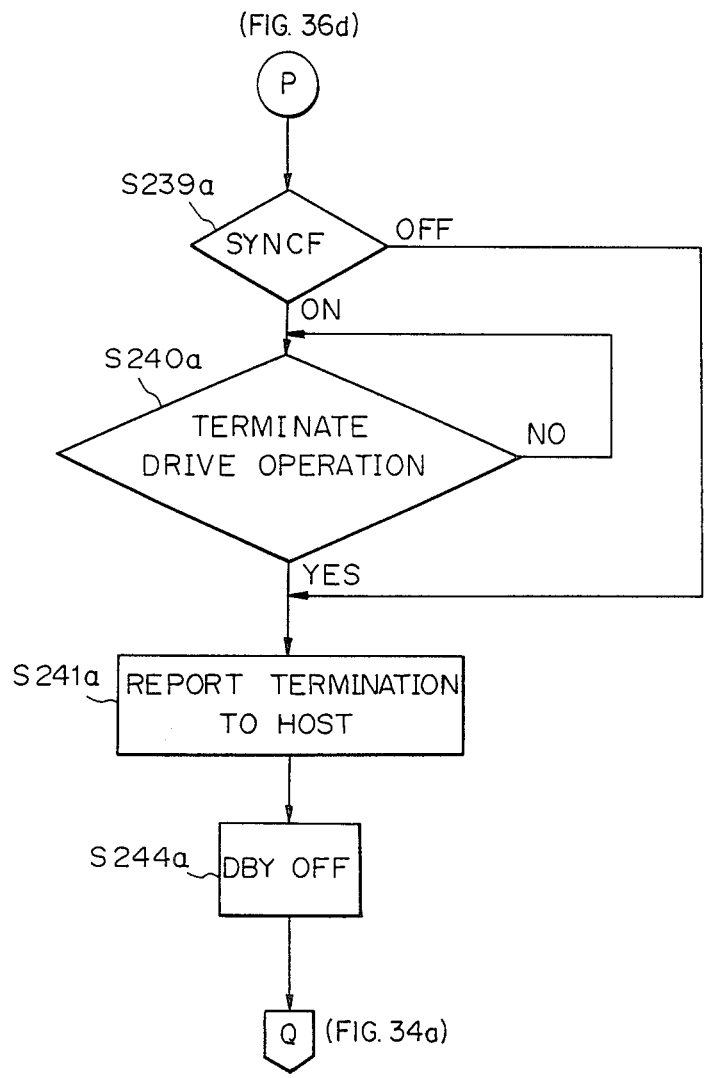

The startup processing is shown in FIG. 34a and FIG. 34b. FIG. 34a and FIG. 34b is basically the same as FIG. 20a and FIG. 20b, but the initialization (1) (FIG. 21) at step S102 of FIG. 20a is replaced in FIG. 34a by the initialization (4) shown in FIG. 35 at step 102a. The initialization (4) shown in FIG. 35 adds to the initialization (1) of FIG. 21 the processing (S153a) for turning off the distance validity flag DAVLF and the processing (S154a) for turning off the reduced flag RDCDF. Further, the initialization (3) (FIG. 23) of step S110 of FIG. 20b is eliminated. Processing corresponding to the initialization (3) is performed in steps S461a and S462a of FIG. 37, mentioned later.

The write processing for the host is shown in FIG. 36a to FIG. 36e. Steps S200 to S214 and Steps S215 to S224 are the same as those of FIG. 24a to FIG. 24c. Below, an explanation will be given of the steps after S225a.

Steps S225a to S233a

The MPU 30 reads out the EOT from the area EA of the RAM 31b and judges the EOT mode (S225).

Figure 32A:
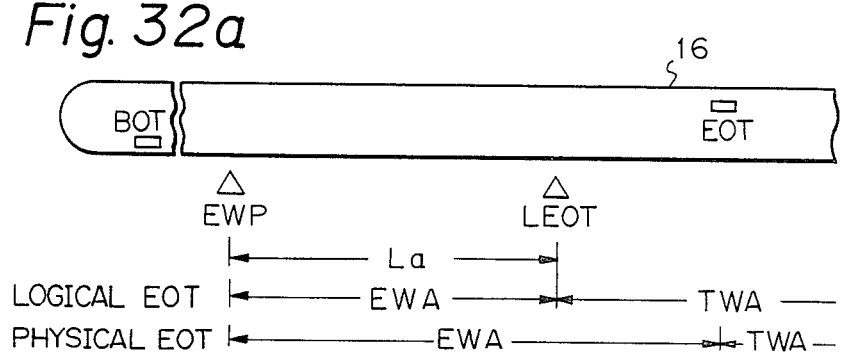
FIG. 32a to FIG. 33 are diagrams illustrating the principle of a fifth embodiment of the present invention.
Figure 32B:
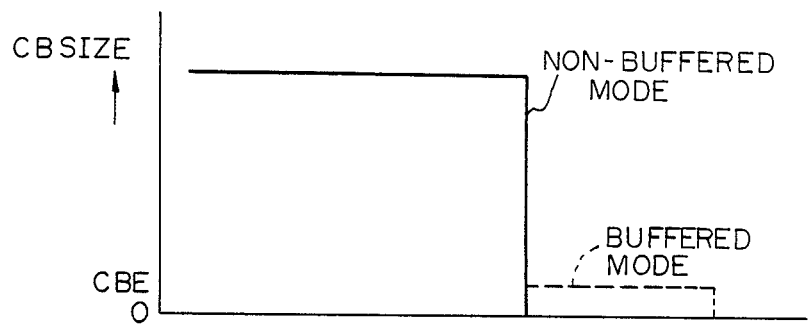
Figure 32C:
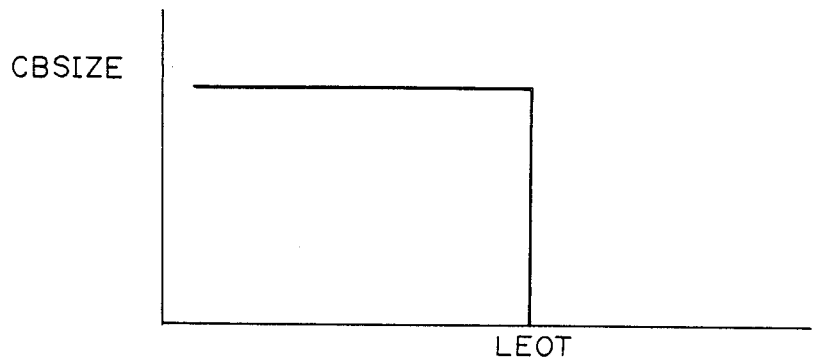
Figure 33:
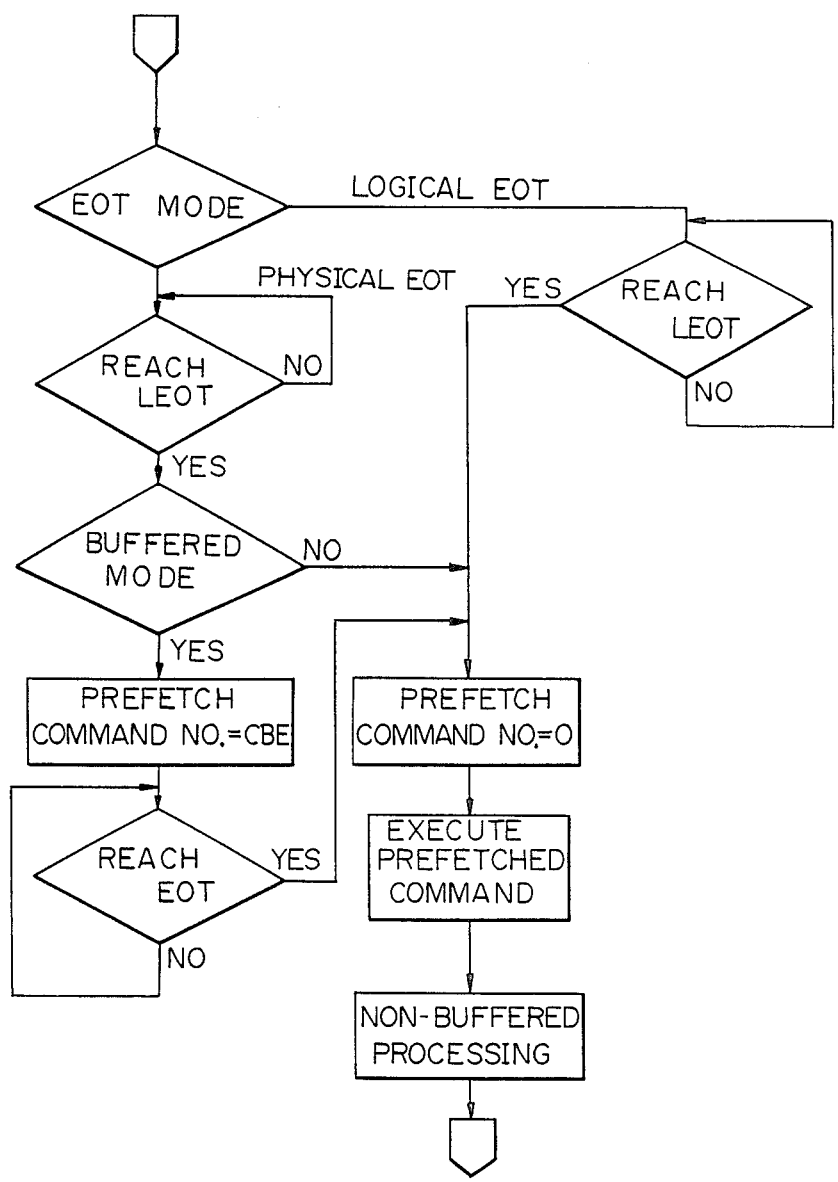

If the LEOT mode or the physical EOT mode and buffered mode, as shown in FIG. 32(c), prefetch processing is performed until the LEOT of FIG. 32(a) or the actual EOT, since if the LEOT flag and the actual EOT detection signal are not on, high speed running instructions are appended to the commands given from the host controller and the commands are stored in the command buffer CBUF. If the LEOT flag or the actual EOT detection signal is on, nonbuffered processing is to be performed, so a synchronization flag is placed on (S229a to S231a).

At step S226a, in the case of the physical EOT mode and the nonbuffered mode, the MPU 30 investigates if the reduced flag RDCDF is set or not. If the reduced flag RDCDF is off, command prefetching processing is to be performed, so the routine moves to step S229a. If the reduced flag RDCDF is on, nonbuffered processing is to be performed, so the synchronization flag SYNCF is placed on, the high speed running instructions are removed from the commands given from the host controller, and the commands stored in the command buffer CBUF. The reasons for lowering the speed of running of the magnetic tape are as follows: In the nonbuffered mode, the interval between issuance of commands to the drive becomes longer, so even if high speed running is instructed, unless the interval between issuances of commands from the host controller is very short, the next command would not be able to be issued to the drive in the time required for maintenance of high speed running (high speed streaming operation), so the drive would stop the running of the magnetic tape for repositioning. Therefore, repositioning would occur with each command and the performance would drop considerably. If the speed of running is made low, the time interval between issuance of commands required for maintenance of streaming operation becomes longer, so there is less possibility of occurrence of repositioning. Even if repositioning occurs, it is completed in a shorter time compared with high speed running. Further, there are some drives which do not require repositioning at low speed running. By reducing the speed of running in this way, it is possible to prevent any decline in performance due to frequent repositioning.

Note that the LEOT flag and the reduced flag RDCDF are both set by processing routines on the drive side. As shown in FIG. 32a, after detection of the EWA, when the magnetic tape runs a predetermined distance La (in this embodiment, 50 feet, but also possibly another length and even zero), i.e., when the LEOT is reached, the EOT mode is judged. If the LEOT mode, the LEOT flag and the reduced flag RDCDF are turned on. In the physical EOT mode, just the reduced flag RDCDF is turned on. Further, after the detection of the EWA, if distance information is lost before the LEOT is reached (a read command is executed), just the reduced flag RDCDF is turned on irregardless of the EOT mode.

In the subsequent processing, the MPU 30 adds 1 to the command stack CBSTK and updates the command buffer management area CA of the RAM 31b (S233a).

Steps S234a to S236a

If the reduced flag RDCDF is not set, the command buffer size CBSIZE is set to 64. If otherwise, the command buffer CBSIZE is set to the limit CBE.

Steps S237a to S238a

Figure 37A:
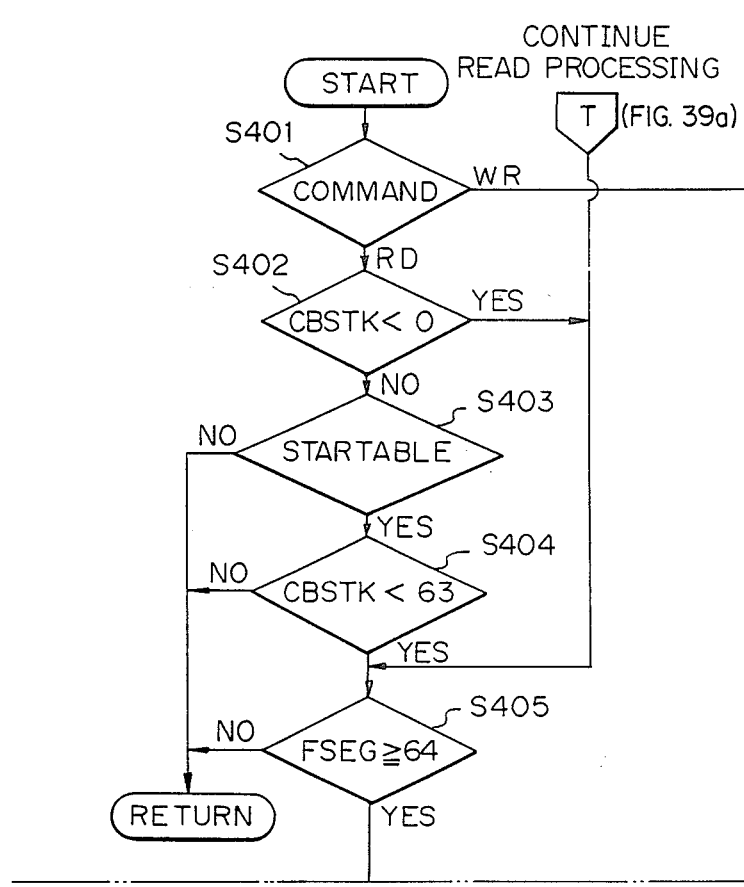
FIG. 37a to FIG. 37c is a flow chart illustrating the startup of a drive system in the fifth embodiment.

If the drive is not executing a command, the drive startup processing explained later with respect to FIG. 37a is performed.

Steps S239a to S240a

If the synchronization flag SYCNF is set, the mode is the nonbuffered mode, so the completion of the execution of the command is awaited.

Steps S241a to S244a

After the completion of the drive processing, the MPU 30 reports the completion to the host controller by the host interface circuit 32b (normal completion or error), turns the data busy signal DBY off, and returns to the startup wait routine of FIG. 34a. If the actual EOT is detected and if the LEOT flag is one, a report is given on the detection of the EOT simultaneously with the report on termination. The operation will be explained below.

Figure 25C:
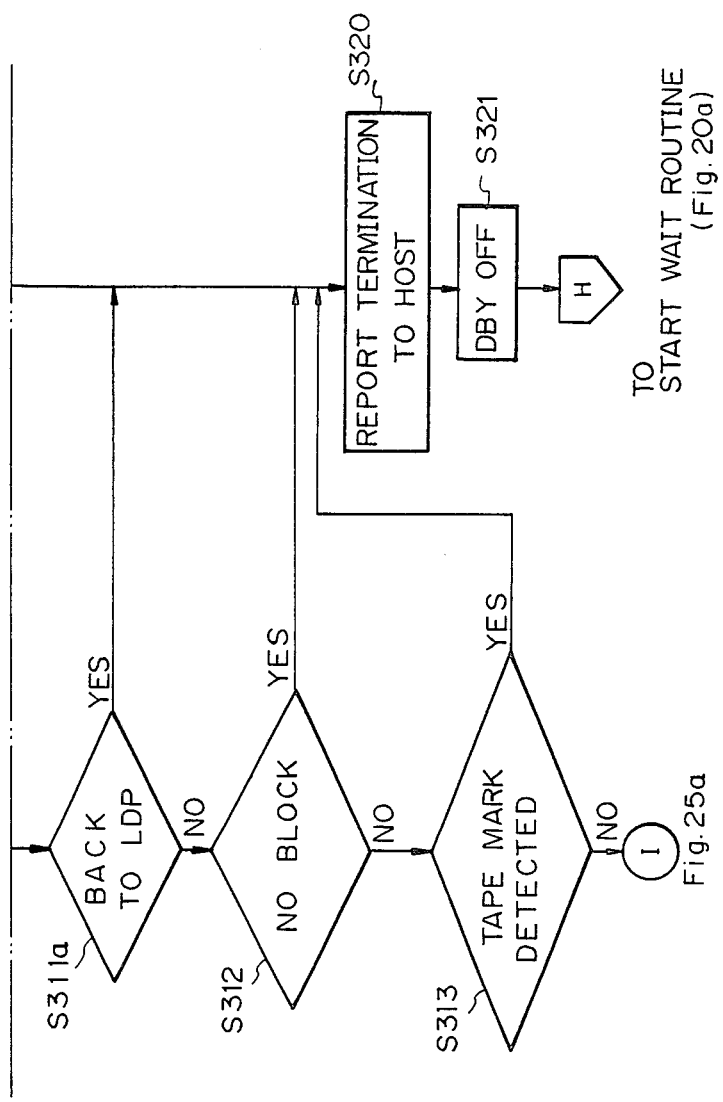

The read processing for the host is the same as that of FIG. 25a to FIG. 25c.

Figure 37B:
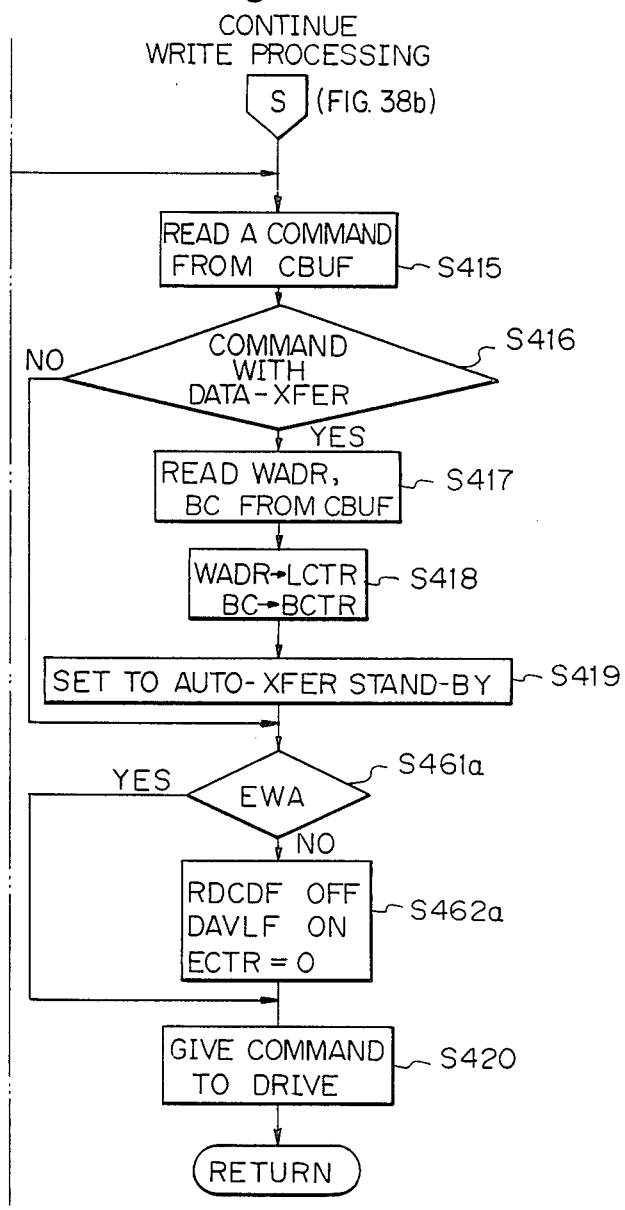
Figure 37C:
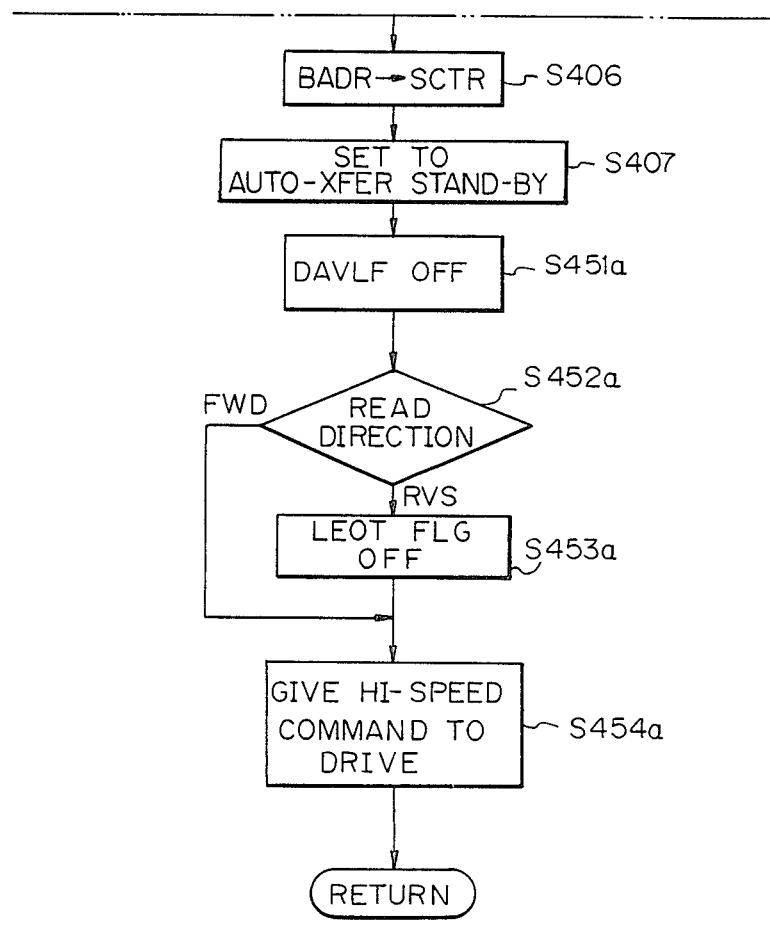

FIG. 37a to FIG. 37c is a flow chart of the startup processing for the drive. FIG. 37a to FIG. 37c corresponds to FIG. 26a and FIG. 26b and steps S401 to S407, steps S415 to S419, and step S420 are the same as in FIG. 26a and FIG. 26b. Below, the explanation of the operation will be given focusing on the different steps S451a to S454a and S461a to S462a.

Steps S406, S407, S451a to S454a

If the free segment number FSEG is more than 64 Kbytes, data transfer from the drive 1 is possible, so the MPU 30 sets the buffer address BADR of the RAM 31b in the store address counter SCTR of the data transfer control circuit 33 and places the data transfer control circuit 33 in the wait state.

Next, the MPU 30 places the distance validity flag DAVLF off. If the read direction is reverse, it sets the LEOT flag off. After it is turned off, the MPU 30 issues a startup signal (GO) and the corresponding read command via the drive interface circuit 32a to the drive 1 and returns. At this time, a high speed drive command is issued to the drive controller 2.

Steps S415 to S419

If the MPU 30 judges at step S401 that the command is for a write operation, the MPU 30 reads out the corresponding write command from the command buffer CBUF of the RAM 31b and investigates if the command is one accompanied by data transfer. If one accompanied by data transfer, the MPU 30 sets the write buffer address WADR and the byte count BC of the command buffer CBUF of the RAM 31b in the load address counter LCTR and byte counter BCTR of the data transfer control circuit 33. Further, it places the data transfer control circuit 33 in the wait state.

Steps S461a to S420

After the wait state or if the command is one not accompanied by data transfer (erase, write tape mark, etc.), the MPU 30 investigates by the drive interface circuit 32a if the EWA signal is on or off. If the EWA signal is off, the magnetic tape has not entered the EWA, so the reduced flag RDCDF and the distance validity flag DAVLF are set to one, and the EOT counter ECTR is cleared for initialization as EOT processing of the magnetic tape. Next, the MPU 30 issues a startup (GO) signal and the write command via the drive interface circuit 32a to the drive control unit 2 and returns.

Figure 38B:
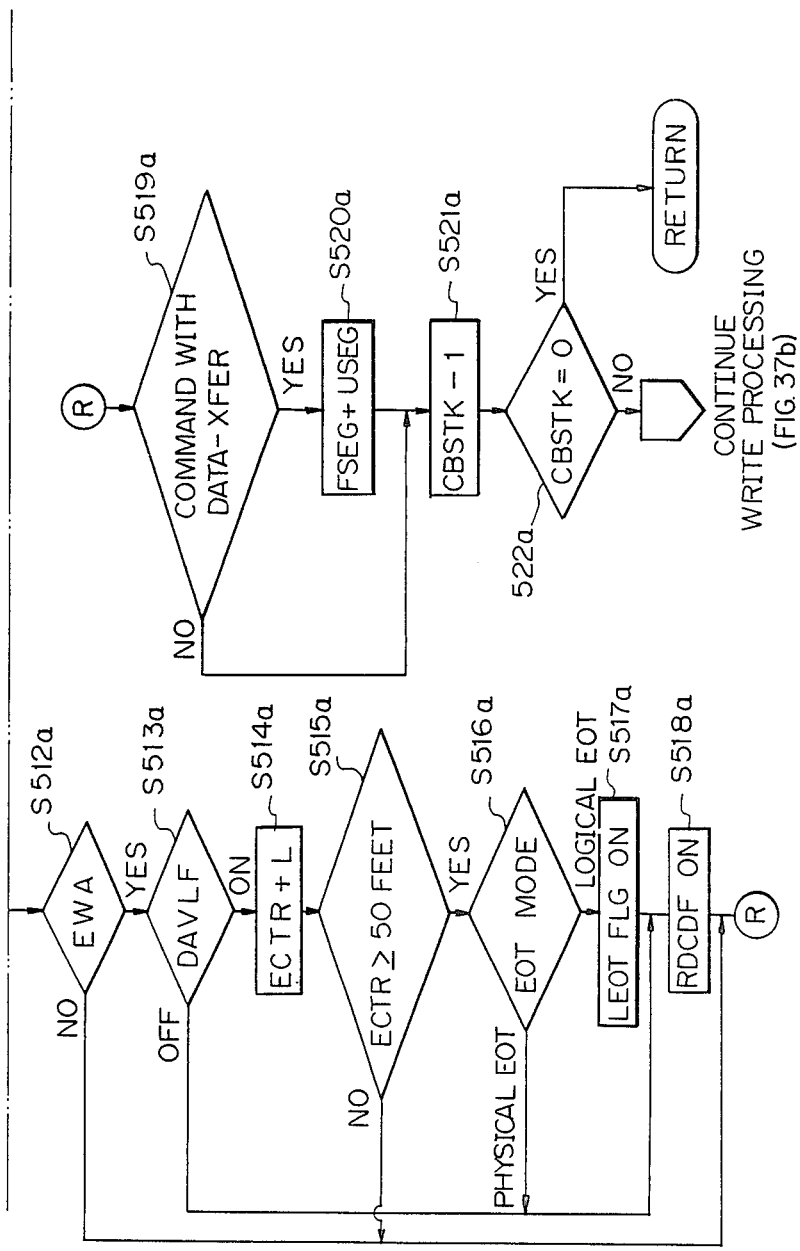

FIG. 38a and FIG. 38b is a flow chart of write processing for the drive. FIG. 38 corresponds to FIG. 27, but differs in various respects.

Steps S501a to S511a

When a report of termination is received from the drive, the MPU 30 investigates if the completed command was for a read operation or write operation. If for a read operation, it proceeds to the drive read processing. If the completed command was for a write operation, the MPU 30 investigates the write recording density of the area EA of the RAM 31b.

Depending on whether the recording density is 6250 rpi or 1600 rpi, the write tape mark length LWTM, the erase length LERS, the interblock gap length LIBG, and the judgement value EPTR in the advance of the running counter and the detection of the LEOT differ. The processing itself is exactly the same. The MPU 30 investigates if the command of the command buffer CBUF is a write command, erase variable command, write tape mark command, or fix erase command.

If the command is a write command or an erase variable command, the byte count WBC of the command buffer CBUF is converted to the used segment number USEG and made the provisional value L. If the command is a write tape mark command, the fixed value write tape mark length LWTM is similarly set to the provisional value L. This is added to the running counter ECTR and is temporarily stored in the RAM 31b as the provisional value L. If the command is a fix erase command, the fixed erase length LERS is similarly set to the provisional value L. Further, the IBG length is added to the provision value L for updating.

Steps S512a to S518a

The MPU 30 investigates if the magnetic tape is within the EWA. If not within the EWA, no distance calculation is necessary, so it proceeds to step S519a. If within the EWA, the MPU 30 investigates if the distance validity flag is on. If not on, it proceeds to step S518a and turns the reduced flag on. If the distance validity flag is on, the MPU 30 adds the afore-mentioned provisional value L to the running count value ECTR for updating.

Next, the MPU 30 investigates if the running count ECTR is over 50 feet. If less than 50 feet, there is no need to change the command prefetch control, so the MPU 30 proceeds to step S519a. If over 50 feet, the MPU 30 investigates the EOT mode. If the physical EOT mode, it proceeds to step S518a and turns the reduced flag on. If not the physical EOT mode, it turns the LEOT flag and the reduced flag on (S517 to S518a).

Steps S519a to S522a

When the command is accompanied by data transfer, the MPU 30 adds to the free segment number FSEG the used segment number USEG to update the free segment number FSEG.

Next, the MPU 30 subtracts 1 from the command stack CBSTK and, if the CBSTK is 0, returns. If otherwise, it proceeds to the afore-mentioned write processing continuation processing (FIG. 37b).

Figure 39B:
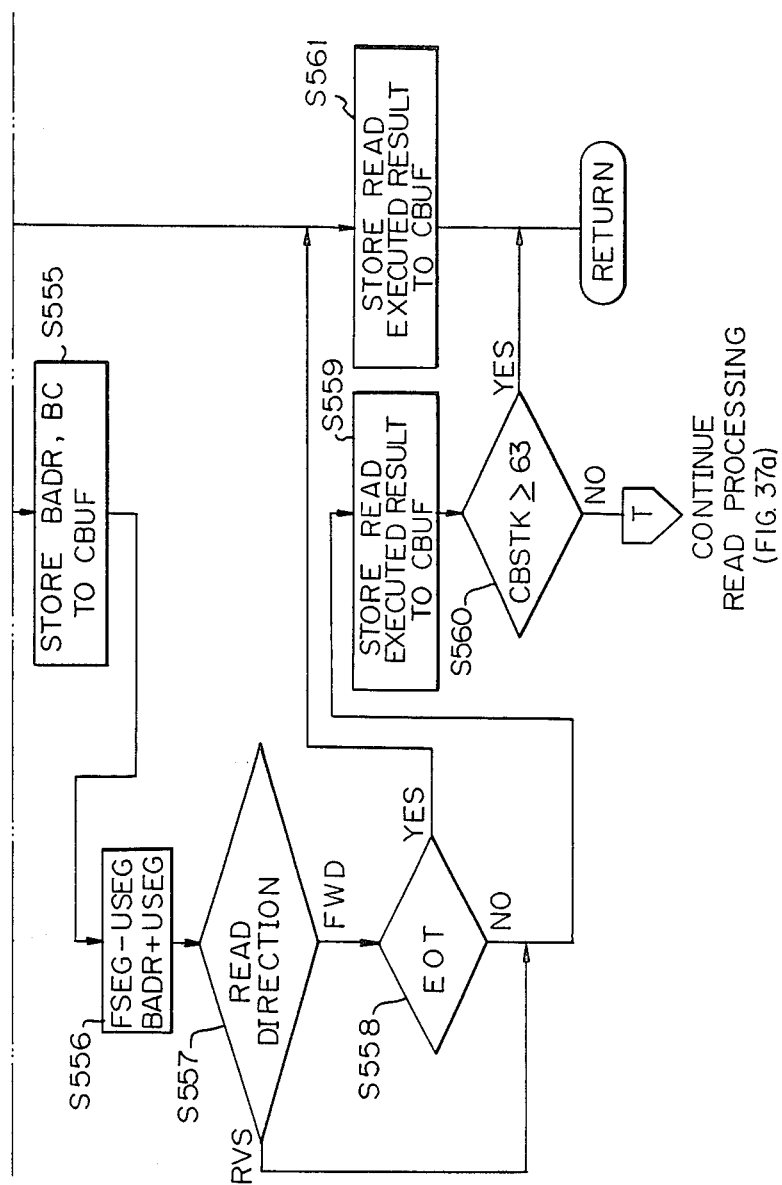

FIG. 39a and FIG. 39b is a flow chart of the read processing for the drive. It corresponds to steps S530 to S539 of FIG. 27c, but differs on the points mentioned below.

Steps S551 to S561

When the read operation is in the reverse direction and the load point LDP is reached, when the read operation is in the forward direction and no block is detected, and when a tape mark is detected, no read data is transferred from the drive, so the MPU 30 proceeds to step S561, stores the results of the read execution in the command buffer CBUF, and returns. In cases other than the above, it calculates the byte count BC and stores the buffer address BADR and the byte count BC in the command buffer CBUF. Further, it subtracts the used segment number USEG from the free segment number FSEG to update the free segment number FSEG and adds the used segment number USEG to the buffer address BADR to update the buffer address BADR.

Next, if the read direction is forward and the EOT is detected, the MPU 30 proceeds to step S561, stores the results of the read execution in the command buffer CBUF, and returns.

If the read direction is reverse or the read direction is forward and the EOT is not detected, the MPU 30 stores the results of the read execution in the command buffer CBUF and then investigates the command stack CBSTK. If CBSTK is more than 63, the command buffer CBUF is full and prereading is not possible, so the MPU 30 returns. If CBSTK is less than 63, prereading is possible, so it proceeds to the read processing continuation (FIG. 37c).

As explained above, this embodiment of the present invention enables processing according to either the physical EOT mode or the LEOT mode for EOT processing, by designation from the operator panel, and enables processing by the buffered mode or nonbuffered mode in the physical EOT mode.

In particular, in the nonbuffered mode, the operation is the same as the conventional operation in which accessing is performed for each command and the physical EOT and the LEOT match. Needless to say, at regions other than the EOT of the magnetic tape, command prefetch processing is performed.

Further, in the nonbuffered mode, the running speed of the magnetic tape is made low, so frequent repositioning is prevented and the performance is kept from declining.

In the above fifth embodiment, the limitation of the prefetching commands is based upon the running length of the magnetic tape as shown in FIGS. 32a to 39b, however, the limitation of the prefetching may be easily achieved by calculating the write length due to the accumulation of write data to the magnetic tape after the magnetic tape has passed the early warning point.

Many widely different embodiments of the present invention may be constructed without departing from the spirit and scope of the present invention. It should be understood that the present invention is not limited to the specific embodiments described in this specification except as defined in the appended claims.

What is claimed is:

1. A magnetic tape system operatively connected to a host system requesting access to reels of magnetic tape having beginning and end-of-tape marks, comprising:

drive means for driving the reels of magnetic tape and for accessing data on the magnetic tape;

drive control means, operatively connected to said drive means, for controlling said drive means in dependence upon commands to read and write data on the magnetic tape, for calculating a running distance of the magnetic tape based on diameters of the magnetic tape wound on the reels and for issuing an early-warning-area signal when the magnetic tape reaches a predetermined position before the end-of-tape mark; and prefetch control means, operatively connected to said drive control means and the host system and having first and second memories, for prefetching and storing in the first memory a plurality of write commands from the host system, including write commands unaccompanied by write data from the host system, for storing in the second memory a plurality of write data and read data from the magnetic tape and for operating said drive means, based on the write commands received in advance from the host system and stored in the first memory, via said drive control means to write data on and read data from the magnetic tape based on the commands from the host system and for reporting results to the host system, said prefetch control means reducing a number of write commands permitting to be prefetched and stored in the first memory after reception of the early-warning-area signal.

2. A magnetic tape system according to claim 1, wherein the number of write commands permitted to be prefetched and stored is reduced upon receipt of one of the write commands from the host system by said prefetch control means.

3. A magnetic tape system according to claim 1, wherein the number of write commands permitted to be prefetched and stored is reduced to a predetermined value.

4. A magnetic tape system operatively connected to a host system requesting access to reels of magnetic tape having beginning and end-of-tape marks, comprising:

drive means for driving the reels of magnetic tape and for accessing data on the magnetic tape;

drive control means, operatively connected to said drive means, for controlling said drive means in dependence upon commands to read and write data on the magnetic tape, for calculating a running distance of the magnetic tape based on diameters of the magnetic tape wound on the reels and for issuing an early-warning-area signal when the magnetic tape reaches a predetermined position before the end-of-tape mark; and prefetch control means, operatively connected to said drive control means and the host system and having first and second memories, for prefetching and storing in the first memory a plurality of write commands from the host system, including write commands unaccompanied by write data from the host system, for storing in the second memory a plurality of write data and read data from the magnetic tape and for operating said drive means, based on the write commands received in advance from the host system and stored in the first memory, via said drive control means to write data on and read data from the magnetic tape based on the commands from the host system and for reporting results to the host system, said prefetch control means, after receiving the early-warning-area signal, limiting a number of prefetched write commands permitted to be stored in the first memory to a final limit determined by a recording density and a maximum block length of the write commands.

5. A magnetic tape system operatively connected to a host system requesting access to reels of magnetic tape having beginning and end-of-tape marks, comprising:

drive means for driving the reels of magnetic tape and for accessing data on the magnetic tape;

drive control means, operatively connected to said drive means, for controlling said drive means in dependence upon comamnds to read and write data on the magnetic tape, for calculating a running distance of the magnetic tape based on diameters of the magnetic tape wound on the reels and for issuing an early-warning-area signal when the magnetic tape reaches a predetermined position before the end-of-tape mark; and prefetch control means, operatively connected to said drive control means and the host system and having first and second memories, for prefetching and storing in the first memory a plurality of write commands from the host system, including write commands unaccompanied by write data from the host system, for storing in the second memory a plurality of write data and read data from the magnetic tape and for operating said drive means, based on the write commands received in advance from the host system and stored in the first memory, via said drive control means to write data on and read data from the magnetic tape based on the commands from the host system and for reporting results to the host system, said prefetch control means, after receiving the early-warning-area signal, calculating a length for storing write data of the prefetched write commands on the magnetic tape and when the length reaches a predetermined value, said prefetch control means limiting a number of prefetched write commands permitted to be stored in the first memory as determined by a recording density and a maximum block length of the write commands.

6. A magnetic tape system operatively connected to a host system requesting access to reels of magnetic tape having beginning and end-of-tape marks, comprising:

drive means for driving the reels of magnetic tape and for accessing data on the magnetic tape;

drive control means, operatively connected to said drive means, for controlling said drive means in dependence upon commands to read and write data on the magnetic tape, for calculating a running distance of the magnetic tape based on diameters of the magnetic tape wound on the reels and for issuing an early-warning-area signal when the magnetic tape reaches a first predetermined position before the end-of-tape mark; and prefetch control means, operatively connected to said drive control means and the host system and having first and second memories, for prefetching and storing in the first memory a plurality of write commands from the host system, including write commands unaccompanied by write data from the host system, for storing in the second memory a plurality of write data and read data from the magnetic tape and for operating said drive means, based on the write commands received in advance from the host system and stored in the first memory, via said drive control means to write data on and read data from the magnetic tape based on the commands form the host system and for reporting results to the host system, said prefetch control means, after receiving the early-warning-area signal, calculating an end running distance of the magnetic tape and, when the end running distance reaches a value corresponding to a second predetermined position before the end-of-tape mark of the magnetic tape, said prefetch control means issuing an end-of-tape signal to the host system and no longer accepting prefetching of the write commands from the host system.

7. A magnetic tape system operatively connected to a host system requesting access to reels of magnetic tape having beginning and end-of-tape marks, comprising:

drive means for driving the reels of magnetic tape and for accessing data on the magnetic tape;

drive control means, operatively connected to said drive means, for controlling said drive means in dependence upon commands to read and write data on the magnetic tape, for calculating a running distance of the magnetic tape based on diameters of the magnetic tape wound on the reels and for issuing an early-warning-area signal when the magnetic tape reaches a first predetermined position before the end-of-tape mark; and prefetch control means, operatively connected to said drive control means and the host system and having first and second memories, for prefetching and storing in the first memory a plurality of write commands from the host system, including write commands unaccompanied by write data from the host system, for storing in the second memory a plurality of write data and read data from the magnetic tape and for operating said drive means, based on the write commands received in advance from the host system and stored in the first memory, via said drive control means to write data on and read data from the magnetic tape based on the commands from the host system and for reporting results to the host system, said prefetch control means, after receiving the early-warning-area signal, calculating a length for storing write data of the prefetched write commands on the magnetic tape and, when the length reaches a predetermined value, issuing an end-of-tape signal to the host system and no longer accepting prefetching of write commands from the host sytem.

8. A magnetic tape system operatively connected to a host system requesting access to reels of magnetic tape having beginning and end-of-tape marks, comprising:
   drive means for driving the reels of magnetic tape and for accessing data on the magnetic tape;
   drive control means, operatively connected to said drive means, for controlling said drive means in dependence upon commands to read and write data on the magnetic tape, for calculating a running distance of the magnetic tape based on diameters of the magnetic tape wound on the reels and for issuing an early-warning-area signal when the magnetic tape reaches a first predetermined position before the end-of-tape mark; and
   prefetch control means, operatively connected to said drive control means and the host system and having first and second memories, for prefetching and storing in the first memory a plurality of write commands from the host system, including write commands unaccompanied by write data from the host system, for storing in the second memory a plurality of write data and read data from the magnetic tape and for operating said drive means, based on the write commands received in advance from the host system and stored in the first memory, via said drive control means to write data on and read data from the magnetic tape based on the commands from the host system and for reporting results to the host system, said prefetch control means operating in one of two modes after receiving the early-warning-area signal, in a first mode said prefetch control means calculating an end running distance of the magnetic tape and performing prefetch control until the end running distance reaches a value corresponding to a second predetermined position before the end-of-tape mark of the magnetic tape and when the value corresponding to the second predetermined position is reached, issuing an end-of-tape signal to the host system and no longer accepting prefetching of the write commands from the host system, and in a second mode said prefetch control means reducing a number of prefetchable commands from when the early-warning-area signal is issued to detection of the end-of-tape mark.

9. A magnetic tape system according to claim 8, wherein one of the first mode and the second mode is selected in advance.

10. A magnetic tape system according to claim 9, wherein if said prefetch control means receives a read command during execution of the first mode, said prefetch control means automatically switches to the second mode.

11. A magnetic tape system according to claim 10, wherein the number of prefetchable commands in the second mode is reduced when a write command from the host system is received by said prefetch control means.

12. A magnetic tape system according to claim 8, wherein the number of prefetchable commands in the second mode is reduced to a predetermined value.

13. A magnetic tape system according to claim 8, wherein said prefetch control means reduces the number of prefetachable commands in the second mode to a limit determined by a recording density and a maximum block length of the write commands.

14. A magnetic tape system operatively connected to a host system requesting access to reels of magnetic tape having beginning and end-of-tape marks, comprising:
   drive means for driving the reels of magnetic tape and for accessing data on the magnetic tape;
   drive control means, operatively connected to said drive means, for controlling said drive means in dependence upon commands to read and write data on the magnetic tape, for calculating a running distance of the magnetic tape based on diameters of the magnetic tape wound on the reels and for issuing an early-warning-area signal when the end of the magnetic tape reaches a first predetermined position before the end-of-tape mark; and
   prefetch control means, operatively connected to said drive control means and the host system and having first and second memories, for prefetching and storing in the first memory a plurality of write commands from the host system, including write commands unaccompanied by write data from the host system, for storing in the second memory a plurality of write data and read data from the magnetic tape and for operating said drive means, based on the write commands received in advance from the host system and stored in the first memory, via said drive control means to write data on and read data from the magnetic tape based on the commands from the host system, for reporting results to the host system and for calculating a length for storing write data of prefetched write commands on the magnetic tape and when the length reaches a predetermined value, after receiving the early-warning-area signal said prefetch control means operating in one of two modes, in a first mode said prefetch control means issuing an end-of-tape signal to the host system and no longer accepting prefetching of write commands from the host system and in a second mode said prefetch control means reducing a number of prefetchable commands from when the early-warning-area signal is issued to detection of the end-of-tape mark.

15. A magnetic tape system operatively connected to a host system requesting access to reels of magnetic tape having beginning and end-of-tape marks, comprising:
   drive means for driving the reels of magnetic tape and for accessing data on the magnetic tape;
   drive control means, operatively connected to said drive means, for controlling said drive means in dependence upon commands to read and write data on the magnetic tape, for calculating a running distance of the magnetic tape based on diameters of the magnetic tape wound on the reels and for issuing an early-warning-area signal when the end of the magnetic tape reaches a first predetermined position before the end-of-tape mark; and
   prefetch control means, operatively connected to said drive control means and the host system and having first and second memories, for prefetching and storing in the first memory a plurality of write commands from the host system, including write commands unaccompanied by write data from the host system, for storing in the second memory a plurality of write data and read data from the magnetic tape and for operating said drive means, based on the write commands received in advance from the host system and stored in the first memory, via said drive control means to write data on and read data from the magnetic tape based on commands from the host system, for reporting results to the host system and for calculating an end running distance fo the magnetic tape starting when the early-warning-area signal is issued, said prefetch control means prefetching commands until the end running distance reaches a value corresponding to a second predetermined position before the end-of-tape mark of the magnetic tape and thereafter said prefetch control means operating in one of the following modes:

a first mode in which an end-of-tape signal is issued to the host system and prefetching of the write commands from the host system is no longer accepted, and a second mode in which said prefetch control means reduces a number of prefetchable commands between issuance of the early-warning-area signal and detection of the end-of-tape mark, the second mode including a buffered mode and a non-buffered mode, in the buffered mode, the number of prefetchable commands being reduced to a predetermined value when the second predetermined position is reached and, in the non-buffered mode, the number of prefetchable commands being reduced to zero when the second predetermined position is reached.

16. A magnetic tape system according to claim 15, wherein one of the modes is selected in advance.

17. A magnetic tape system according to claim 16, wherein if said prefetch control means receives a read command during execution of the first mode, said prefetch control means is automatically switched to the second mdoe.

18. A magnetic tape system according to claim 17, wherein said prefetch control means reduces the number of write commands which may be prefetched and stored in the buffered mode to a limit determined by a recording density and a maximum block length of the write commands.

19. A magnetic tape system operatively connected to a host system requesting access to reels of magnetic tape having beginning and end-of-tape marks, comprising:

drive means for driving the reels of magnetic tape and for accessing data on the magnetic tape;

drive control means, operatively connected to said drive means,for controlling said drive means in dependence upon commands to read and write data on the magnetic tape, for calculating a running distance of the magnetic tape based on diameters of the magnetic tape wound on the reels and for issuing an early-warning-area signal when the end of the magnetic tape reaches a first predetermined position before the end-of-tape mark; and prefetch control means, operatively connected to said drive control means and the host system and having first and second memories, for prefetching and storing in the first memory a plurality of write commands from the host system, including write commands unaccompanied by write data from the host system, for storing in the second memory a plurality of write data and read data from the magnetic tape and for operating said drive means, based on the write commands received in advance from the host system and stored in the first memory, via said drive control means to write data on and read data from the magnetic tape based on commands from the host system, for reporting results to the host system and for calculating a length for storing write data of prefetched write commands on the magnetic tape, said prefetch control means continuing to perform prefetching until the length reaches a first predetermined value corresponding to a second predetermined position before the end-of-tape mark of the magnetic tape and thereafter said prefetch control means operating in one of the following modes:

a first mode in which an end-of-tape signal is issued to the host system and prefetching of the write commands from the host system is no longer accepted, and a second mode in which said prefetch control means reduces a number of prefetchable commands between issuance of the early-warning-area signal and detection of the end-of-tape mark, the second mode including a buffered mode and a non-buffered mode, in the buffered mode, when the length for storing the write data of the prefetched write commands on the magnetic tape reaches the first predetermined value, the number of prefetchable commands being reduced to a second predetermined value and, in the non-buffered mode, the number of prefetchable commands being reduced to zero.

20. A magnetic tape system operatively connected to a host system requesting access to reels of magnetic tape having beginning and end-of-tape marks, comprising:

drive means for driving the reels of magnetic tape and for accessing data on the magnetic tape;

drive control means, operatively connected to said drive means, for controlling said drive means in dependence upon commands to read and write data on the magnetic tape, for calculating a running distance of the magnetic tape based on diameters of the magnetic tape wound on the reels and for issuing an early-warning-area signal when the end of the magnetic tape reaches a first predetermined position before the end-of-tape mark; and prefetch control means, operatively connected to said drive control means and the host system and having first and second memories, for prefetching and storing in the first memory a plurality of write commands from the host system, including write commands unaccompanied by write data from the host system, for storing in the second memory a plurality of write data and read data from the magnetic tape and for operating said drive means, based on the write commands received in advance from the host system and stored in the first memory, via said drive control means to write data on and read data from the magnetic tape based on commands from the host system and for reporting results to the host system, said prefetch control means having identical signal connections to the host system and to said drive control means 21. A magnetic tape system receiving write commands, comprising:

drive means for driving magnetic tape and for writing data on the magnetic tape in response to the write commands;

means for generating a tape position signal indicating approach of an end-of-tape mark; and prefetch control means for prefetching and storing the write commands and for transmitting the write commands to said drive means, said prefetch control means reducing a number of the write commands, including any of the write commands unaccompanied by write data, permitted to be prefetched and stored in response to the magnetic tape position signal.

* * * * *

UNITED STATES PATENT AND TRADEMARK OFFICE
CERTIFICATE OF CORRECTION

PATENT NO. : 4,757,396

DATED : July 12, 1988

INVENTOR(S) : MASAYUKI ISHIGURO et al.

It is certified that error appears in the above-identified patent and that said Letters Patent is hereby corrected as shown below:

```
Column 3,  lines 5-6,   delete "corresponding";
           line 29-30,  delete "corresponding".

Column 6,  line 66,     "comletion" should be --completion--.

Column 7,  line 33,     delete "CMND";
           line 34,     after "commands" insert --CMND--;
           line 65,     "driver" should be --drive--;
           line 67,     "driver" should be --drive--.

Column 9,  line 52,     "that" should be --the--.

Column 10, line 68,     delete "is being executed".

Column 11, line 1,      "processing," should be --processing is
                        being executed,--;

line 60,     "SACTR" should be --SCTR--;
           line 62,     "SACTR" should be --SCTR--.

Column 13, line 33,     after "reads" insert --out the--;
           line 61,     after "MPU" insert --30---;
           lines 67-68, "interrupt" should be --interrupts--.
```

UNITED STATES PATENT AND TRADEMARK OFFICE
CERTIFICATE OF CORRECTION

PATENT NO. : 4,757,396

DATED : July 12, 1988

INVENTOR(S) : MASAYUKI ISHIGURO et al.

It is certified that error appears in the above-identified patent and that said Letters Patent is hereby corrected as shown below:

Column 14, line 49, "driven" should be --drive--;
            line 52, "prevent" should be --present--.

Column 15, line 4, "accurary" should be --accuracy--.

Column 16, line 29, "rewindg" should be --rewind--;
            line 33, "if" should be --is--.

Column 17, line 52, after "arrived" insert --)--;
            line 56, "(N)" should be (NO)--;
            line 60, "LEO" should be --LEOT--;

*Column 18, line 21, "109" should be --S109--;
            line 40, "ESEG" should be --FSEG--;
            line 54, "comamnd" should be --command--.

Column 19, line 16, "FESG" should be --FSEG--.

Column 20, line 56, "flat" should be --flag--.

Column 21, line 16, "(Ssee)" should be --(S233)--;
            line 25, "pocessing" should be --processing--;
            line 41, "shot" should be --host--;
            line 68, "thae" should be --the--.

UNITED STATES PATENT AND TRADEMARK OFFICE
CERTIFICATE OF CORRECTION

PATENT NO. : 4,757,396

DATED : July 12, 1988

INVENTOR(S) : MASAYUKI ISHIGURO et al.

It is certified that error appears in the above-identified patent and that said Letters Patent is hereby corrected as shown below:

Column 22, line 30, ""S311" should be --S311a--.

Column 23, line 10, "EOT" should be --LEOT--.

Column 25, line 13, "(S507)," should be --(S507,--;
line 16, "length length" should be --length--.

Column 26, line 3, "further" should be --Further--.

Column 29, line 32, "CGE" should be --CBE--.

Column 30, line 25, "as as" should be --as to--.

Column 31, line 5, "procesing" should be --processing--.

Column 32, line 21, "is" should be --are--;
line 25, "102a" should be --S102a--.

Column 35, line 60, "37c" should be --37a--.

Column 36, lines 53-54, "permitting" should be --permitted--.

Column 37, line 40, "comamnds" should be --commands--.

UNITED STATES PATENT AND TRADEMARK OFFICE
CERTIFICATE OF CORRECTION

PATENT NO. : 4,757,396

DATED : July 12, 1988

INVENTOR(S) : MASAYUKI ISHIGURO et al.

It is certified that error appears in the above-identified patent and that said Letters Patent is hereby corrected as shown below:

Column 38, line 30, "form" should be --from--.

Column 41, line 11, "fo" should be --of--;
         line 55, "means,for" should be --means, for--.

Column 42, line 66, after "means" insert --.--.

Signed and Sealed this

Seventh Day of March, 1989

*Attest:*

DONALD J. QUIGG

*Attesting Officer*      *Commissioner of Patents and Trademarks*